(12) United States Patent
Bock et al.

(10) Patent No.: US 12,499,203 B2
(45) Date of Patent: Dec. 16, 2025

(54) SYSTEM AND METHOD FOR AUTHENTICATING A MOBILE DEVICE

(71) Applicants: Joel N. Bock, Teaneck, NJ (US); Ronald R. Erickson, Brooklyn, NY (US)

(72) Inventors: Joel N. Bock, Teaneck, NJ (US); Ronald R. Erickson, Brooklyn, NY (US)

(73) Assignee: XIVIX Holding LLC, Teaneck, NJ (US)

( * ) Notice: Subject to any disclaimer, the term of this patent is extended or adjusted under 35 U.S.C. 154(b) by 0 days.

(21) Appl. No.: 16/995,621

(22) Filed: Aug. 17, 2020

(65) Prior Publication Data

US 2020/0380113 A1 Dec. 3, 2020

Related U.S. Application Data

(62) Division of application No. 15/331,900, filed on Oct. 23, 2016, now Pat. No. 10,747,868.

(Continued)

(51) Int. Cl.
*G06F 21/44* (2013.01)
*G03H 1/00* (2006.01)
(Continued)

(52) U.S. Cl.
CPC .......... *G06F 21/44* (2013.01); *G03H 1/0011* (2013.01); *G03H 1/0248* (2013.01); *G03H 1/0443* (2013.01); *G06F 21/32* (2013.01); *G06F 21/36* (2013.01); *G06F 21/40* (2013.01); *G06Q 20/0855* (2013.01); *G06Q 20/3276* (2013.01);
(Continued)

(58) Field of Classification Search
CPC .......... G06F 21/44; G06F 21/32; G06F 21/36; G06F 21/40; G06T 7/74; G06T 7/337; G06T 2207/10028; G06T 2207/30244; G06V 40/10; G06V 10/95; G03H 1/0011; G03H 1/0248; G03H 1/0443; G06Q 20/0855; G06Q 20/3276; G06Q 20/40; H04L 9/3231; H04L 63/0861;
(Continued)

(56) References Cited

U.S. PATENT DOCUMENTS 5,623,347 A 4/1997 Pizzanelli
6,170,058 B1 1/2001 Kausik
(Continued)

FOREIGN PATENT DOCUMENTS

JP 2005-004781 1/2005
JP 2007-257491 10/2007
(Continued)

OTHER PUBLICATIONS

Europe Supplementary Partial Search Report dated May 21, 2019 in related Application No. 16858414.2 filed Oct. 23, 2016 (14 pages).
(Continued)

*Primary Examiner* — Techane Gergiso

(57) ABSTRACT

In a mobile device including an image capturing device having an imaging element (CCD), and an illumination element, capturing an image of an object and sending the image of the object to a server for authenticating the image and authorizing a transaction.

20 Claims, 30 Drawing Sheets

Related U.S. Application Data

(60) Provisional application No. 62/245,851, filed on Oct. 23, 2015, provisional application No. 62/245,819, filed on Oct. 23, 2015.

(51) Int. Cl.

| | | |
|---|---|---|
| G03H 1/02 | (2006.01) | |
| G03H 1/04 | (2006.01) | |
| G06F 21/32 | (2013.01) | |
| G06F 21/36 | (2013.01) | |
| G06F 21/40 | (2013.01) | |
| G06Q 20/08 | (2012.01) | |
| G06Q 20/32 | (2012.01) | |
| G06Q 20/40 | (2012.01) | |
| G06T 7/33 | (2017.01) | |
| G06T 7/73 | (2017.01) | |
| G06V 10/94 | (2022.01) | |
| G06V 40/10 | (2022.01) | |
| H04L 9/32 | (2006.01) | |
| H04L 9/40 | (2022.01) | |
| H04N 5/04 | (2006.01) | |
| H04N 23/56 | (2023.01) | |
| H04W 12/06 | (2021.01) | |

(52) U.S. Cl.
CPC .......... *G06Q 20/40* (2013.01); *G06T 7/337* (2017.01); *G06T 7/74* (2017.01); *G06V 10/95* (2022.01); *G06V 40/10* (2022.01); *H04L 9/3231* (2013.01); *H04L 63/0861* (2013.01); *H04L 63/0876* (2013.01); *H04N 5/04* (2013.01); *H04N 23/56* (2023.01); *H04W 12/06* (2013.01); *G06T 2207/10028* (2013.01); *G06T 2207/30244* (2013.01)

(58) Field of Classification Search
CPC .... H04L 63/0876; H04N 5/04; H04N 5/2256; H04W 12/06
See application file for complete search history.

(56) References Cited

U.S. PATENT DOCUMENTS

| | | | |
|---|---|---|---|
| 6,263,446 B1 | 7/2001 | Kausik | |
| 6,895,391 B1 | 5/2005 | Kausik | |
| 6,908,030 B2 | 6/2005 | Rajasekaran et al. | |
| 7,111,789 B2 | 9/2006 | Rajasekaran et al. | |
| 7,161,720 B2 | 1/2007 | Erickson et al. | |
| 7,330,836 B2 | 2/2008 | Kausik | |
| 7,356,541 B1 | 4/2008 | Doughty | |
| 7,675,662 B2 | 3/2010 | Erickson et al. | |
| 7,904,360 B2 | 3/2011 | Evans | |
| 8,015,598 B2 | 9/2011 | Hird | |
| 8,290,876 B1* | 10/2012 | Powell | G06Q 20/20 705/64 |
| 8,417,637 B2 | 4/2013 | Templeton et al. | |
| 8,589,271 B2 | 11/2013 | Evans | |
| 8,620,810 B2 | 12/2013 | Karantzis | |
| 9,256,874 B2* | 2/2016 | Cronic | G06Q 20/4014 |
| 9,369,469 B2 | 6/2016 | Gregg et al. | |
| 9,413,756 B1 | 8/2016 | Wang | |
| 9,641,640 B2 | 5/2017 | Flack et al. | |
| 9,721,147 B1* | 8/2017 | Kapczynski | G06Q 50/265 |
| 2002/0069779 A1* | 6/2002 | Baba | G03H 1/268 101/484 |
| 2003/0046555 A1* | 3/2003 | Bradley | G06Q 20/40145 713/186 |
| 2003/0152252 A1 | 8/2003 | Kondo et al. | |
| 2004/0098350 A1 | 5/2004 | Labrou et al. | |
| 2004/0123114 A1* | 6/2004 | McGowan | G07C 9/257 713/186 |
| 2004/0160624 A1 | 8/2004 | Elgar et al. | |
| 2004/0251309 A1* | 12/2004 | Cove | G06K 19/12 235/493 |
| 2005/0063027 A1 | 3/2005 | Durst, Jr. et al. | |
| 2005/0069171 A1 | 3/2005 | Rhoads et al. | |
| 2005/0177507 A1 | 8/2005 | Bandych et al. | |
| 2006/0212407 A1 | 9/2006 | Lyon | |
| 2007/0094277 A1 | 4/2007 | Fachan et al. | |
| 2008/0177663 A1* | 7/2008 | Gupta | G06Q 20/382 705/35 |
| 2008/0197972 A1* | 8/2008 | Lawson | G07D 11/30 340/5.86 |
| 2008/0201576 A1 | 8/2008 | Kitagawa et al. | |
| 2009/0132813 A1 | 5/2009 | Schibuk | |
| 2009/0153926 A1 | 6/2009 | Wiltshire et al. | |
| 2009/0198618 A1* | 8/2009 | Chan | G06Q 20/02 707/E17.014 |
| 2009/0199004 A1 | 8/2009 | Krawczewicz et al. | |
| 2009/0260064 A1 | 10/2009 | McDowell et al. | |
| 2009/0288012 A1* | 11/2009 | Hertel | G06Q 20/105 715/769 |
| 2010/0195175 A1 | 8/2010 | Flynn et al. | |
| 2011/0054678 A1 | 3/2011 | Thompson | |
| 2011/0153498 A1 | 6/2011 | Makhotin et al. | |
| 2011/0208852 A1* | 8/2011 | Looney | G06Q 30/06 709/223 |
| 2011/0251910 A1 | 10/2011 | Dimmick | |
| 2011/0264567 A1 | 10/2011 | Clyne | |
| 2011/0281630 A1 | 11/2011 | Omar | |
| 2011/0288918 A1 | 11/2011 | Cervenka et al. | |
| 2011/0302011 A1 | 12/2011 | Yoder et al. | |
| 2011/0302022 A1 | 12/2011 | Fordyce et al. | |
| 2012/0066062 A1 | 3/2012 | Yoder et al. | |
| 2012/0072997 A1 | 3/2012 | Carlson et al. | |
| 2012/0078697 A1 | 3/2012 | Carlson et al. | |
| 2012/0078699 A1 | 3/2012 | Carlson et al. | |
| 2012/0109734 A1 | 5/2012 | Fordyce et al. | |
| 2012/0259782 A1* | 10/2012 | Hammad | G06Q 20/3674 705/44 |
| 2012/0271770 A1 | 10/2012 | Harris et al. | |
| 2012/0296725 A1 | 11/2012 | Dessert et al. | |
| 2012/0296726 A1 | 11/2012 | Dessert et al. | |
| 2012/0310838 A1 | 12/2012 | Harris et al. | |
| 2012/0311686 A1 | 12/2012 | Medina et al. | |
| 2013/0019096 A1 | 1/2013 | Palzer et al. | |
| 2013/0024307 A1 | 1/2013 | Fuerstenberg et al. | |
| 2013/0047202 A1* | 2/2013 | Radhakrishnan | H04L 63/10 726/1 |
| 2013/0073388 A1* | 3/2013 | Heath | G06Q 50/01 705/14.53 |
| 2013/0073464 A1 | 3/2013 | Magpayo et al. | |
| 2013/0073859 A1 | 3/2013 | Carlson et al. | |
| 2013/0080329 A1 | 3/2013 | Royyuru et al. | |
| 2013/0117138 A1 | 5/2013 | Hazel et al. | |
| 2013/0124417 A1 | 5/2013 | Spears et al. | |
| 2013/0173383 A1 | 7/2013 | Sharma et al. | |
| 2013/0181045 A1 | 7/2013 | Dessert et al. | |
| 2013/0197991 A1* | 8/2013 | Basu | G06Q 20/385 705/14.39 |
| 2013/0211900 A1 | 8/2013 | Dessert | |
| 2013/0221101 A1 | 8/2013 | Lebaschi et al. | |
| 2013/0246258 A1 | 9/2013 | Dessert | |
| 2013/0246259 A1 | 9/2013 | Dessert | |
| 2013/0246273 A1 | 9/2013 | Ovick et al. | |
| 2013/0256403 A1* | 10/2013 | MacKinnon Keith | G06Q 20/322 235/375 |
| 2013/0268333 A1 | 10/2013 | Ovick et al. | |
| 2014/0040051 A1 | 2/2014 | Ovick et al. | |
| 2014/0040135 A1 | 2/2014 | Ovick et al. | |
| 2014/0052636 A1 | 2/2014 | Mattes | |
| 2014/0153787 A1 | 6/2014 | Schmidtler et al. | |
| 2014/0164251 A1* | 6/2014 | Loh | G06Q 20/065 705/67 |
| 2014/0164254 A1* | 6/2014 | Dimmick | G06Q 20/4012 705/44 |
| 2014/0201084 A1 | 7/2014 | Dagenais et al. | |
| 2014/0244352 A1 | 8/2014 | Fordyce et al. | |
| 2014/0284382 A1 | 9/2014 | Park | |

(56) References Cited

U.S. PATENT DOCUMENTS

| | | |
|---|---|---|
| 2014/0337089 A1 | 11/2014 | Tavares |
| 2015/0012444 A1* | 1/2015 | Brown ................ H04L 63/08 |
| | | 705/76 |
| 2015/0019435 A1 | 1/2015 | Ovick et al. |
| 2015/0032625 A1* | 1/2015 | Dill .................. G06Q 20/4016 |
| | | 705/44 |
| 2015/0032626 A1 | 1/2015 | Dill et al. |
| 2015/0032627 A1* | 1/2015 | Dill ................... G06Q 20/385 |
| | | 705/44 |
| 2015/0088674 A1* | 3/2015 | Flurscheim ........ G06Q 20/326 |
| | | 705/17 |
| 2015/0108220 A1 | 4/2015 | Gu et al. |
| 2015/0127547 A1 | 5/2015 | Powell et al. |
| 2015/0161597 A1 | 6/2015 | Subramanian et al. |
| 2015/0180836 A1* | 6/2015 | Wong ................ G06Q 20/3672 |
| | | 713/172 |
| 2015/0220905 A1 | 8/2015 | Dessert |
| 2015/0248664 A1* | 9/2015 | Makhdumi ........ G06Q 20/3274 |
| | | 235/380 |
| 2015/0269433 A1 | 9/2015 | Amtrup et al. |
| 2015/0287021 A1* | 10/2015 | Itwaru .................. G06Q 20/40 |
| | | 705/44 |
| 2015/0290808 A1 | 10/2015 | Renkis |
| 2015/0302421 A1* | 10/2015 | Caton ............. G06K 19/06037 |
| | | 705/17 |
| 2015/0348013 A1 | 12/2015 | Gulchenko |
| 2015/0356556 A1 | 12/2015 | Celikyilmaz et al. |
| 2016/0012465 A1 | 1/2016 | Sharp |
| 2016/0019536 A1* | 1/2016 | Ortiz ...................... G06Q 20/36 |
| | | 705/67 |
| 2016/0019538 A1* | 1/2016 | Arif ......................... G06T 7/90 |
| | | 705/44 |
| 2016/0027034 A1 | 1/2016 | Kim |
| 2016/0065563 A1* | 3/2016 | Broadbent ......... H04L 63/0281 |
| | | 726/9 |
| 2016/0071101 A1 | 3/2016 | Winarski |
| 2016/0098713 A1 | 4/2016 | Fuerstenberg et al. |
| 2016/0171486 A1 | 6/2016 | Wagner et al. |
| 2016/0232527 A1 | 8/2016 | Patterson |
| 2016/0307196 A1 | 10/2016 | Achhra et al. |
| 2016/0321664 A1* | 11/2016 | Erickson .............. G06Q 20/409 |
| 2016/0323259 A1 | 11/2016 | Carlson et al. |
| 2016/0358197 A1 | 12/2016 | Ovick et al. |
| 2017/0004475 A1 | 1/2017 | White et al. |
| 2017/0221054 A1 | 8/2017 | Flurscheim et al. |
| 2017/0300917 A1 | 10/2017 | Tavares |
| 2018/0204206 A1 | 7/2018 | Flurscheim et al. |
| 2018/0285864 A1 | 10/2018 | Dill et al. |
| 2019/0043026 A1 | 2/2019 | Solis |

FOREIGN PATENT DOCUMENTS

| | | |
|---|---|---|
| JP | 2008-288712 | 11/2008 |
| JP | 2009-026034 | 2/2009 |
| WO | WO 2008/050132 | 5/2008 |
| WO | WO 2017/070638 | 4/2017 |

OTHER PUBLICATIONS

Europe Supplementary Search Report dated Aug. 12, 2019 in related Application No. 16858414.2 filed Oct. 23, 2016 (14 pages).

International Search Report and Written Opinion dated Sep. 28, 2018 in corresponding International Application No. PCT/US2018/033489 filed May 18, 2018 (19 pages).

China Office Action dated Apr. 1, 2020 in related Application No. 201680076210.6 filed Oct. 23, 2016 (7 pages).

Japan Office Action dated Mar. 2, 2020 in related Application No. 2018-541092 filed Oct. 23, 2016 (5 pages).

International Search Report and Written Opinion dated Jan. 13, 2017 in corresponding International Application No. PCT/US2016/058354 filed Oct. 23, 2016 (8 pages).

* cited by examiner

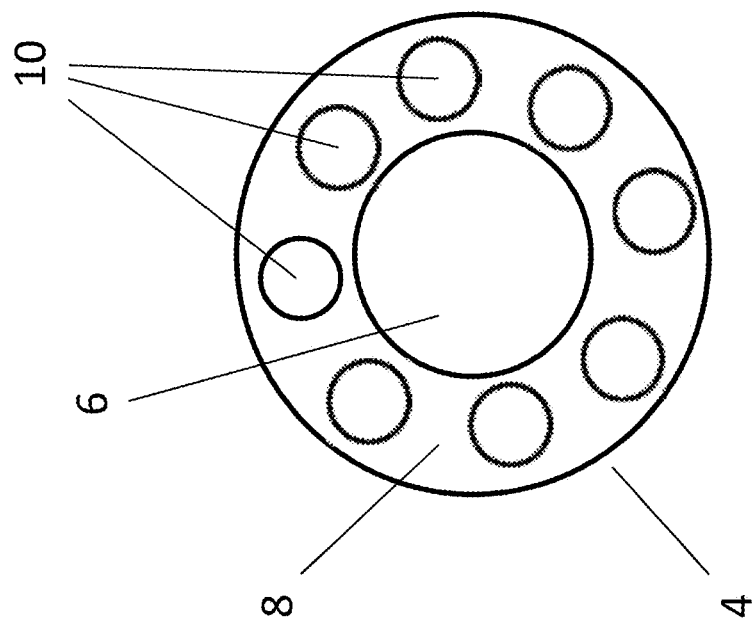
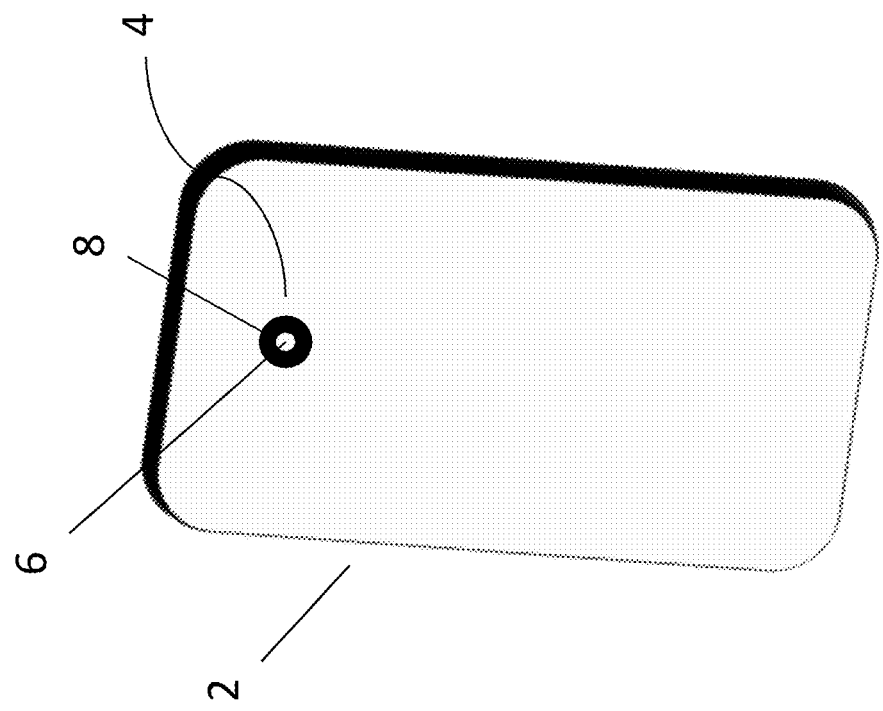

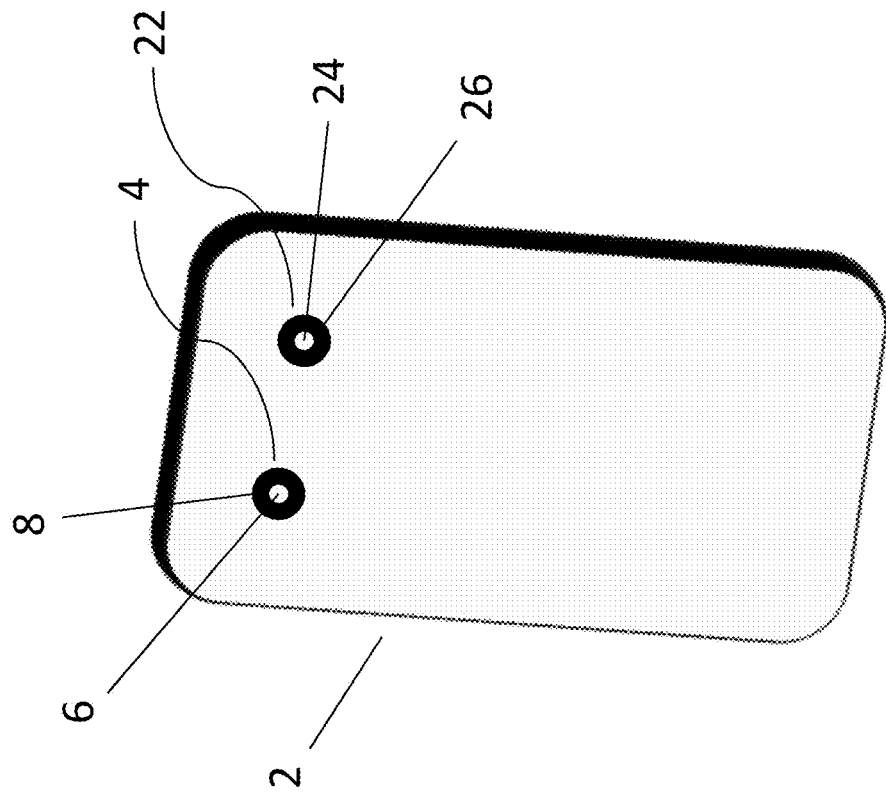
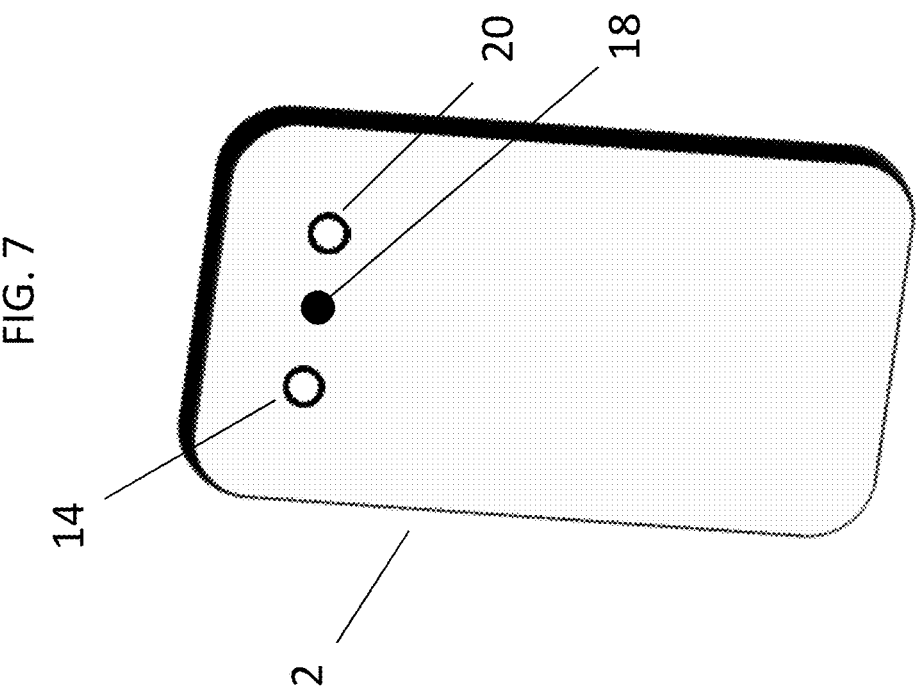

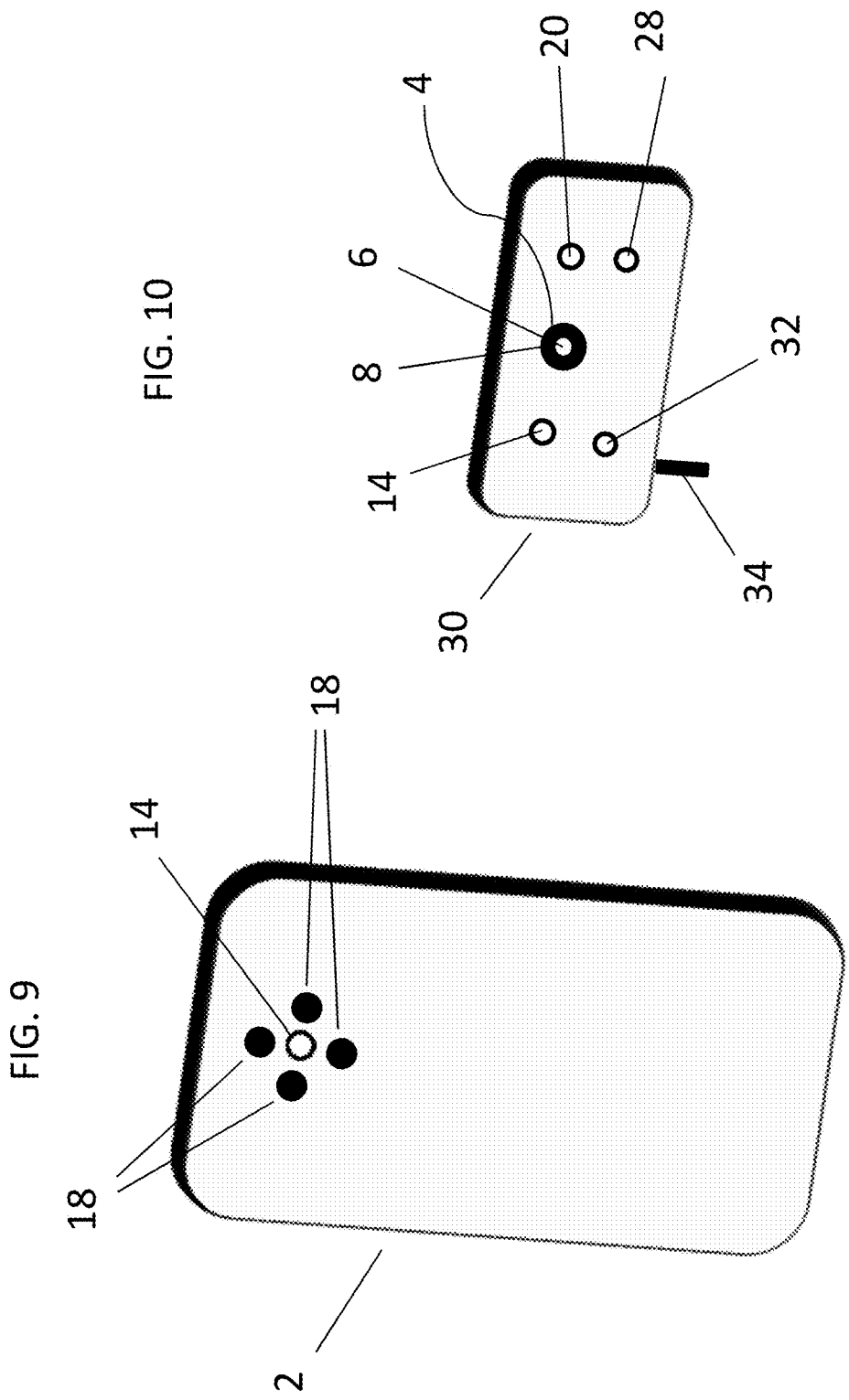

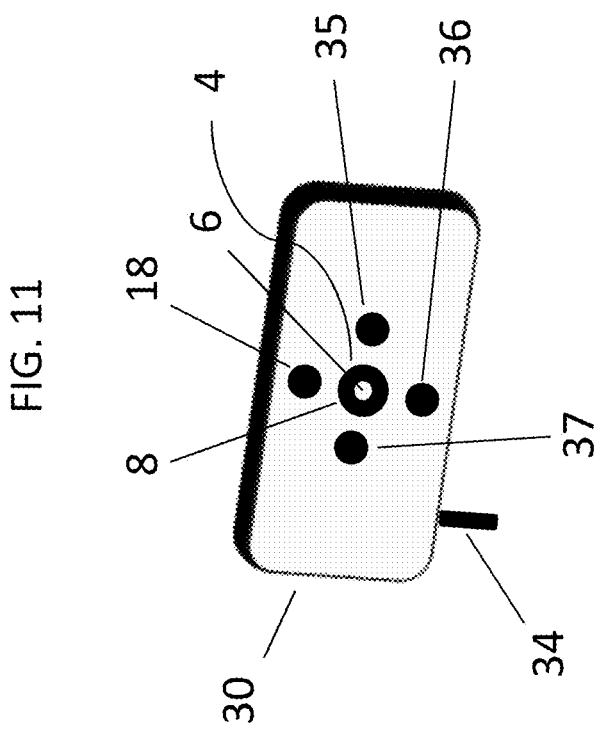

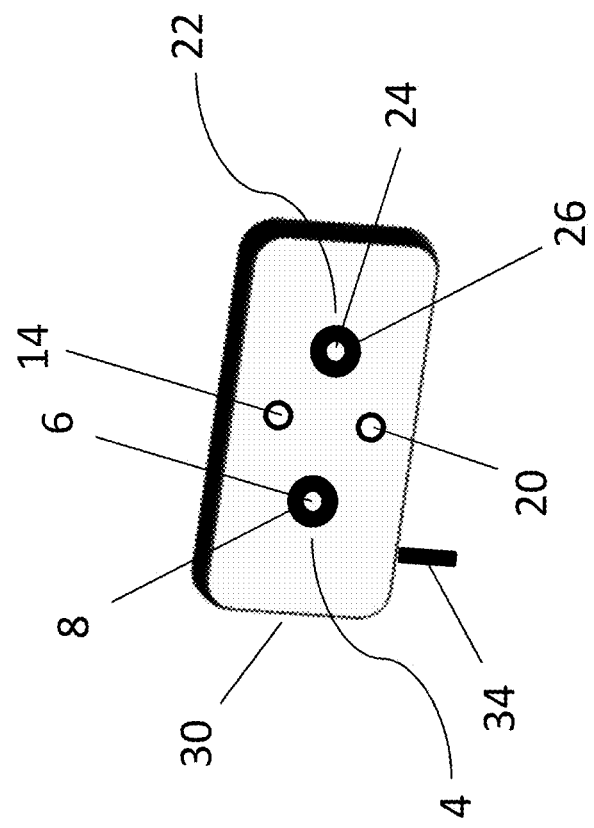
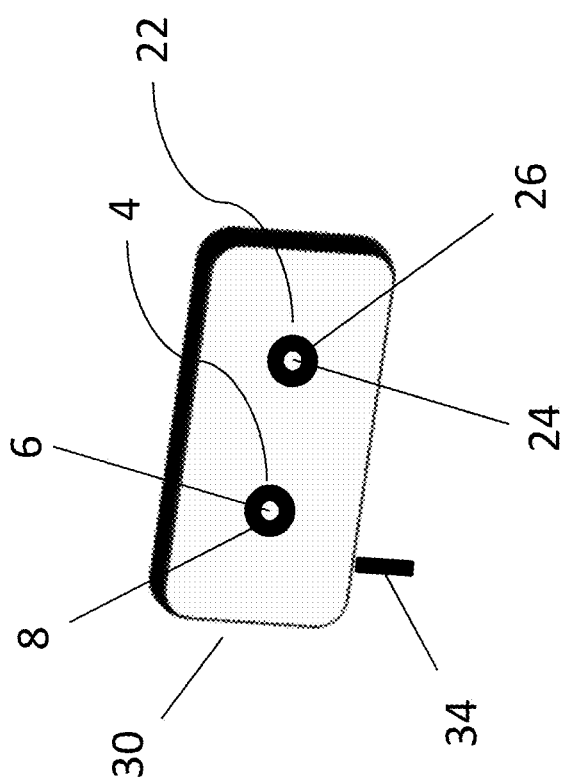
FIG. 14
FIG. 13

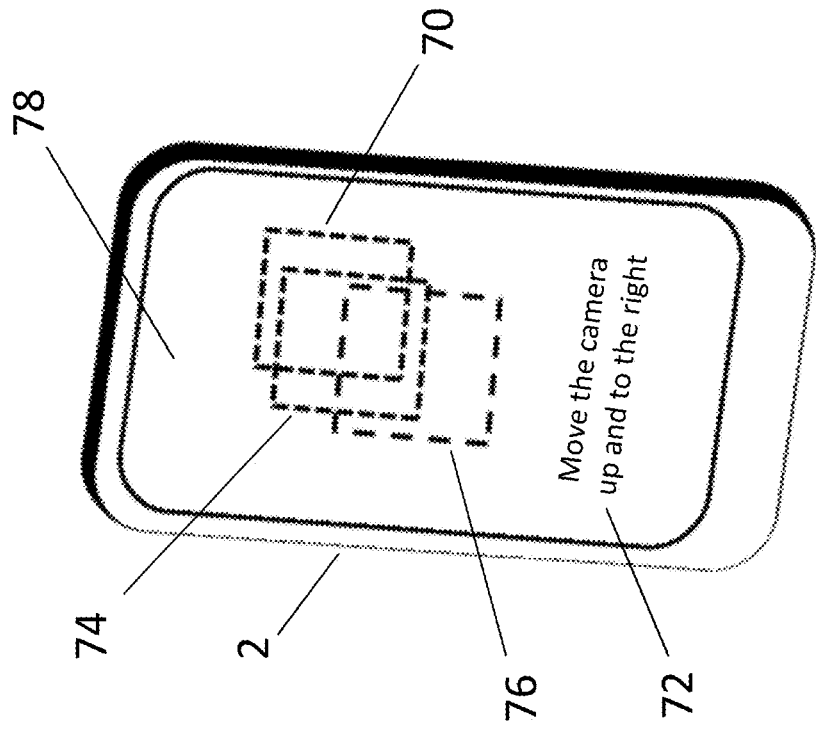
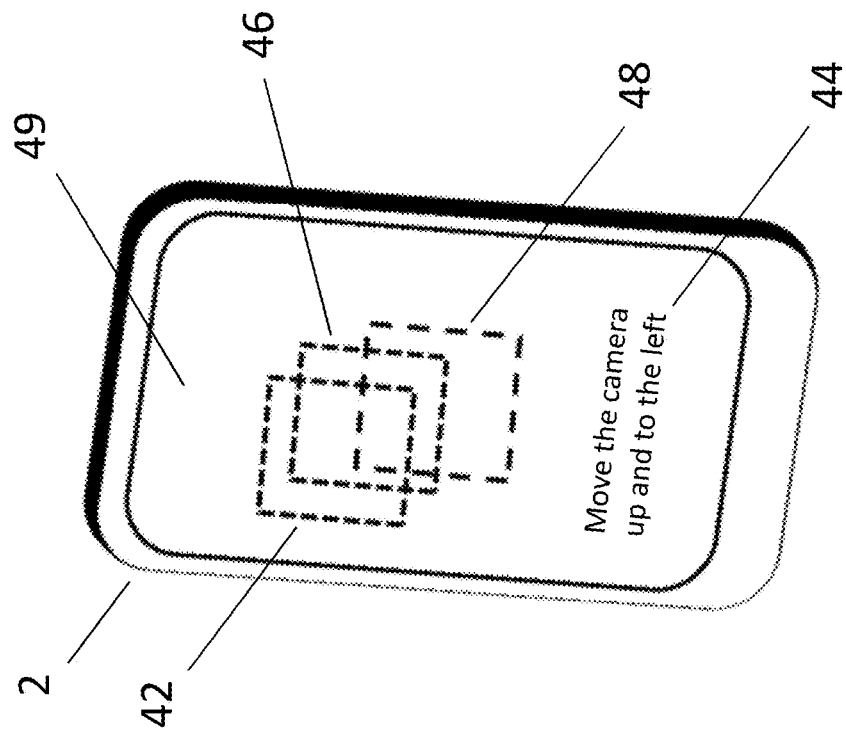

SYSTEM AND METHOD FOR AUTHENTICATING A MOBILE DEVICE

FIELD

This disclosure relates to authentication. More specifically, this disclosure relates to authentication using a mobile device.

BACKGROUND

There has been a growing problem worldwide with respect to counterfeit goods. These counterfeits are often of a much lower quality than authentic goods and frequently comprise adulterated or dangerous materials and/or components. The growth of counterfeit goods has been a major problem for companies that have to deal with repercussions of adulterated goods being passed off as their authentic goods. These repercussions include product liability issues, warranty issues, damage to the company's public image, harm to consumers, lost revenues and policing and enforcement. The harm to consumers has been significant, in some cases leading to hospitalization and even death. The damage to the manufacturers of the authentic products has been enormous and runs in the billions of dollars annually.

From a security perspective, the ability for criminals and terrorists to forge identification cards, passports and other security instruments has resulted in major security breaches and puts the public in extreme danger.

To date there has been no solution that can adequately verify the authenticity of products without having to test or carefully inspect the product. Because a detailed and costly inspection is required, the cost for verification is prohibitive for many products on the market. There is also no solution that can accurately and automatically verify the authenticity of identification cards and security instruments at a reasonable cost and that cannot be reproduced easily, quickly and cheaply. Additionally, there is no solution that can accurately and automatically verify the authenticity of identification cards and security instruments without the use of biometrics, such as finger prints or retinal scans. This is a growing concern, as many people are concerned about the use of biometrics because of privacy issues and because once a person's biometric information is stolen, there is no way to change that information as it is a physical part of a person. This has generated significant concern, particularly because of the large amount of credit card and other security data that has recently been stolen and continues to be stolen on a daily basis.

SUMMARY

The embodiments described herein relate to methods and systems for authentication using a mobile device. The authentication can be authentication of goods, or the authentication of documents. These goods can be, for example, pharmaceutical products, software, or consumer products, such as food items, or cleaning items, or any other goods that have been, or are subject to being, counterfeited. The documents can be, for example, identification cards, passports, visas, currency, securities, credit cards or other financial instruments or security items.

One embodiment of a system for authentication using a mobile device is accomplished where the mobile device includes a camera or an image capture device having an imaging element, which can be, for example, a CCD or CMOS chip, and a flash or other illumination device or element. Alternatively, the imaging element may be any imaging element created in the future that can be used to capture images. The mobile device also includes a transmitter, a receiver, a microprocessor, and a memory. The memory includes or can be modified to include instructions that cause the microprocessor to: control the camera to capture a plurality of images of a security hologram, wherein a first image of the security hologram is captured when the camera is at a first position and a second image of the security hologram is captured when the camera is at a second position; activate the illumination element at least at a first point in time relative to the capturing of the first image and at least at a second point in time relative to the capturing of the second image; synchronize the capturing of the first image of the security hologram at the first point in time or after a first amount of time following the first point in time and the capturing of the second image of the security hologram at the second point in time or after a second amount of time following the second point in time; store the first image and the second image in the memory; process the first image and the second image using at least two registration points in the security hologram or alternatively, using two or more registration points in the first image and two or more registration points in the second image; and control the transmitting of the first image and the second image to a server for further processing, using the transmitter.

In place of or in addition to the transmitter and receiver, the device may include a transceiver. The mobile device may include one or more than one microprocessor and it may include one or more than one memory, including for example, RAM, ROM, Flash, EPROM, removable memory, such as, for example, a memory card, SD card, flash card. Alternatively, the mobile device may utilize remote memory, such as, for example, a remote database, a remote server, cloud storage, a peripheral memory device, such as, for example, a backup hard drive, a computer, another form of data storage, such as, for example, DVD, CD, magnetic memory, electronic memory or optical memory.

In another embodiment, a method for authentication using a mobile device, comprises: controlling a camera of the mobile device to capture a plurality of images of a security hologram, wherein a first image of the security hologram is captured when the camera is at a first position, and a second image of the security hologram is captured when the camera is at a second position; activating the illumination element at a first point in time relative to the capturing of the first image and at a second point in time relative to the capturing of the second image; synchronizing the capturing of the first image of the security hologram after a first amount of time following the first point in time and the capturing of the second image of the security hologram after a second amount of time following the second point in time; storing the first image and the second image in the memory; processing the first image and at least the second image using at least two registration points in the first image and at least two registration points in the second image; and controlling the transmitting of the first image and the second image to a server for further processing.

In another embodiment, the system may include a mobile device having a camera or image capture device having an imaging element, which can be, for example, a CCD or CMOS chip and a memory. Alternatively or additionally, the image capturing device may be included as part of a dongle or other peripheral device that couples to a mobile device. The dongle may include a flash or an illumination device or element or may utilize the flash or illumination element from the mobile device, or may both include a flash or illumination device or element and use the flash/illumination element from the mobile device. Alternatively or additionally, the system may include a flash or illumination device or element to which the mobile device may be coupled. The dongle and/or the flash or illumination device or element may additionally have one or more batteries for powering the dongle, the flash/illumination element and/or the mobile device. Alternatively, the imaging element may be any imaging element created in the future that can be used to capture images. The image capture device may include one or more lenses. For example, the one or more lenses are used to modify the image prior to capturing the image by the image capture device. The modification of the image is for example, focusing the image onto the image capture device, enlarging the image, shrinking the image, modifying the format of the image, tuning the image or any other pre-processing of the image prior to capture by the image capture device.

The mobile device also includes a transmitter, a receiver, a microprocessor, and a memory. Alternatively, the dongle and/or flash or illumination device may include a memory. The memory includes instructions that cause the microprocessor to: control the camera or image capture device to capture a plurality of images of a security hologram, wherein a first image of the security hologram is captured when the camera or imaging device is at a first position and a second image of the security hologram is captured when the camera or imaging device is at a second position; activate the flash or illumination device or element at least at a first point in time relative to the capturing of the first image and at least at a second point in time relative to the capturing of the second image; synchronize the capturing of the first image of the security hologram at the first point in time or after a first amount of time following the first point in time and the capturing of the second image of the security hologram at the second point in time or after a second amount of time following the second point in time; store the first image and the second image in the memory; process the first image and the second image using at least two registration points in the first image and at least two registration points in the second image; and control the transmitting of the first image and the second image to a server for further processing, using the transmitter. In place of or in addition to the transmitter and receiver, the device may include a transceiver. The mobile device may include one or more than one microprocessor and it may include one or more than one memory, including for example, RAM, ROM, Flash, EPROM, removable memory, such as, for example, a memory card, SD card, flash card. Alternatively, the mobile device may utilize remote memory, such as, for example, a remote database, a remote server, cloud storage, a peripheral memory device, such as, for example, a backup hard drive, a computer, another form of data storage, such as, for example, DVD, CD, magnetic memory, electronic memory or optical memory.

The first position of the imaging element at which the first image of the security hologram is captured may be a same position as or a different position than the second position of the imaging element at which the second image of the security hologram is captured. The position of the imaging element may be adjusted in a lateral direction relative to the security hologram for purposes of capturing the first image and/or it may be adjusted in a same or a different lateral direction relative to the security hologram for purposes of capturing the second image. Alternatively or additionally, the imaging element may be adjusted toward or away from the security hologram for purposes of capturing the first image and/or the imaging element may be adjusted toward or away from the security hologram the same or a different distance for purposes of capturing the second image as it was adjusted for purposes of capturing the first image.

The distance between the imaging element and the security hologram may be determined by two or more registration points in the security hologram. Alternatively, each of the images may include two or more registration points to assist in determining the orientation and distance at which to position the imaging element for capturing or processing the first image and the second image. For example, there may be two registrations points in the security hologram, or three, four, five, six, seven, eight, nine, or ten or more registration points. Alternatively or additionally, there may be two registration points in the first image, or three, four, five, six, seven, eight, nine, or ten or more registration points in the first image. Alternatively or additionally, there may be two registration points in the second image, or three, four, five, six, seven, eight, nine, or ten or more registration points in the second image. Alternatively or additionally, there may be two registration points in one or more of each of the other images, or three, four, five, six, seven, eight, nine, or ten or more registration points in one or more of each of the other images. Alternatively, any number of the images may include the same or a different number of registration points, including, for example, two, three, four, five, six, seven, eight, nine, or ten or more registration points in one or more of each of the images.

The flash/illumination element may be activated once or at a plurality of points in time relative to the capturing of the first image and the flash/illumination element may be activated once or at a plurality of points in time relative to the capturing of the second image. The flash/illumination element may be activated once, twice, three times, four times, five times, six times, seven times, eight times, nine times, or ten times or more relative to the capturing of the first image, the second image, a third image, a fourth image, a fifth image, a sixth image, a seventh image, an eighth image, a ninth image, or a tenth or greater image, or any number or combination of the images.

The flash/illumination element may be activated at a first intensity level relative to the capturing of the first image and at a second intensity level relative to the capturing of the second image. The first intensity level may be the same or different than the second intensity level. The flash/illumination element may be activated at any number of intensity levels relative to the capturing of the first image, the second image, a third image, a fourth image, a fifth image, a sixth image, a seventh image, an eighth image, a ninth image, or a tenth or greater image, or any number or combination of the images.

The flash/illumination element may be activated for a first period of time relative to the capturing of the first image and for a second period of time relating to the capturing of the second image. The first period of time and the second period of time may be the same or different periods of time. The flash/illumination element may be activated for any length of time relative to the capturing of the first image, the second image, a third image, a fourth image, a fifth image, a sixth image, a seventh image, an eighth image, a ninth image, or a tenth or greater image, or any number or combination of the images.

The flash/illumination element may be activated at a first wavelength relative to the capturing of the first image and at a second wavelength relative to the capturing of the second image. The first wavelength and second wavelength may be the same wavelength or different wavelengths. The flash/ illumination element may be activated at any number of wavelengths relative to the capturing of the first image, the second image, a third image, a fourth image, a fifth image, a sixth image, a seventh image, an eighth image, a ninth image, or a tenth or greater image, or any number or combination of the images, including at a first wavelength, a second wavelength, a third wavelength, a fourth wavelength, a fifth wavelength, a sixth wavelength, a seventh wavelength, an eighth wavelength, a ninth wavelength, or a tenth or greater wavelength. For example, one or more of the wavelengths may be a wavelength in the visible spectrum, in the infrared spectrum, in the ultraviolet spectrum, in another spectrum, or in any combination of the foregoing.

A first flash/illumination element may be activated relative to the capturing of the first image of the security hologram and a second flash/illumination element may be activated relative to the capturing of the second image of the security hologram. The first flash/illumination element may be the same flash/illumination element or a different flash/illumination element. One or more of a first flash/illumination element, a second flash/illumination element, a third flash/illumination element, a fourth flash/illumination element, a fifth flash/illumination element, and a sixth or greater flash/illumination element may be activated relative to the capturing of the first image, the second image, a third image, a fourth image, a fifth image, a sixth image, a seventh image, an eighth image, a ninth image, or a tenth or greater image, or any number or groups or combinations of the images. A different flash/illumination element or group of flash/illumination elements may be activated relative to the capturing of each image or any number of images or groups of images.

The first flash/illumination element may be at a first position relative to the imaging element and the second flash/illumination element may be at a second position relative to the imaging element. The first flash/illumination element may be at any number of positions, including the first position, the second position, a third position, a fourth position, a fifty position, a sixth position, a seventh position, an eighth position, a ninth position, or a tenth or greater position, or any number or combination of positions relative to the capturing of the first image, the second image, a third image, a fourth image, a fifth image, a sixth image, a seventh image, an eighth image, a ninth image, or a tenth or greater image, or any number or combination of the images.

In alternative embodiments, a plurality of flash/illumination elements and a plurality of imaging element may be used. Each flash/illumination element may correspond to a particular imaging element, providing one to one correspondence. Alternatively, there may be more imaging elements than flash/illumination elements such that more than one imaging element may correspond to the same flash/illumination element. Alternatively, there may be more flash/illumination elements than imaging elements such that more than one flash/illumination element may correspond to the same imaging element.

The flash/illumination elements may be separated by a predetermined distance, such as, for example, 5 mm, 10 mm, 15 mm, 20 mm, 25 mm, 30 mm, 35 mm, 40 mm, 45 mm, 50 mm, or any fraction thereof or distance such that the light from each flash/illumination element reflects at a different angle with respect to the imaging element or, if a plurality of imaging elements are used, with respect to the imaging element corresponding to the respective flash/illumination element.

The imaging elements may be separated by a predetermined distance, such as, for example, 5 mm, 10 mm, 15 mm, 20 mm, 25 mm, 30 mm, 35 mm, 40 mm, 45 mm, 50 mm, or any fraction thereof or distance such that the light from the flash/illumination element reflects at a different angle with respect to each imaging element or, if a plurality of flash/illumination elements are used, with respect to the flash/illumination element corresponding to the respective imaging element.

The locations of the flash/illumination elements may vary and may be positioned at different locations relative to one another. For example, if a plurality of flash/illumination elements is used, the flash/illumination elements may be positioned in a linear relationship, in a triangular relationship, in a rectangular or square relationship, in a pentagonal relationship, in a hexagonal relationship, heptagonal relationship, octagonal relationship, nonagonal relationship, decagonal relationship, any combination of the foregoing, or any other positional relationship.

The locations of the imaging elements may vary and may be positioned at different locations relative to one another. For example, if a plurality of imaging elements are used, the imaging elements may be positioned in a linear relationship, in a triangular relationship, in a rectangular or square relationship, in a pentagonal relationship, in a hexagonal relationship, heptagonal relationship, octagonal relationship, nonagonal relationship, decagonal relationship, polygonal relationship, any combination of the foregoing, or any other positional relationship.

The flash/illumination elements and imaging elements may be positioned relative to one another. For example, where each imaging element corresponds to a flash/illumination element, such imaging element and flash/illumination element may be positioned adjacent to one another. Alternatively, such imaging element and flash/illumination element may be separated by a predetermined distance, such as, for example, 5 mm, 10 mm, 15 mm, 20 mm, 25 mm, 30 mm, 35 mm, 40 mm, 45 mm, 50 mm, or any fraction thereof or distance.

As another example, where one or more imaging elements correspond to more than one flash/illumination element, each of such flash/illumination elements may be positioned adjacent to the imaging element such that the light from each flash/illumination element reflects at a different angle with respect to the imaging element. Alternatively, such one or more imaging elements and the more than one flash/illumination element may be separated by one or more predetermined distances, such as, for example, 5 mm, 10 mm, 15 mm, 20 mm, 25 mm, 30 mm, 35 mm, 40 mm, 45 mm, 50 mm, or any fraction thereof or distances.

As another example, where one or more flash/illumination elements correspond to more than one imaging element, such flash/illumination element may be positioned adjacent to each of the imaging elements such that the light from such flash/illumination element reflects at a different angle with respect to each of the imaging elements. Alternatively, the more than one imaging element and one or more flash/illumination elements may be separated by one or more predetermined distances, such as, for example, 5 mm, 10 mm, 15 mm, 20 mm, 25 mm, 30 mm, 35 mm, 40 mm, 45 mm, 50 mm, or any fraction thereof or distances.

A plurality of the preceding features and/or activation methods may be combined. For example, the flash/illumination element may be activated at a first wavelength and at a first intensity relative to the capturing of the first image and at a second wavelength and at a second intensity relative to the capturing of the second image. As another example, the first flash/illumination element may be activated at a first wavelength at a first intensity relative to the capturing of the first image and the second flash/illumination element may be activated at a second wavelength at a second intensity relative to capturing of the second image. Either or both of the at least two registration points in the first image may be the same or different registration points than in the second image. Any number of registrations points may be used, including, for example, two, three, four, five, six, seven, eight, or more than eight registration points. The number of images may be any number that is more than two images, including, for example, three, four, five, six, seven, eight, nine, ten or more than ten images. The flash/illumination element may be activated for each of the images that are captured or for only a subset of the images that are captured. The intensity level of the flash/illumination element may vary depending on the image or any number of the images, or it may remain constant for more than one image or any number of images, including, for example, all of the images. The length of time that the flash/illumination element may be activated may vary depending on the image or any number of the images, or it may remain constant for more than one image or any number of images, including, for example, all of the images. The wavelength at which the flash/illumination element may be activated may vary depending on the image or any number of the images, or it may remain constant for more than one image or any number of images, including, for example, all of the images. There may be one flash/illumination element or two flash/illumination elements or more than two flash/illumination elements, such as for example, three, four, five, six, or more than six flash/illumination elements. The flash/illumination element or elements that are activated may vary depending on the image or any number of images, or the flash/illumination element or flash/illumination elements that are activated may remain constant for more than one image or any number of images, including, for example, all of the images. Each image may be captured at the same position or at a different position. Alternatively, any number of images may be captured at a first position and any other number of images may be captured at a second position. Another alternative is that any number of images may be captured in any number of positions. For example, any number of images, including one, two, three, four, five, six, seven, eight, nine, ten or more images may be captured at a first position, any number of images, including zero, one, two, three, four, five, six, seven, eight, nine, ten or more images may be captured at a second position, any number of images, including zero, one, two, three, four, five, six, seven, eight, nine, ten or more images may be captured at a third position, any number of images, including zero, one, two, three, four, five, six, seven, eight, nine, ten or more images may be captured at a fourth position, any number of images, including zero, one, two, three, four, five, six, seven, eight, nine, ten or more images may be captured at a fifth position, and the same for a sixth, seventh, eighth, ninth, tenth and greater than tenth position.

In an alternative embodiment, the image capture device includes a compound lens or a holographic optical element (HOE). This compound lens or HOE is used to capture multiple images of the hologram as a single frame. The multiple images may be captured sequentially using one or more flashes/illuminations. For example, a first image may be captured in or by a first portion of the image capture element, for example, such as a CCD, after activation of a first flash/illumination element using a first lens of the compound lens or using a first portion of the HOE. A second image may be captured in or by a second portion of the image capture element, for example, such as a CCD, after activation of a second flash/illumination element using a second lens of the compound lens or using a second portion of the HOE. A third image may be captured in or by a third portion of the image capture elements, for example, such as a CCD, after activation of a third flash/illumination element using a third lens of the compound lens or using a third portion of the HOE. A fourth image may be captured in or by a fourth portion of the image capture element, for example, such as a CCD, after activation of a fourth flash/illumination element using a fourth lens of the compound lens or using a fourth portion of the HOE. A fifth, sixth, seventh, eighth, ninth, tenth or more than ten images may be captured in different portions of the of the image capture element, for example, a CCD, after activation of a flash/illumination element using additional lenses of the compound lens or using additional portions of the HOE. Alternatively, a single flash/illumination element may be activated for each of the images, two flash/illumination elements may be alternatingly activated for the images, three flash/illumination elements may be alternatingly activated for the images, four flash/illumination elements may be alternatingly activated for the images, or five, six, seven, eight, nine, ten or more than ten flash/illumination elements may be alternatingly activated, for example, corresponding to the number of images being captured.

In one or more embodiments, a first lens and a second lens are spaced a predetermined distance apart on the back surface of the mobile device or on a dongle that is designed to be coupled to the mobile device. In one or more embodiments a single flash/illumination element or flash/illumination device is positioned on the back surface of the mobile device equidistant from the first lens and the second lens. In one or more other embodiments, two flash/illumination elements or flash/illumination devices are positioned on the back surface of the mobile device. A first flash/illumination element or device is associated with the first lens and a second flash/illumination element or device is associated with the second lens. In one embodiment, a machine vision system is used to locate the hologram and frame it in the display of the mobile device. When the mobile device is positioned at the appropriate location relative to the hologram, or vice versa, the user is directed to activate the imaging device or camera such that the plurality of lenses capture and transfer images of the hologram to the CCD or other image capture element. Alternatively, when the mobile device is positioned at the appropriate location relative to the hologram, or vice versa, the plurality of lenses automatically captures and transfer images of the hologram to the CCD or other image capture element. In one or more embodiments, the images of the hologram comprises at least a first image captured on a first portion of a CCD or other image capture element and a second image captured on a second portion of the CCD or other image capture element.

Two, three, four, five, or more than five registration points in the hologram may be used to normalize the plurality of images. Normalization of the images may be performed to provide for enhanced analysis using multiple images. Normalization is accomplished using the registration points to adjust the image position and orientation of each image to correspond to the location, position, proportion and/or size of the shape to which the registration points are designed to correspond. For example, if the registration points are designed to correspond to a baseline equilateral triangle having a specific position in the image space, with a first corner at a predefined $x_1$, $y_1$ position, the second corner at a predefined $x_2$, $y_2$ position, and the third corner at a predefined $x_3$, $y_3$ position, then if the image depicts an isosceles triangle, the image is adjusted, for example, rotated or shifted until the triangle is converted into an equilateral triangle (i.e., each of the sides of the triangle is equal in length), and then the entire image size is adjusted (if necessary) to match the size of the baseline equilateral triangle. Finally the image is shifted so that the location of the registration points in the image correspond to the x1, y1 position, x2, y2 position, and x3, y3 position of the corners of the base equilateral triangle with respect to the image space. A similar adjustment and image shifting is performed if the baseline object is another type of triangle, a square, a rectangle, a parallelogram, a quadrilateral, a pentagon, a hexagon, a heptagon, an octagon, a nonagon, a decagon, or any other polygon. A difference is defining additional points to represent each additional corner.

In another embodiment, the compound lens or the HOE may be used to capture a plurality of images of the hologram by the image capture element, for example, such as a CCD, after activation of a single flash/illumination element. Each of the lenses of the compound lens or HOE captures a separate image from a slightly different angle and location. Each lens also captures a slightly different image, as the light from the flash/illumination element or elements is reflected at a different angle for each image and therefore produces a different reflection of points in the different images and a different illumination of the different images.

In another embodiment any plurality of flash/illumination elements may be activated for purposes of capturing any plurality of images by the image capture element, for example, such as a CCD, using the compound lens or the HOE. For example, one, two, three, four, five, six, seven, eight, nine, or ten flash/illumination elements may be activated. Also, as an example, one, two, three, four, five, six, seven, eight, nine, or ten images may be captured. Each of the lenses of the compound lens or HOE captures a separate image from a slightly different angle and location. Each lens also captures a slightly different image, as the light from each of the flash/illumination elements is reflected at a different angle for each image and therefore produces a different reflection of points in the different images and a different illumination of the different images. These different images are used for the processing for purposes of an authentication.

One example of a compound lens that may be used is a fly-eye lens array. Another example of a compound lens is a fiber optic bundle. Another example of a compound lens is a lens array.

In an alternative embodiment, as described above, a first lens may be used to capture one or more images, and a second lens may be used to determine a distance between the imaging element and the hologram being imaged. Alternatively, as described above, a plurality of lenses may be used to capture one or more images, and a distance capture lens may be used to determine a distance between the imaging element and the hologram being imaged. Alternatively, a distance capture capability may be accomplished using one or more of the plurality of lenses used to capture the one or more images.

In some embodiments, the positioning of the hologram is controlled or maintained by one or more brackets, posts, slots, channels, or positioning elements, or any combination of the foregoing. These devices for positioning the hologram are coupled to the mobile device and may be adjustable from a first position to a second position. In some embodiments, the first position is a closed position and the second position is an open position. In some embodiments, one or more of the positioning elements is used to position the hologram in a first position with respect to the image capture element. Alternatively, one or more of the positioning elements is used to position the hologram in a first position with respect to the illumination element or flash element. Alternatively, one or more of the positioning elements is used to position the hologram in a first position with respect to a first image capture element and a second image capture element. Alternatively, one or more of the elements is used to position the hologram in a first position with respect to a first illumination element or flash element and a second illumination element or flash element. Alternatively, one or more of the positioning elements is used to position the hologram in a first position with respect to a first image capture element and in a second position with respect to a second image capture element. Alternatively, one or more of the positioning elements is used to position the hologram in a first position with respect to a first illumination element or flash and in a second position with respect to a second illumination element. In another embodiment, the one or more positioning elements are formed as part of a case for the mobile device.

In some embodiments, the image capture element may capture a plurality of images of the hologram without the need for a positioning element or a guide element. This is accomplished by the use of registration points in the hologram that provide a guide for controlling the capture of the images by the image capture element. The registration points provide an indication to the image capture element that the hologram is in a correct or acceptable position for capturing an image of the hologram and/or activating the illumination element or flash element. Alternatively, the illumination element or flash element is pre-activated when the application is activated. In further alternative embodiments the illumination element or flash element is activated when the hologram is at a predetermined distance from the image capture element. In other embodiments, the registration points provide for scaling and/or adjusting the position or perspective of one or more images after they are captured by the image capture element. In other embodiments, the registration points provide guidance for the analytical engine that analyzes the images captured from the hologram.

After capturing the one or more images, the one or more images may be stored in the memory. The memory may store the one or more images in a conventional format, such as, for example, JPEG, TIFF, PNG, BMP, JP2, or any other image format now known of future developed, or any combination of the foregoing.

The one or more images may be stored temporarily for purposes of uploading to a server as a single image file or data file or as multiple image files or data files. The image or data files may be uploaded to the server as a single transmission of files or as separate transmissions of files. The image or data files may be uploaded to the server during a single transmission session or during multiple transmission sessions. The one or more images may be stored as individual images in image files or as video in a video file. In certain embodiments, the one or more images, image files or video files are uploaded or transmitted to a memory at a server. In other embodiments, the one or more images, image files or video files are pre-processed prior to uploading or transmitting to a server. The pre-processing includes at least one of cropping the image, removing non-relevant portions of the image, such as, for example, non-verification data points, color correcting the image, geometrically adjusting of the image, adjusting the position of the image, adjusting the size of the image, adjusting the perspective of the image, adjusting the angle of the image, rotating the image, adjusting the brightness of the image, and adjusting the focus of the image, or a plurality of the foregoing.

In some embodiments the processor, at the direction of programmed instructions, including pre-programmed instructions, a stored program or program code, or a software application or module, determines which of the captured images are to be sent or uploaded to the server for further processing. In other embodiments the image capture device determines which of the captured images are to be sent or uploaded to the server for further processing. In yet other embodiments, the mobile device determines which of the captured images are to be sent or uploaded to the server for further processing. In other embodiments, all of the captured images are sent or uploaded to the server and the server determines which of the captured images are to be further processed. In yet other embodiments, at least one of the processor, image capture device and mobile device determines a subset of the captured images to be sent or uploaded to the server and the server determines which of the subset of captured images are to be further processed. In other embodiments a plurality of the processor, image capture device and mobile device determine a subset of the captured images to be sent or uploaded to the server and the server determines which of the subset of captured images are to be further processed. In some embodiments, the determination as to which of the captured images are to be sent or uploaded to the server for further processing is based on at least one of the size of the image, the quality of the image, the clarity of the image, the angle of the image, the location or position of the registration points in the image, the color quality of the image, the brightness of the image, and the position of the image, or a plurality of the foregoing. In some embodiments, the determination as to which of the captured images are to be further processed is based on at least one of the size of the image, the quality of the image, the clarity of the image, the angle of the image, the location or position of the registration points in the image, the color quality of the image, the brightness of the image, and the position of the image, or a plurality of the foregoing. In some embodiments, the determination as to which of the subset of captured images are to be further processed is based on at least one of the size of the image, the quality of the image, the clarity of the image, the angle of the image, the location or position of the registration points in the image, the color quality of the image, the brightness of the image, and the position of the image, or a plurality of the foregoing.

In all embodiments, the activities of the processor may be controlled by or directed using programmed instructions, including pre-programmed instructions, a stored program or program code, or a software application or module. Alternatively, the processing may be accomplished using a dedicated processor and EEPROM combination or other hardware combination dedicated for the image processing.

In some embodiments, images are transmitted or sent to the server or uploaded from the mobile device to the server as individual image files in any of a plurality of formats, such as, for example, JPEG, TIFF, PNG, BMP, JP2. In other embodiments, images are sent to the server or uploaded from the mobile device to the server as a video file in any of a plurality of formats, such as, for example, MPEG3, MPEG4, AVI, FLV. In some embodiments the images are transmitted or sent to the server or uploaded from the mobile device to the server as image data files via a mobile data connection. In other embodiments the images are transmitted or sent to the server or uploaded from the mobile device to the server as video data files via a mobile data connection. In some embodiments the images are transmitted or sent to the server or uploaded from the mobile device to the server as image data files via a wifi connection. In other embodiments the images are transmitted or sent to the server or uploaded from the mobile device to the server as video data files via a wifi connection. Alternatively, the connection may be a Bluetooth, WiLan, WirelessHD, WiGig, LTE, 4G, ZigBee, or some other wireless protocol.

The images may be uploaded using a communications protocol such as TCP, PCP, ITP, which are well known in the art, such as described in U.S. Patent Pub. Nos. 20050001024A1, 20050186988A1, 20080299997A1, 20100093273A1, 20110183655A1, and U.S. Pat. Nos. 8,204,540, 8,805,342 and 9,119,052, each of which is incorporated herein in its entirety by reference.

For each of the embodiments described herein, the capturing of an image or images may include capturing image data relating to the image or images, or data that is representational of the image or images, i.e., image data. This is true for the capturing of the first image or the second image, or any other image, and may include capturing image data relating to the first image, the second image, or any other image, or data that is representational of the first image, the second image or any other image, i.e., first image data, second image data, or any other image data. Any other activities performed on or implemented with respect to any images also refers to performing or implementing such activities with respect to the image data. The system may further pre-process or process any of the images, any combination of images, the image data, any combinations of image data from any of the images, or any number of combinations of the foregoing. The pre-processing or processing of the image or image data may include generating a representation of the image or image data. The pre-processing or processing may include pre-processing or processing of any number of images or image data for any number of images.

In some embodiments, the mobile device may provide a second level of verification via the device address of the mobile device, such as, for example, IMEI, IMSI, MEID, not stored in the SIM card or other removable/transferable element in the mobile device. For a communication link to be established and a communication channel to be maintained, the server must verify the device address of the mobile device that is transmitting or sending one or more images. Upon verification of the device address, the system will know that the verification request was sent by the device associated with the hologram to be verified. Upon verification of the device address, the server sends a message or flag to the device indicating that the images may be uploaded. The device then transmits or sends the images to the server or the images are uploaded from the mobile device to the server where the verification is performed using the images. This provides an additional level of security as any security breach will require access to both the device ID and the hologram. The channel that is used may include an independent and/or encrypted band and/or communication protocol within the constellation of network bands and protocols available for transmission of data between the mobile device and the server. The system may exploit the regular channels for Internet communications as well as selective channels for specific devices, such as, for example, SMS for cellular communications, and other device specific channels.

In some embodiments, the mobile device is linked or correlated to the hologram. In some embodiments, this is accomplished by linking a code associated with the mobile device to a code associated with the hologram. For example, the mobile device ID, such as, for example, IMEI, UDID or other unique identifier for the device, which may comprise an alphanumeric code, may be reproduced in the hologram as the identical alphanumeric code that can be captured by the imaging device and sent or transmitted or uploaded to the server for purposes of authentication and verification. In other embodiments, the correlation or linking is accomplished by linking a code associated with the mobile device with an identifier, and linking a code associated with the hologram with an identifier. Thus, the code associated with the mobile device and the code associated with the hologram will be indirectly associated one with the other.

In some embodiments, the server includes a database containing algorithms used for authentication. Each algorithm for authentication is accessed using a unique customer identifier. In other embodiments, the server includes a database in which each algorithm for authentication is accessed using a unique mobile device authentication code or identifier. In yet other embodiments, the server includes a database in which each algorithm for authentication is accessed using a unique identifier that corresponds to the credit card number. In other embodiments, the mobile device authentication code is correlated to the card identification code. The system checks the unique mobile device authentication code or identifier, the unique customer identifier, or the unique identifier that corresponds to the credit card number to confirm the source of the images to be authenticated. Upon confirmation of the unique mobile device authentication code or identifier, the unique customer identifier, or the unique identifier that corresponds to the credit card number to confirm the source of the images to be authenticated, the system analyzes the uploaded images to confirm authenticity of the hologram.

in one or more embodiments, the system incorporates an additional feature that provides for additional security. This feature is a vendor or retailer code. In one or more embodiments, the vendor or retailer code is used as part of a transaction confirmation process. As part of completing a transaction that includes an authentication process, after the one or more images are captured by the user device, the vendor or retailer provides the user with a vendor or retailer code. Alternatively, the system automatically generates or assigns vendor or retailer codes on a permanent basis that is unique to the vendor or retailer. Alternatively, the system generates one or more random codes that are assigned to the vendor or retailer on a per transaction basis. This code is or codes are then input into the device or the application being run by or on the device. In one or more embodiments, the vendor or retailer code is input to the device or application manually. Alternatively, in one or more embodiments, the vendor or retailer code is input to the device or application automatically. Such automatic input may be accomplished in various ways, such as, for example, by imaging a QR or bar code, direct OCR of a captured image, uploading via a bluetooth, wifi, wlan, or other wireless connection, or selection of a vendor name or other identifier via the user device or an application running on the user device. Alternatively, the device or application automatically generates the one or more code. Upon receipt or generation of the vendor or retailer code, the device or the application running on the device uploads the vendor or retailer code to the server, either together with image data or independent of the image data. The server then uses the vendor or retailer code to direct authentication analysis information, such as, for example, an authentication confirmation or denial signal, flag, identifier or message to the vendor or retailer. The vendor or retailer use such authentication confirmation or denial signal, flag, identifier or message to process the transaction request, such as, for example, allowing further processing of the transaction request, denying further processing of the transaction request, or requesting further information from the user.

In one or more alternative embodiments, the vendor or retailer is provide with a transaction code. The transaction code is sent to the server where the authentication analysis is being performed or stored. Upon receipt of the transaction code the system then sends an authentication confirmation or denial signal, flag, identifier or message to the vendor or retailer The vendor or retailer use such authentication confirmation or denial signal, flag, identifier or message to process the transaction request, such as, for example, allowing further processing of the transaction request, denying further processing of the transaction request, or requesting further information from the user.

In one or more alternative embodiments, the server uses the vendor or retailer code to direct authentication analysis information, such as, for example, an authentication confirmation or denial signal, flag, identifier or message to the user. Upon receipt of an authentication confirmation signal, flag, identifier or message, the user then sends the authentication confirmation signal, flag, identifier or message to the vendor or retailer. The authentication confirmation signal, flag, identifier or message, may be sent to vendor or retailer independently or together with the transaction request or together with other information for processing the transaction. The vendor or retailer uses such authentication confirmation or denial signal, flag, identifier or message in processing the transaction request, such as, for example, allowing further processing of the transaction request.

In one or more embodiments, the server uses the vendor or retailer code to direct authentication analysis information, such as, for example, an authentication confirmation or denial signal, flag, identifier or message to both the user and the vendor or retailer. The vendor or retailer uses such authentication confirmation or denial signal, flag, identifier or message to process the transaction request, such as, for example, allowing further processing of the transaction request. Additionally, in one or more embodiments, the user includes such authentication confirmation signal, flag, identifier or message in the transaction request. Upon receipt, the vendor or retailer compares the user provided authentication confirmation signal, flag, identifier or message to the authentication confirmation signal, flag, identifier or message received from the server. Upon confirmation that the authentication confirmation signals, flags, identifiers or messages match, the vendor or retailer processes the transaction. Should the authentication confirmation signals, flags, identifiers or messages not match, the vendor or retailer does not process the transaction. Alternatively, the vendor or retailer may request further information from the user for purposes of processing the transaction.

In one or more embodiment each hologram may be individualized, thereby providing for a unique hologram for each item, for example, each credit or debit card, identification card, gift card, passport, welfare card, Medicare card, or financial instrument. To individualize the holograms, in one or more embodiments, a unique multi digit code is imaged within the body of the hologram. A first portion of the multi digit code is imaged at a first depth within the hologram and a second portion of the multi digit code is imaged at a second depth within the hologram. Alternatively, in one or more other embodiments, the code comprises visual elements or bits of data imaged within the hologram. A first portion of the visual element data or bits of data are imaged at a first depth within the hologram and a second portion of the visual elements data or bits of data are imaged at a second depth within the hologram.

For each multi digit code or visual elements data or bits of data, the server includes a unique decoding algorithm corresponding to the multi digit code or visual elements data or bits of data. The decoding algorithm is used to analyze the images stored in the hologram and determine whether the hologram is authentic. In one or more embodiments, the decoding algorithms are stored in one or more tables. In one or more embodiments, the decoding algorithms are stored in one or more databases. In one or more embodiments the one or more tables are stored in one or more databases.

In one or more embodiments the mobile device includes a display that includes one or more portions that display one or more advertisements while the system is processing the authentication request. The authentication process takes a predetermined period of time to complete. While the authentication process is being implemented, the system displays one or more advertisements to the user. The advertisement may be based on the user's location, such as, for example, the user's geoposition information, distance form one or more cell phone towers, distance from one or more WiFi hotspots, distance from one or more Bluetooth receivers or transmitters or some other location based determination. Alternatively, the advertisement is based on the user's demographic information, purchase history, authentication subject matter, time of day, day of week, day of month, month of year, time of year, user's habits, and/or user's historical information.

For example, in one or more embodiments, upon initiation of an authentication request, the system uploads relevant information regarding the user's location from a server and/or first database. Alternatively, the system uploads relevant information regarding the user's authentication request from the server or a second database. The information regarding the user's location and/or the user's authentication request is obtained via monitoring of the user's interactions with the mobile device and/or the mobile device's interactions with the various networks to which it is connected. The system then pulls advertisement data from one or more ad servers and presents the advertisement data to the user via the display and/or the speaker of the mobile device.

Alternatively, instead of presenting advertisements to the user, the system presents the user with one or more coupons toward or for certain products or services. The one or more coupons are selected by the system and presented to the user via the display of the mobile device. Alternatively, the one or more coupons are selected by the user from various categories presented to the user or via a predetermined profile associated with the user. The predetermined profile is generated by the user via an interface and the user preselecting preferences. Alternatively, the predetermined profile is generated automatically by the system based on monitoring of the user's activities and interactions with the mobile device and/or the one or more networks via which the mobile device interacts. In one or more other embodiments, the predetermined profile is generated by both user selection and automatically by the system. In one or more further embodiments, the predetermined profile is modified by the user, including in real time, when the user determines which coupons are to be downloaded by the system.

In one or more embodiments, in addition to or in place of one or more advertisements and/or one or more coupons, the system presents to the user via the display and/or speaker information about the company and/or product that the user is interacting with via the authentication request and/or that is or are in geographic proximity to the user's location. Alternatively or additionally, the system presents to the user information about a company or product that corresponds to information in the user's predetermined profile.

In one or more embodiments, in addition to or in place of the foregoing, the system presents to the user via the display and/or speaker information about one or accessories for the one or more products that the user is interacting with via the authentication request, that is or are in geographic proximity to the user's location, and/or that relate to the user's activities or interactions with the one or more networks to which the user's mobile device is connected. Alternatively or additionally, the system presents to the user information about an accessory that corresponds to information in the user's predetermined profile.

In one or more embodiments, the system presents the user with one or more advertisements, coupons, company or product information or accessories from or relating to a competitor of the company with which the user is interacting or in connection with which the user is requesting authentication.

In one or more of the previous embodiments, revenue can be generated from the advertisement, coupons or information about a product or company. One model for generating revenues is based on a commission structure of fixed amount corresponding to all click-throughs by the user based on the information presented to the user via the mobile device. An alternative or additional model for generating revenues is based on a commission structure or fixed amount corresponding to all conversions of a user based on the information presented to the user via the mobile device. A combination of any of the foregoing can also be utilized as a revenue model. In one or more embodiments, the amount of the payment or commission is based on the amount of time the information is presented to the user. Alternatively, revenue can be generated as a fixed or variable annual, semi-annual, monthly, weekly or daily amount for the exclusive, semi-exclusive, field exclusive, category exclusive, product exclusive or other limited right to advertise, market or promote via the authentication process using the mobile device.

In one or more embodiments, upon denial of an authentication request, the location of the user mobile device used to upload the images corresponding to the authentication request is determined. The location may be determined by the store code entered into the device for the authentication request, by geo-positioning, triangulation, cell tower identification, wifi hotspot location identification, Bluetooth transmitter/receiver location, or some other technique or combination of location based techniques. The location is then transmitted to law enforcement officials. The law enforcement officials are then able to initiate an immediate investigation as to the status of the credentials of the individual using the item having the hologram, such as, for example, the credit card, debit card, bank card, gift card, Medicare card, welfare card, passport, driver's license, identification card, or some other secure card or security card. One or more law enforcement units then travel to the location of the item having the hologram to investigate the questionable item or use.

In one or more embodiments, one or more holograms on one or more IDs, licenses, passports, credit cards, debit cards, mobile device and/or other items are associated with a unique identifier, such as, for example, a social security number. Therefore, any authentication of the one or more IDs, licenses, passports, credit cards, debit cards, mobile device and/or other items will provide association and/or implied authentication to any one or more of the other IDs, licenses, passports, credit cards, debit cards, mobile device and/or other items.

In one or more embodiments, the system is used to authenticate tax returns. When attempting to submit a tax return electronically, the user must first be authenticated. This is accomplished by taking one or more images of a hologram on the user's ID or credit card using an imaging element or camera on the user's mobile device, pre-processing the one or more images, transferring the one or more images to a server, processing the images at the server using one or more algorithms, determining whether the hologram is authentic based on an analysis of the one or more images, determining whether the mobile device used to transmit the one or more images is associated with the hologram being authenticated. In one or more embodiments, the user social security number is associated with at least one of the hologram and the mobile device. Upon authentication of the ID or credit card, in one embodiment, the IRS receives confirmation of authenticity and allows uploading of the tax return. In another embodiment, the user receives confirmation of authenticity and implements a process, such as, for example, entering a code provided by the authentication system, to enable the IRS system to allow uploading of the tax return. Once a user uploads the tax return, the system and/or the IRS system refuses any further tax return submissions whose authentication is confirmed using an ID or credit card associated with the ID or credit card used to authenticate the first tax return submission. Alternatively, the tax return is accepted and associated with the one or more other tax returns submitted using an associated ID or credit card. The IRS will prevent any refund payments to be issued relating to a tax return associated with any IDs or credit cards where more than a single tax return is submitted for all of the IDs and credit cards. In one or more other embodiments, upon successful upload of the tax return to the IRS, the IRS issues an email or other notification to the email address associated with the ID or credit card used to authenticate the tax return.

In one or more embodiments each purchase card is associated with a unique hologram. In one or more embodiments a plurality of purchase cards are associated with a unique hologram. In one or more embodiments the hologram is embedded in the purchase card. In one or more embodiments the hologram is coupled to the purchase card. In one or more embodiments the hologram is provided independently of the purchase card. In one or more embodiments, the hologram is designed to at least one of degrade, decompose, delaminate, and self-destruct upon any attempt to remove the hologram from the purchase card or the backing to which is it applied. In one or more embodiments the hologram includes a unique code. In one or more embodiments the unique code is a randomized code. In one or more embodiments the unique code is a predetermined code. In one or more embodiments, the unique hologram is issued by a trusted authentication entity.

Upon receipt of the hologram, the user registers the hologram with the trusted authentication entity using one or more mobile devices. This confirms the association between the user and the unique hologram and associates the hologram to one or more mobile devices selected by the user. In one or more embodiments, the user may choose to associate the hologram to one or more additional mobile devices. The confirmation of the association between the user and the unique hologram and the association of the hologram to the user's mobile device is accomplished by capturing at least one image of the hologram at a predetermined position with respect to the image capture device. In one or more embodiments, the at least one image is transmitted to the authentication server where it is stored in a database. In one or more embodiments, the stored at least one image is used for an authentication process. In one or more other embodiments, the confirmation of the association between the user and the unique hologram and the association of the hologram to the user's mobile device is accomplished by capturing a first hologram at a first predetermined position with respect to the image capture device and a second hologram at a second predetermined position with respect to the image capture device. In one or more embodiments, the first image and the second image are transmitted to the authentication server where they are stored in a database.

In one or more embodiments, authentication may be accomplished using two images captured from the hologram. When initiating an authentication process, the user captures a first image and a second image of the hologram from different positions. The positions for capturing the first image and second image may be determined by the mobile device under the control of a processor. The processor may be programmed or provided with instructions for controlling or implementing the process for capturing the first image and the second image. This control may be based on a position of the hologram relative to one or more imaging elements, on a position of one or more registration points in the hologram, the first image, or the second image, or on a position of the second image relative to the first image or any other factor or number of factors. The first image and the second image are sent to the server, pre-processed and sent to the server, or processed and sent to the server, where they are processed, analyzed, and compared one to the other for purposes of authentication.

In one or more embodiments, authentication may be accomplished using one image captured from the hologram and one image previously captured from the hologram that is pre-stored on the mobile device. This pre-storing may be accomplished at any point in time. In one or more embodiments, for example, when registering the hologram, as described above, the application also stores an image captured from the hologram on the mobile device. When initiating an authentication process, the user captures an image of the hologram. The processor may be programmed or provided with instructions for controlling or implementing the process for capturing the image. This control may be based on a position of the hologram relative to one or more imaging elements, on a position of one or more registration points in the hologram, on a position of the image, or on a position of the image relative to the position of the stored image or any other factor or number of factors. The newly captured image and the previously captured image are sent to the server, pre-processed and sent to the server, or processed and sent to the server, where they are processed, analyzed, and compared one to the other for purposes of authentication.

In one or more embodiments, authentication may be accomplished using one image captured from the hologram and one image previously stored in a remote memory, such as, for example, a database storage location. This pre-storing may be accomplished at any point in time. In one or more embodiments, for example, when registering the hologram, as described above, the application also stores an image captured from the hologram in memory, such as, for example, a remote memory, data storage device, or remote database. When initiating an authentication process, the user captures an image of the hologram. The processor may be programmed or provided with instructions for controlling or implementing the process for capturing the image. This control may be based on a position of the hologram relative to one or more imaging elements, on a position of one or more registration points in the hologram, on a position of the image, or on a position of the image relative to the position of the stored image or any other factor or number of factors. The newly captured image and the previously captured image from the memory location are sent to the server, pre-processed and sent to the server, or processed and sent to the server, or if already stored at the server, retrieved from the memory, where they are processed, analyzed, and compared one to the other for purposes of authentication.

In one or more embodiments, authentication may be accomplished using at least a first image and a second image previously captured from the hologram that are pre-stored on the mobile device. This pre-storing may be accomplished at any point in time. In one or more embodiments, for example, when registering the hologram, as described above, the application also stores a plurality of images captured from the hologram on the mobile device, such as for example, the first image and the second image. When initiating an authentication process, the previously captured images are sent to the server, pre-processed and sent to the server, or processed and sent to the server, where they are processed, analyzed, and compared one to the other for purposes of authentication. In one or more embodiments, authentication may be accomplished using at least a first image and a second image previously captured from the hologram that is pre-stored on the mobile device, and one image previously stored in a remote memory, such as, for example, a database storage location. This pre-storing may be accomplished at any point in time. In one or more embodiments, for example, when registering the hologram, as described above, the application also stores an image captured from the hologram on the mobile device and the application also stores an image captured from the hologram in memory, such as, for example, a remote memory, data storage device, or remote database. When initiating an authentication process, the previously captured images are sent to the server, pre-processed and sent to the server, or processed and sent to the server, or if already stored at the server, retrieved from the memory, where they are processed, analyzed, and compared one to the other for purposes of authentication. In one or more embodiments, the images stored on the mobile device may require periodic replacement or updating to confirm authenticity. In one or more embodiments, in place of comparing a first image stored on the mobile device to a second image stored on the mobile device, the first image is compared to a plurality of images stored on the mobile device. In one or more embodiments, in place of comparing a first image stored on the mobile device to a second image stored in the memory, the first image is compared to a plurality of images stored in the memory. In one or more embodiments, in place of comparing a first image stored in the memory to a second image stored in the memory, the first image is compared to a plurality of images stored in the memory.

In one or more embodiments, an authentication process is implemented during transaction processing, by the user selecting authentication processing at the merchant site. The merchant or vendor generates transaction data to be sent to the server, such as, for example, a transaction code. In one or more embodiments, the transaction code includes one or more bits or bytes of data that represent vendor ID, vendor name, transaction identifier, cashier identifier, POS identifier, Year, Month, Day, Time, transaction amount, customer information, a verification code, or other information relating to the transaction, or any combination of the foregoing. In one or more embodiments, the transaction code is sent by the merchant/vendor to a transaction processing server. From the transaction processing server certain information is sent to an authentication application on the user's mobile device. In one or more embodiments, the certain information includes the vendor name and the transaction amount. Alternatively, the certain information may also include one or more of an identification of the items being purchased, a price for each item being purchased, a date and time of the transaction, or a location of the mobile device. According to one or more embodiments, the user enters a verification code into the application and then authorization is performed at the authorization server, either upon completion of entry of the verification code or upon pressing of a button by the user. The user entered verification code is matched to a portion of the transaction code sent by the vendor to allow the transaction to proceed to authentication. According to one or more embodiments, the user does not need to enter the verification code as that is sent directly by the vendor to a transaction processing server and the transaction processing server sends the certain information to the mobile device where the application presents the certain information to the user. The user then has the option of confirming that the certain information is accurate or terminating the transaction.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

The foregoing and other objects are intended to be illustrative of the invention and are not meant in a limiting sense. Many possible embodiments of the invention may be made and will be readily evident upon a study of the following specification and accompanying drawings comprising a part thereof. Various features and sub-combinations of invention may be employed without reference to other features and sub-combinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

Features and advantages of embodiments of the claimed subject matter will become apparent as the following detailed description proceeds, and upon reference to the drawings, wherein like numerals depict like parts. These exemplary embodiments are described in detail with reference to the drawings. These embodiments are non-limiting exemplary embodiments, in which like reference numerals represent similar structures throughout the several views of the drawings.

FIG. 1 illustrates a mobile device having a lens and an illumination ring comprising multiple LEDs, in accordance with an embodiment of the present teaching.

FIG. 2 illustrates an enlarged view of the illumination ring of FIG. 1.

FIG. 7 illustrates a mobile device having a pair of lenses and an illumination elements positioned between the lens, in accordance with an embodiment of the present teaching.

FIG. 8 illustrates a mobile device having a pair of imaging elements, where the imaging elements comprise a lens and an illumination element, in accordance with an embodiment of the present teaching.

FIG. 9 illustrates a mobile device having a lens and a plurality of illumination elements, in accordance with an embodiment of the present teaching.

FIG. 10 illustrates a dongle having an imaging element comprising a lens and an illumination element and one or more additional lenses, in accordance with an embodiment of the present teaching.

FIG. 11 illustrates a dongle having an imaging element comprising a lens and an illumination element, and one or more additional illumination elements, in accordance with an embodiment of the present teaching.

FIG. 12 illustrates a dongle having one or two imaging elements, each comprising a lens and an illumination element, and alternatively having an additional lens, in accordance with an embodiment of the present teaching.

FIG. 13 illustrates a dongle having a pair of imaging elements, each comprising a lens and an illumination ring, in accordance with an embodiment of the present teaching.

FIG. 14 illustrates a dongle having a pair of imaging elements, each comprising a lens and an illumination ring, and alternatively having one or two additional lenses, in accordance with an embodiment of the present teaching.

FIGS. 16A and 16B illustrate a prompting, image framing, and image capture process using the mobile device, in accordance with an embodiment of the present teaching.

DETAILED DESCRIPTION

Figure 4:
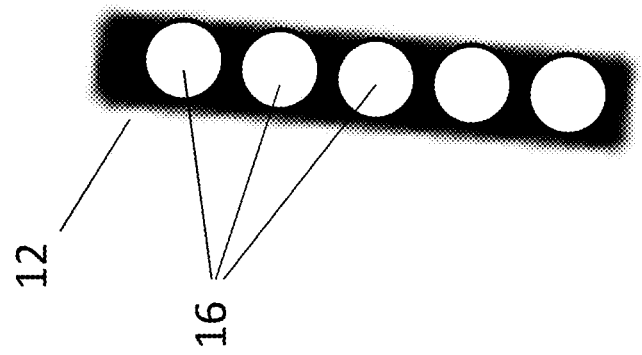
FIG. 4 illustrates an enlarged view of one of the illumination strips of FIG. 3.

Reference will now be made in detail to the embodiments of the present teaching. While the present teaching will be described in conjunction with these embodiments, it will be understood that they are not intended to limit the present teaching to these embodiments.

This disclosure is now described more fully with reference to the set of accompanying illustrative drawings, in which example embodiments of this disclosure are shown. This disclosure may, however, be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art. The present teaching is intended to cover alternatives, modifications and equivalents, which may be included within the spirit and scope of the present teaching as defined by the appended claims.

Features described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although terms first, second, etc., can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of this disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given use of such terms.

If any disclosures are incorporated herein by reference and such disclosures conflict in part and/or in whole with this disclosure, then to the extent of conflict, and/or broader disclosure, and/or broader definition of terms, this disclosure controls. If such disclosures conflict in part and/or in whole with one another, then to the extent of conflict, the later-dated disclosure controls.

Furthermore, in the following detailed description of the present teaching, numerous specific details are set forth in order to provide a thorough understanding of the present teaching. However, it will be recognized by one of ordinary skill in the art that the present teaching may be practiced without these specific details. In other instances, well known methods, procedures, components, and circuits have not been described in detail as not to unnecessarily obscure aspects of the present teaching.

The invention includes both hardware and software elements. In a first embodiment, the invention is implemented as part of a mobile device, which includes, but is not limited to, firmware, resident software, microcode, and hardware components. In a second embodiment, the invention is implemented as a separate dongle or device that may be coupled, either physically or wirelessly to a mobile device, and includes, but is not limited to, firmware, resident software, microcode, and hardware components. In a third embodiment, the invention is implemented as a stand-alone device that communicates with a server or remote processing device, and includes, but is not limited to, firmware, resident software, microcode, and hardware components. In a fourth embodiment, the invention is implemented as a stand-alone device that includes, but is not limited to, firmware, resident software, microcode, and hardware components.

Furthermore, the invention can take the form of a computer program product accessible from a computer-usable or computer-readable medium or memory providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium or memory can be an electronic, magnetic, optical, electromagnetic, infrared, or semiconductor system (or apparatus or device) or a propagation medium. Examples of a computer-readable medium or memory include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

As shown in FIG. 1, there is shown a mobile device 2 comprising an image capture device 4. The image capture device 4 includes a lens 6 and an illumination element 8. The illumination element 8 is shown in greater detail in FIG. 2. In FIG. 2 there is shown a more detailed view of the image capture device 4. As can be seen, the illumination element 8 comprises a plurality of light emitting diodes (LEDs) 10, which, in the embodiment depicted in FIG. 2, equals eight LEDs 10. However, there can be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

Figure 3:
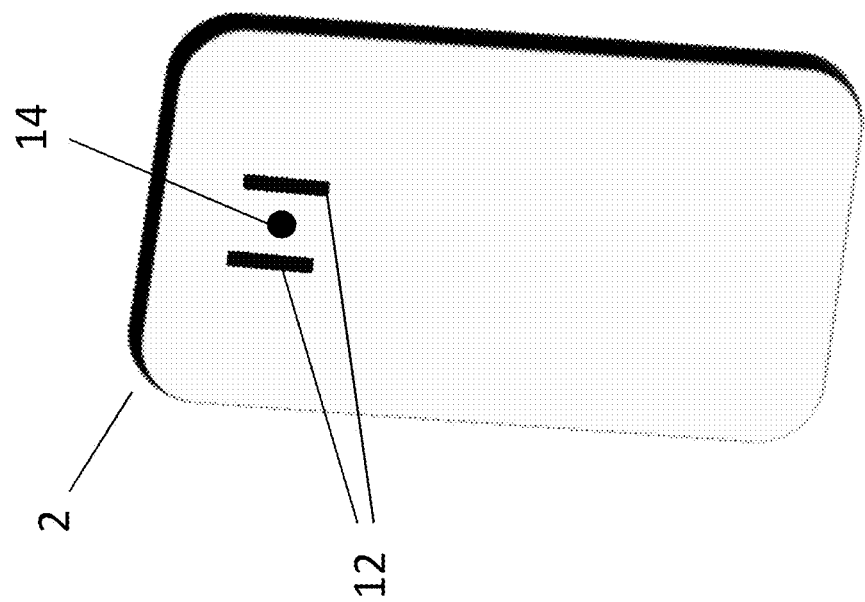
FIG. 3 illustrates a mobile device having a lens and a pair of illumination strips positioned on either side of the lens, each comprising multiple LEDs, in accordance with an embodiment of the present teaching.

Another embodiment of the mobile device 2 is shown in FIG. 3. In FIG. 3, the image capture device comprises a lens 14 and two vertically positioned illumination elements 12, with each of the illumination elements 12 positioned on a different side of the lens 14. A more detailed view of the illumination element 12 is shown in FIG. 4. As can be seen, the illumination element 12 comprises a plurality of LEDs 16, which, in this embodiment, equals 5 LEDs. However, there can be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs. In one embodiment, the LEDs shown in FIG. 4 are the same type of LEDs shown in FIG. 2. In another embodiment of FIG. 4, the LEDs shown in FIG. 4 are a different type of LED than shown in FIG. 2.

Figure 5:
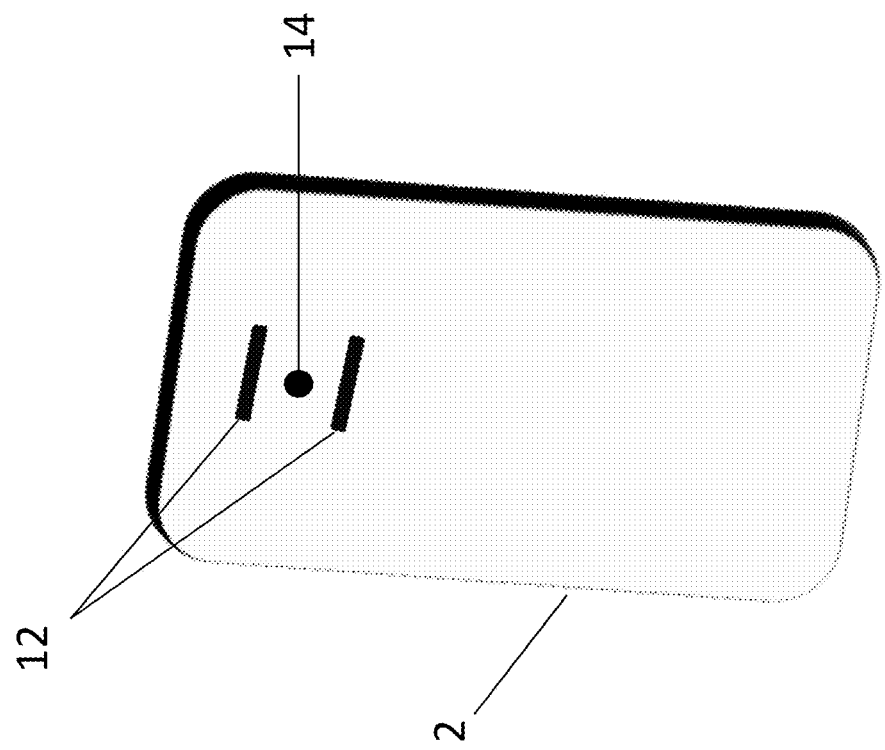
FIG. 5 illustrates a mobile device having a lens and a pair of illumination strips positioned above and below the lens, each comprising multiple LEDs, in accordance with an embodiment of the present teaching.
Figure 6:
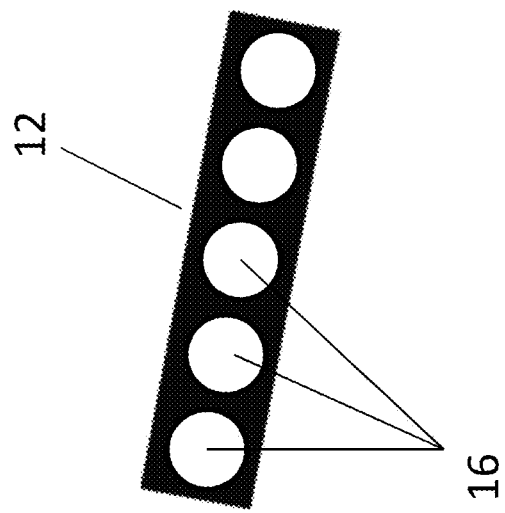
FIG. 6 illustrates an enlarged view of one of the illumination strips of FIG. 5.

A further embodiment of the mobile device 2 is shown in FIG. 5. In FIG. 5, the image capture device comprises a lens 14 and two horizontally positioned illumination elements 12, with one of the illumination elements 12 positioned above the lens 14 and the other of the illumination elements 12 positioned below the leans 14. A more detailed view of the illumination element 12 is shown in FIG. 6. As can be seen, the illumination element 12 comprises a plurality of LEDs 16, which, in this embodiment, equals 5 LEDs. However, there can be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs. In one embodiment, the LEDs shown in FIG. 6 are the same type of LEDs shown in FIG. 2. In another embodiment of FIG. 6, the LEDs shown in FIG. 6 are a different type of LED than shown in FIG. 2.

An additional embodiment of the mobile device 2 is shown in FIG. 7. In FIG. 7, the image capture device comprises a first lens 14, a second lens 20, and a illumination element 18, with the first lens 14 positioned on a first side of the illumination element 18 and the second lens 20 positioned on a second side of the illumination element 18. The distance between at least one of the first lens 14 and the second lens 20 and the illumination element 18 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. The illumination element 18 includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

Yet a further embodiment of the mobile device 2 is shown in FIG. 8. In FIG. 8, the image capture device comprises a first imaging element 4 and a second imaging element 22. The first imaging element 4 comprises a first lens 6 and a first illumination element 8. The second imaging element 22 comprises a second lens 24 and a second illumination element 26. The first imaging element 4 and the second imaging element 22 are separated by a short distance. The distance between the first imaging element 4 and the second imaging element 22 is at least one of about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. One or more of the illumination elements includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

An additional embodiment of the mobile device 2 is shown in FIG. 9. In FIG. 9, the image capture device comprises a lens 14, and one or more illumination elements 18, with the lens 14 positioned adjacent to the one or more of the illumination elements 18. Where a single illumination element 18 is included, it may be positioned above, below, to the right or to the left of the lens 14. Where more than one illumination element 18 is included, the illumination elements may be positioned above and below, to the right and to the left, or at any other locations or combination of locations relative to the lens 14. The distance between the lens 14 and at least one of the illumination elements 18 or between the illumination elements is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. One or more of the illumination elements includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

In FIG. 10 there is shown a dongle 30 that is coupled to the mobile device 2. The dongle 30 is coupled to the mobile device 2 via connector 34. The dongle 30 comprises an imaging element 4. The imaging element 4 comprises a lens 6 and a first illumination element 8. In another embodiment there are additional lenses, including lens 14 and lens 20. The distance between each of lenses 14 and 20 and the imaging element 4 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. In yet another embodiment there are additional lenses, including lens 28 and lens 32. The distance between each of lenses 28 and 32 and the imaging element 4 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. In one or more embodiments, the lenses 28 and 32 are not on a horizontal line with the first imaging element 4. In one or more elements, the distance between each of the lenses 14, 20, 28 and 32 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. The illumination element includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

In FIG. 11 there is shown a dongle that is designed for coupling to the mobile device 2. The dongle is coupled to the mobile device 2 via connector 34. The dongle comprises an imaging element 4. The imaging element 4 comprises a lens 6 and a first illumination element 8. In other embodiments there are additional illumination elements, including one or more of illumination elements 18, 35, 36 and 37. The one or more illumination elements 18, 35, 36, and 37 are positioned adjacent to the lens 6. Where the first illumination element 8 is included, it may be positioned around the lens 6. Where the first illumination element is included or not included, and where a second illumination element 18 is included, illumination element 18 is located above, below, to the right or to the left of the lens 16. Where the first illumination element is included or not included, and more than one other illumination element is included, for example at least two of illumination elements 18, 35, 36 and 37, the illumination elements may be positioned above and below, to the right and to the left, or any other locations or combination of locations relative to the lens 6. The distance between the lens 6 and at least one of the illumination elements 18, 35, 36 and 37, or between each of the illumination elements 18, 35, 36 and 37 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. One or more of the illumination elements includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

In FIG. 12 there is shown a dongle that is designed for coupling to the mobile device 2. The dongle is coupled to the mobile device 2 via connector 34. The dongle comprises a first imaging element 4. The first imaging element 4 comprises a first lens 6 and a first illumination element 8. In other embodiments there is a second imaging element 22. The second imaging element 22 comprises a second lens 24 and a second illumination element 26. In yet other embodiments, there is a third lens 14. The second lens 24 and third lens 18 may be positioned at any location relative to the first lens 6. The distance between the first lens 6 and at least one of the second lens 24, the third lens 18, and the second illumination element 26, or between each of the illumination elements 8 and 28 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. One or more of the illumination elements includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

In FIG. 13 there is shown a dongle that is designed for coupling to the mobile device 2. The dongle is coupled to the mobile device 2 via connector 34. The dongle comprises a first imaging element 4. The first imaging element 4 comprises a first lens 6 and a first illumination element 8. In other embodiments there is a second imaging element 22. The second imaging element 22 comprises a second lens 24 and a second illumination element 26. The second lens 24 may be positioned at any location relative to the first lens 6. The distance between the first lens 6 and at least one of the second lens 24, and the second illumination element 26, or between each of the illumination elements 8 and 28 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. One or more of the illumination elements includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

In FIG. 14 there is shown a dongle that is designed for coupling to the mobile device 2. The dongle is coupled to the mobile device 2 via connector 34. The dongle comprises a first imaging element 4. The first imaging element 4 comprises a first lens 6 and a first illumination element 8. In other embodiments there is a second imaging element 22. The second imaging element 22 comprises a second lens 24 and a second illumination element 26. In yet other embodiments, there is a third lens 14. In yet other embodiments, there is a fourth lens 20. The second lens 24, third lens 14, and fourth lens 20 may be positioned at any location relative to the first lens 6. In one or more embodiments, the third lens 14 and the fourth lens 20 are spaced apart from each other and positioned between and equidistance from each of the first lens 6 and the second lens 24. The distance between the first lens 6 and at least one of the second lens 24, the third lens 14, the fourth lens 20, and the second illumination element 26, or between each of the illumination elements 8 and 28 is at least one of about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, and greater than 40 mm. One or more of the illumination elements includes one or more LEDs, which may be any number of LEDs, such as, for example, 1 LED, 2 LEDs, 3 LEDs, 4 LEDs, 5 LEDs, 6 LEDs, 7 LEDs, 8 LEDs, 9 LEDs, 10 LEDs, 11 LEDs, 12 LEDs, or greater than 12 LEDs.

Figure 15:
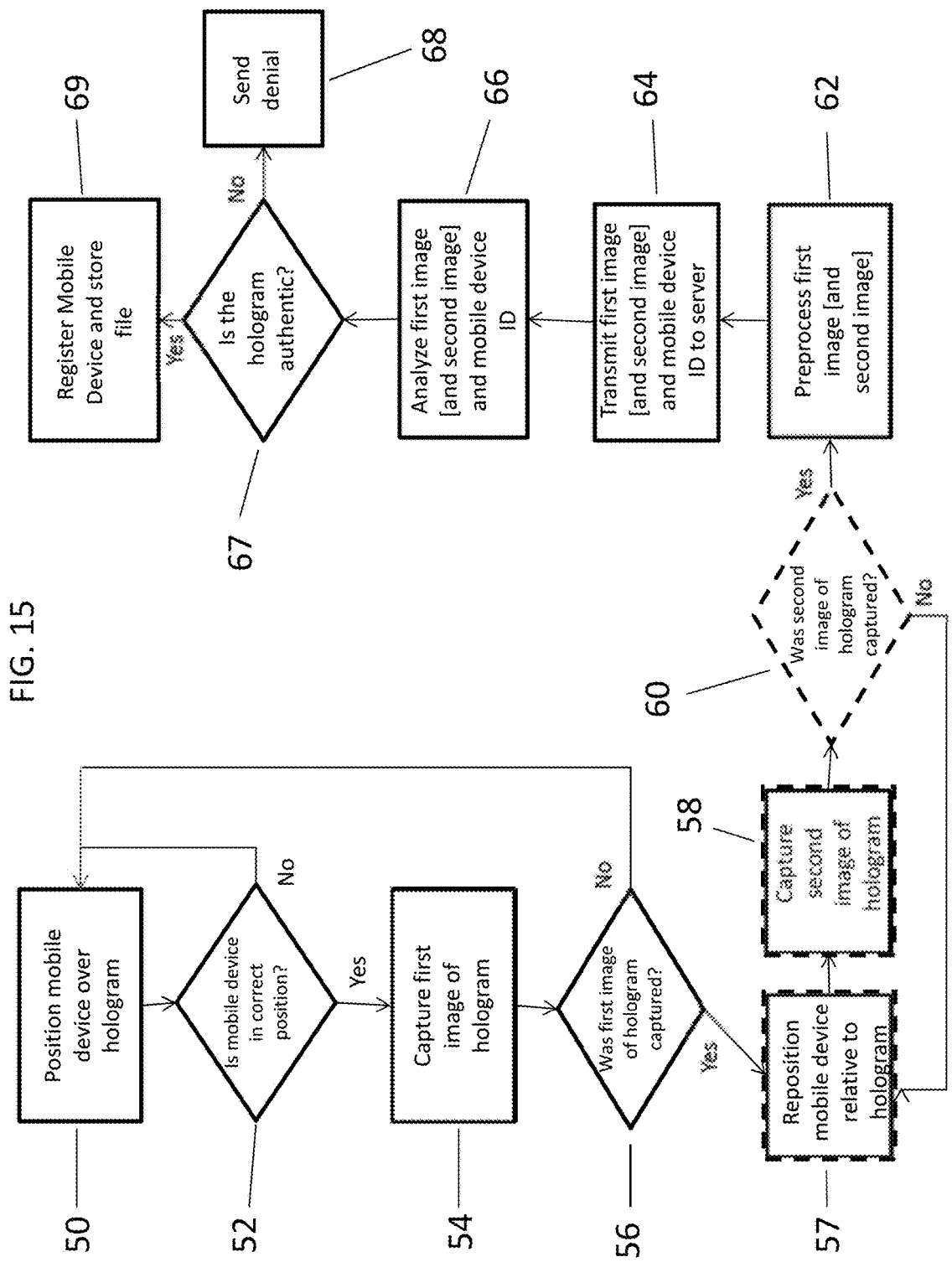
FIG. 15 illustrates a method for registering a credit card with an authentication software application using a mobile device, in accordance with an embodiment of the present teaching.

In FIG. 15 there is shown a method and process for registering a credit card with an authentication software application using a mobile device. As part of the registration process for a user to register a payment card to be used as part of a payment process in accordance with the present invention, the software application is first activated. The software application can be activated by launching the software application from the mobile device desktop. Alternatively, where the user is interfacing with a computer, the software application is activated by launching it from the desktop. After activation of the software application, the user is prompted for and enters personal information such as, for example, full name, phone number, address. The software application next requests the user to provide information to identify the payment card to be used and a password to be associated with that payment card. Once the requested information is entered or gathered, in step 50, the user is prompted and guided in the positioning of the mobile device with respect to the hologram on the payment card. One embodiment of such guidance and prompting is described in more detail with respect to FIGS. 16A and 16B. In step 52, it is determined whether the mobile device is properly positioned with respect to the hologram so as to allow capture of an image of the hologram. If the mobile device is not properly positioned, either after a fixed period of time, or continually, the user is returned to step 50 and the user is notified about the incorrect position. The user may then adjust the position of the mobile device such that it becomes properly positioned relative to the hologram. If the mobile device is properly positioned, an image of the hologram is automatically taken, in step 54, using an image capture device. Alternatively, the image may be taken manually by the user upon an indication by the app that the hologram is in the proper position. In step 56, the app analyzes the image and confirms whether the image was accurately captured. If the image is not properly captured, the process returns to step 50, where the mobile device guides the user in re-positioning the image capture device with respect to the hologram.

In certain embodiments, including higher security applications, one or more additional images of the hologram are captured. In this process, after the first image is captured, in step 57 the user is directed to reposition the mobile device such that it is positioned at a different location with respect to the hologram. Once the mobile device is repositioned to the proper location, in step 58, a second image is captured by the imaging element. In certain embodiments, the image capture occurs automatically when the mobile device is positioned at the correct location for image capture with respect to the hologram. In some embodiments this occurs through the use of registration points on the hologram. In other embodiments, the image capture is accomplished through user input when the mobile device is positioned in the correct location for image capture with respect to the hologram, as illustrated in steps 50-56. In certain embodiments, the user assisted image capture is achieved in conjunction with feature changes in the display, as described in greater detail with respect to FIGS. 16a and 16b. This image capture is confirmed in step 60. If the second image is not properly captured the process returns to step 56, and the user is notified to reposition the mobile device. In some embodiments this notification is accomplished via the display. In some embodiments, the display displays textual messages that provide notification or direction for the user relating to repositioning of the mobile device. In other embodiments, the display displays non-textual queues to help notify or direct the user relating to repositioning of the mobile device.

If the first image is properly captured, in step 62 the first image is pre-processed. Pre-processing includes at least one of filtering, masking, cropping, color adjustment, re-sizing, brightness adjustment, hue adjustment, or tone adjustment. In certain embodiments, where a second image is captured, if the first image and the second image are properly captured, in step 62 the first image and the second image are pre-processed. Pre-processing includes at least one of filtering, masking, cropping, color adjustment, re-sizing, brightness adjustment, hue adjustment, or tone adjustment. Alternatively, in certain embodiments, the pre-processing of the first image occurs after capturing of the first image prior to capturing of the second image. The pre-processing of the second image occurs after capturing of the second image. In certain embodiments, there is no pre-processing of the first image. In other embodiments, there is no preprocessing of the second image. In yet other embodiments, there is no preprocessing of the first image or second image.

After image capture and/or image pre-processing (when pre-processing is included), in Step 64 the first image and/or the second image is transmitted to a server. In certain embodiments, the first image and/or second image is transmitted together with an identification code unique to the mobile device. The format of the identification code may be an IMEI (a 15 digit code generated when the device is first booted), UDID (a 40-character string assigned to certain Apple devices including the iPhone, iPad, and iPod Touch, where each UDID character is a numeral or a letter of the alphabet), MEID, or ESN code. Upon receipt at the server, in step 66 the first image is analyzed. The analysis includes comparing the first image to a first stored image of the hologram. In other embodiments upon receipt at the server, in step 66 the first image and the second image are analyzed. In the other embodiments, the analysis includes comparing the first image to a first stored image of the hologram and comparing the second image to a second stored image of the hologram. In certain embodiments, after analysis of the first image an inquiry is made in step 67 as to whether the hologram is authentic. In other embodiments, after analysis of the first image and the second image an inquiry is made in step 67 as to whether the hologram is authentic. If the hologram is determined to not be authentic or if authenticity cannot be confirmed, in step 68 a notification is sent to the user that registration is denied. In certain embodiments in step 68 a notification is sent to the credit card issuer that registration is denied. In certain other embodiments in step 68 a notification is sent to both the user and the credit card issuer. If the hologram is determined to be authentic, in step 69 the mobile device is registered, the first image file is stored, and a notification is sent to the user. In other embodiments, in step 69 the mobile device is registered, the first image file and the second image file are stored and a notification is sent to the user. In other embodiments, in step 69 the mobile device is registered, the first image file is stored and a notification is sent to the card issuer. In yet other embodiments, in step 69 the mobile device is registered, the first image file and the second image file are stored and a notification is sent to the card issuer. In further embodiments, in step 69 the mobile device is registered, the first image file is stored and a notification is sent to both the user and the credit card issuer. In yet a further embodiment, in step 69 the mobile device is registered, the first image file and the second image file are stored and a notification is sent to both the user and the credit card issuer.

In FIGS. 16A and 16B there is shown a device and method for prompting and guiding the positioning of the mobile device by a user with respect to the hologram on the payment card. First looking at FIG. 16A, when the mobile device 2 is positioned with respect to the hologram (not shown), the image of the hologram in the display 49 is located in a first position 42. The image capture box 48 is located at a position to the right and downward relative to first position 42. After detecting the first position 42, a message 44 is conveyed to the user to reposition the mobile device 2 upward and to the left. Upon repositioning the mobile device to a second position 46, the mobile device 2 again notifies the user that the mobile device 2 should be repositioned upward and to the left. The user can observe this movement in the display 49 of the mobile device 2. In certain embodiments, the image capture box 48 has a solid outline. In other embodiments, the image capture box comprises at least one of a dashed line, a pulsating line, a flickering line, a colored line, or a bold line, or any other design or form of line. In FIG. 16B, when the mobile device 2 is positioned with respect to the hologram (not shown), the image of the hologram in the display 78 is in a first position 70. The image capture box 76 is located at a position to the left and downward relative to first position 70. After detecting the first position 70, a message 72 is conveyed to the user to reposition the mobile device 2 upward and to the right.

Upon repositioning the mobile device to a second position 74, the mobile device 2 again notifies the user that the mobile device 2 should be repositioned upward and to the right. The user can observe this movement in the display 78 of the mobile device 2. In certain embodiments, the image capture box 76 has a solid outline. In other embodiments, the image capture box comprises at least one of a dashed outline, a pulsating outline, a flickering outline, a colored outline, or a bold outline, or any other design or form of outline.

Figure 17:
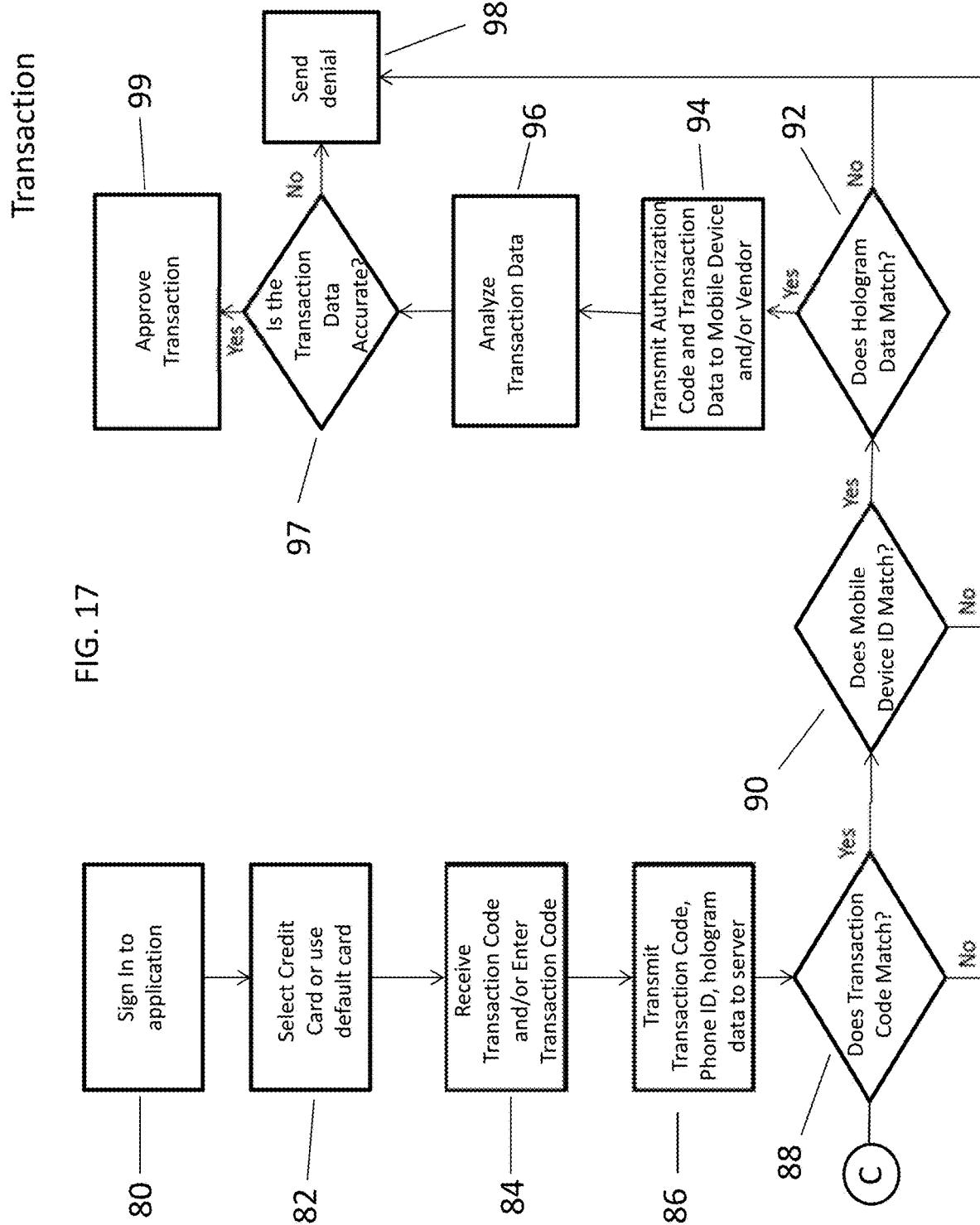
FIG. 17 illustrates a method for authentication of a transaction, in accordance with an embodiment of the present teaching.

Looking now at FIG. 17, there is shown an embodiment of an authentication process according to the present disclosure. In step 80, a user signs in to the application. In step 82, the user selects the purchase card to be used for the transaction. In some embodiments, there is a preset purchase card that is utilized for each transaction. Where a preset purchase card is utilized, the user may select an alternative purchase card for the transaction. Upon completion of the transaction the system will revert to using the preset purchase card. Alternatively, the user may reset the purchase card which setting will remain until revised by the user. In step 84, a transaction code generated by the merchant is entered by the user into the software application running on the mobile device. In other embodiments, the transaction code generated by the merchant is automatically uploaded to the mobile device. This can be accomplished, for example, by the user tapping the mobile device to the merchant terminal, scanning a code, such as, for example, a bar code or QR Code, through a wireless signal, such as, for example, WiFi, Bluetooth, WiLan, IR, or any future developed wireless communication technology, or entered via the image capture device on the mobile device, or manually by the user into the software application running on the mobile device.

In step 86, the transaction code, the mobile device identifier, and the image data are transmitted to the server. In certain embodiments, the transmission of one or more of the transaction code, the mobile device identifier, and the image data are transmitted to the server independently of the others, for example, as discussed above. In step 88, the server determines whether the transaction code matches a transaction code received by the server from the merchant with whom the user is interacting. If the transaction code does not match, in step 98 the server sends a notification to the mobile device that the transaction code is incorrect. In certain embodiments, the server sends a notification to the mobile device that the transaction has been denied, failure, or that the user should retry or reenter the transaction code. If the transaction code matches or, after reentering the transaction code, the transaction code matches, then, in step 90, the server determines whether the mobile device ID matches the mobile device ID stored with respect to that user and that hologram image. If the mobile device ID does not match the mobile device ID stored with respect to that user then, in step 98 the server sends a notification to the mobile device that an incorrect or unauthorized mobile device is being used. In certain embodiments, the server sends a notification to the mobile device that the transaction has been denied, failure, or that the user should retry initiating the transaction using the correct device. If the mobile device ID matches or, after reinitiating the transaction, the mobile device ID matches, then, in step 92, the server determines whether the image data matches the image data stored by the server upon registration of the hologram and mobile device. In some embodiments, the image data is not stored in the server, but instead is stored by the card issuer. In further embodiments, the image data is stored on the mobile device or in a secure database with which the mobile device communicates. In certain embodiments, the image data is an image file, such as, for example, jpg, tif, png, gif, bpg, or any other image file format. In other embodiments, the image data is a hash file generated from the image data obtained when the image of the hologram is capture via an image capture device. The hashing of the image data may be accomplished using any known hashing algorithms, such as, for example, BLAKE 256, BLAKE 512, ECOH, FSB, GOST, NAVAL, JH, MD5, MD6, RIPEMD-320, SHA-256, SHA-512, SWIFT, Whirlpool, or any other one way hashing or encrypting algorithm. If the image data does not match the image data stored by the server upon registration of the hologram and mobile device, then, in step 98 the server sends a notification to the mobile device that the payment card is invalid. In certain embodiments, the server sends a notification to the mobile device that the transaction has been denied, failure, or that the user should retry initiating the transaction using a correct payment card. In some embodiments, the image data is not stored in the server, but instead is stored by the card issuer. In further embodiments, the image data is stored on the mobile device or in a secure database with which the mobile device communicates. In certain embodiments, if the payment was reported stolen, a notification is also sent to law enforcement, the merchant, and/or the card issuer, that a transaction has been initiated using a stolen payment card. If the image data matches the image data stored by the server upon registration of the hologram and mobile device, then in step 94 the server transmits an authorization code to the merchant. In certain embodiments, the server transmits the authorization code to the mobile device. In certain embodiments, the server transmits the authorization code to the mobile device and the merchant. In certain embodiments, the server also transmits transaction data to the merchant. In certain embodiments, the server also transmits transaction data to the mobile device. In certain embodiments, the server also transmits transaction data to the merchant and the mobile device.

Upon receipt of the transaction data, in step 96, the mobile device analyzes the transaction data to determine whether the transaction data is accurate. The analysis is accomplished by the mobile device comparing the transaction data corresponding to the transaction code with the transaction data received from the server. In certain embodiments, the analysis is accomplished by the user comparing the transaction data as provided by the merchant to the transaction data as received from the server. In certain other embodiments, the analysis is accomplished by the server comparing the transaction data sent by the merchant to the server to the transaction code sent to the server by the mobile device. In step 97, the mobile device determines whether the transaction data is accurate. In certain embodiments, the server determines whether the transaction data is accurate. If the transaction data is not accurate, in step 98, the server sends a transaction denial message to the mobile device. In certain embodiments, the server sends a notification to the mobile device that the transaction has been denied, failure, or that the user should recheck the transaction data. In certain embodiments, If the transaction data is not accurate, in step 98, the mobile device sends a transaction denial message to the server. In certain embodiments, the mobile device sends a notification to the server that the transaction has been denied, failure, or that the server should contact the merchant regarding reconfirming or correcting the transaction data. If the transaction data is accurate, in step 99 the server approves the transaction and the transaction is completed via the server. In other embodiments, if the transaction data is accurate, in step 99 the mobile device approves the transaction and communicates with the server to complete the transaction.

Figure 18A:
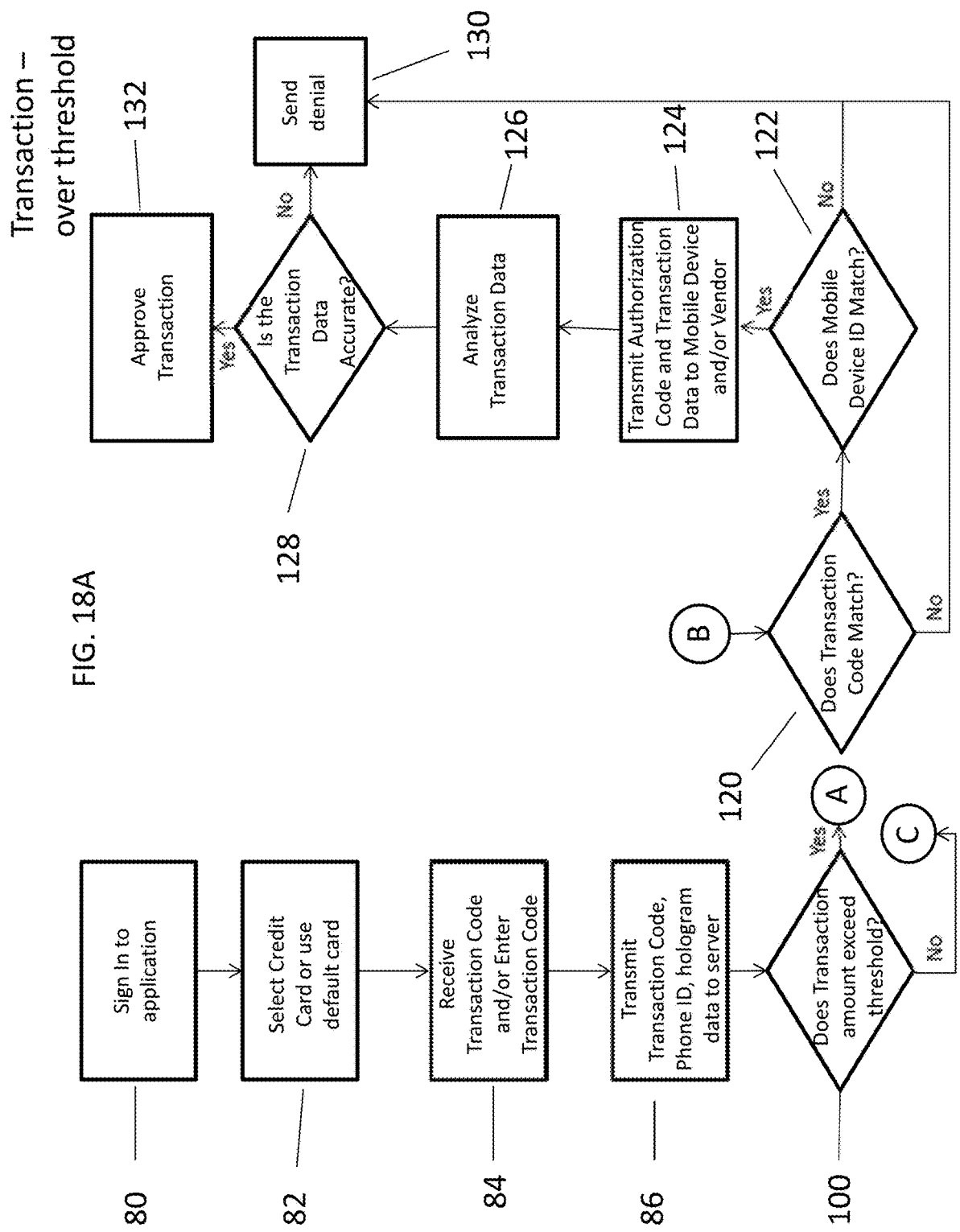
FIGS. 18A and 18B illustrate a method for authentication of a transaction, in accordance with another embodiment of the present teaching.
Figure 18B:
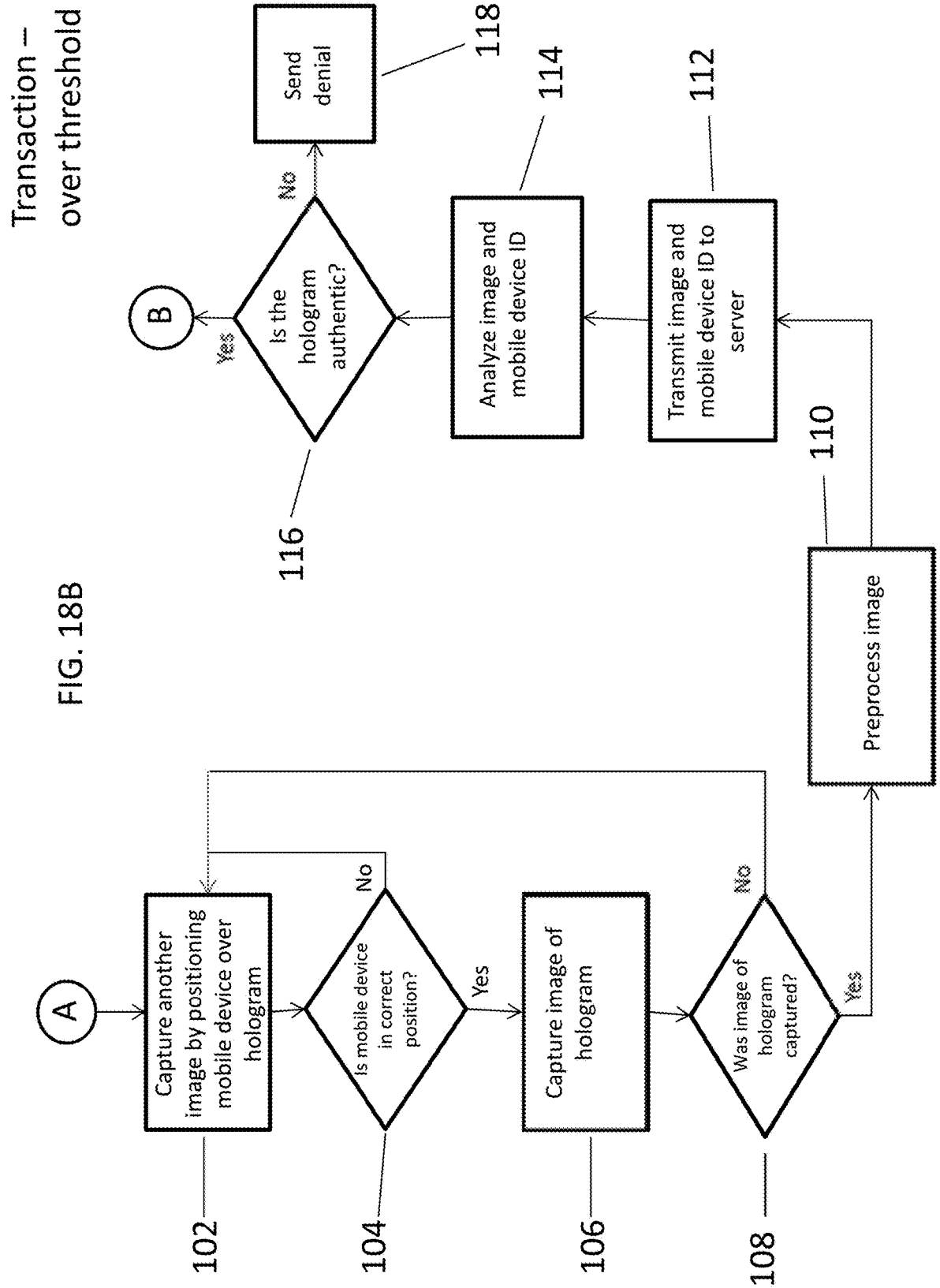

Looking now at FIG. 18A, there is shown a method where the system analyzes the transaction amount to determine whether the transaction exceeds a threshold limit according to an embodiment of the present disclosure. Steps 80-86 are identical to steps 80-86 from FIG. 17. At step 100, the server queries whether the transaction amount is greater than a predetermined threshold value. In other embodiments, the server queries whether the transaction amount is greater than or equal to a predetermined threshold value. In other embodiments, the mobile device queries whether the transaction amount is greater than a predetermined threshold value. In other embodiments, the mobile device queries whether the transaction amount is greater than or equal to a predetermined threshold value. If the transaction amount is greater than the predetermined threshold value, then following connector A to FIG. 18B, in step 102 the user is directed to capture another image of the hologram by positioning the mobile device with respect to the hologram on the payment card. One embodiment of such guidance and prompting is described in more detail with respect to FIGS. 16A and 16B. In step 104, it is determined whether the mobile device is properly positioned with respect to the hologram so as to allow capture of an image of the hologram. If the mobile device is not properly positioned, either after a fixed period of time, or continually, the user is returned to step 102 and the user is notified about the incorrect position. The user may then adjust the position of the mobile device such that it becomes properly positioned relative to the hologram. If the mobile device is properly positioned, an image of the hologram is automatically taken, in step 106, using an image capture device. Alternatively, the image may be taken manually by the user upon an indication by the app that the image is in the proper position. In step 108, the app analyzes the image and confirms whether the image was accurately captured. If the image is not properly captured, the process returns to step 102, where the mobile device guides the user in re-positioning the image capture device with respect to the hologram.

If the first image is properly captured, in step 110 the first image is pre-processed. Pre-processing includes at least one of filtering, masking, cropping, color adjustment, re-sizing, brightness adjustment, hue adjustment, or tone adjustment. In certain embodiments, where a second image is captured, if the first image and the second image are properly captured, in step 110 the first image and the second image are pre-processed. Pre-processing includes at least one of filtering, masking, cropping, color adjustment, re-sizing, brightness adjustment, hue adjustment, or tone adjustment. Alternatively, in certain embodiments, the pre-processing of the first image occurs after capturing of the first image prior to capturing of the second image. The pre-processing of the second image occurs after capturing of the second image. In certain embodiments, there is no pre-processing of the first image. In other embodiments, there is no preprocessing of the second image. In yet other embodiments, there is no preprocessing of the first image or second image.

After image capture and/or image pre-processing (when pre-processing is included), in Step 112 the first image and/or the second image is transmitted to a server. In certain embodiments, the first image and/or second image is transmitted together with an identification code unique to the mobile device. The format of the identification code is described in greater detail above. Upon receipt at the server, in step 114 the first image is analyzed. The analysis includes comparing the first image to a first stored image of the hologram. In other embodiments upon receipt at the server, in step 114 the first image and the second image are analyzed. In the other embodiments, the analysis includes comparing the first image to a first stored image of the hologram and comparing the second image to a second stored image of the hologram. In certain embodiments, after analysis of the first image an inquiry is made in step 116 as to whether the hologram is authentic. In other embodiments, after analysis of the first image and the second image an inquiry is made in step 116 as to whether the hologram is authentic. If the hologram is determined to not be authentic or if authenticity cannot be confirmed, in step 118 a notification is sent to the user that registration is denied. In certain embodiments in step 118 a notification is sent to the credit card issuer that registration is denied. In certain other embodiments in step 118 a notification is sent to both the user and the credit card issuer. If the hologram is determined to be authentic, the process proceeds following connector B back to FIG. 18A to step 120. In step 120, the server determines whether the transaction code matches a transaction code received by the server from the merchant with whom the user is interacting. If the transaction code does not match, in step 130 the server sends a notification to the mobile device that the transaction code is incorrect. In certain embodiments, the server sends a notification to the mobile device that the transaction has been denied, failure, or that the user should retry or reenter the transaction code. If the transaction code matches or, after reentering the transaction code, the transaction code matches, then, in step 122, the server determines whether the mobile device ID matches the mobile device ID stored with respect to that user and that hologram image.

If the image data matches the image data stored by the server upon registration of the hologram and mobile device, then in step 124 the server transmits an authorization code to the merchant. In certain embodiments, the server transmits the authorization code to the mobile device. In certain embodiments, the server transmits the authorization code to the mobile device and the merchant. In certain embodiments, the server also transmits transaction data to the merchant. In certain embodiments, the server also transmits transaction data to the mobile device. In certain embodiments, the server also transmits transaction data to the merchant and the mobile device.

Upon receipt of the transaction data, in step 126, the mobile device analyzes the transaction data to determine whether the transaction data is accurate. The analysis is accomplished by the mobile device comparing the transaction data corresponding to the transaction code with the transaction data received from the server. In certain embodiments, the analysis is accomplished by the user comparing the transaction data as provided by the merchant to the transaction data as received from the server. In certain other embodiments, the analysis is accomplished by the server comparing the transaction data sent by the merchant to the server to the transaction code sent to the server by the mobile device. In step 128, the mobile device determines whether the transaction data is accurate. In certain embodiments, the server determines whether the transaction data is accurate. If the transaction data is not accurate, in step 130, the server sends a transaction denial message to the mobile device. In certain embodiments, the server sends a notification to the mobile device that the transaction has been denied, failure, or that the user should recheck the transaction data. In certain embodiments, If the transaction data is not accurate, in step 130, the mobile device sends a transaction denial message to the server. In certain embodiments, the mobile device sends a notification to the server that the transaction has been denied, failure, or that the server should contact the merchant regarding reconfirming or correcting the transaction data. If the transaction data is accurate, in step 132 the server approves the transaction and the transaction is completed via the server. In other embodiments, if the transaction data is accurate, in step 132 the mobile device approves the transaction and communicates with the server to complete the transaction.

If in step 100, the transaction amount does not exceed the threshold value, then following connector C to FIG. 17, the transaction is processed in accordance with the remaining steps as set forth above with respect to FIG. 17.

Figure 19:
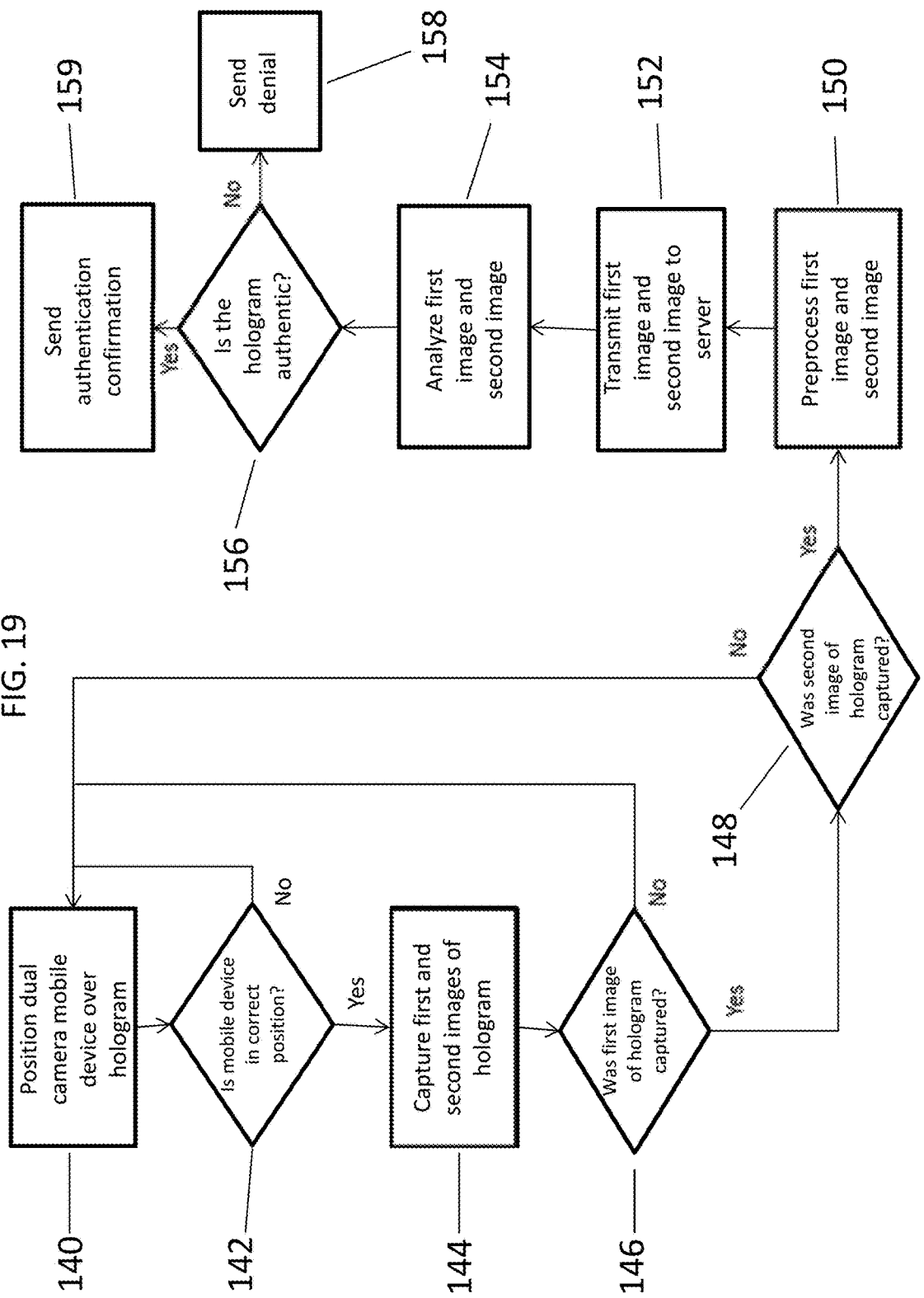
FIG. 19 illustrates a method for authentication of a transaction using a dual image capture system, in accordance with an embodiment of the present teaching.

A dual image capture system is described with respect to FIG. 19. In step 140, the user is prompted and guided in the positioning of the mobile device with respect to the hologram on the payment card. One embodiment of such guidance and prompting is described in more detail with respect to FIGS. 16A and 16B. In step 142, it is determined whether the mobile device is properly positioned with respect to the hologram so as to allow capture of an image of the hologram. If the mobile device is not properly positioned, either after a fixed period of time, or continually, the user is returned to step 140 and the user is notified about the incorrect position. The user may then adjust the position of the mobile device such that it becomes properly positioned relative to the hologram. If the mobile device is properly positioned, a first image and a second image of the hologram is automatically taken, in step 144, using a dual image capture device. Alternatively, the first image and second image may be taken manually by the user upon an indication by the app that the hologram is in the proper position. In certain embodiments, the first image and the second image are captured at least one of sequentially or at substantially the same time. In certain embodiments, the first image and second image are captured using a device as shown in at least one of FIGS. 7-14. In step 146, the first image is analyze and it is determined whether the first image was accurately captured. If the first image is not properly captured, the process returns to step 140, where the mobile device guides the user in re-positioning the image capture device with respect to the hologram. In step 148, the second image is analyzed and it is determined whether the second image was accurately captured. If the second image is not properly captured, the process returns to step 140, where the mobile device guides the user in re-positioning the image capture device with respect to the hologram.

If the first image and second image are properly captured, in step 150 the first image and second image are pre-processed. Pre-processing includes at least one of filtering, masking, cropping, color adjustment, re-sizing, brightness adjustment, hue adjustment, or tone adjustment. Alternatively, in certain embodiments, the pre-processing of the first image occurs after capturing of the first image prior to capturing of the second image. The pre-processing of the second image occurs after capturing of the second image. In certain embodiments, there is no pre-processing of the first image. In other embodiments, there is no preprocessing of the second image. In yet other embodiments, there is no preprocessing of the first image or second image.

After image capture and/or image pre-processing (when pre-processing is included), in Step 152 the first image and/or the second image is transmitted to a server. In certain embodiments, the first image and/or second image is transmitted together with an identification code unique to the mobile device. The format of the identification code is described in greater detail above. Upon receipt at the server, in step 154 the first image and/or the second image is analyzed. The analysis includes comparing the first image to a first stored image of the hologram and/or the second image to a second stored image of the hologram. In other embodiments upon receipt at the server, in step 154 the first image and the second image are analyzed. In the other embodiments, the analysis includes comparing the first image to a first stored image of the hologram and comparing the second image to a second stored image of the hologram. In certain embodiments, after analysis of the first image an inquiry is made in step 156 as to whether the hologram is authentic. In other embodiments, after analysis of the first image and the second image an inquiry is made in step 156 as to whether the hologram is authentic. If the hologram is determined to not be authentic or if authenticity cannot be confirmed, in step 158 a notification is sent to the user that registration or authentication is denied. In certain embodiments in step 158 a notification is sent to the credit card issuer that registration or authentication is denied. In certain embodiments in step 158 a notification is sent to the merchant that registration or authentication is denied. In certain other embodiments in step 158 a notification is sent to at least two of the user, the credit card issuer, or the merchant. If the hologram is determined to be authentic, the process proceeds to step 159.

Figure 20:
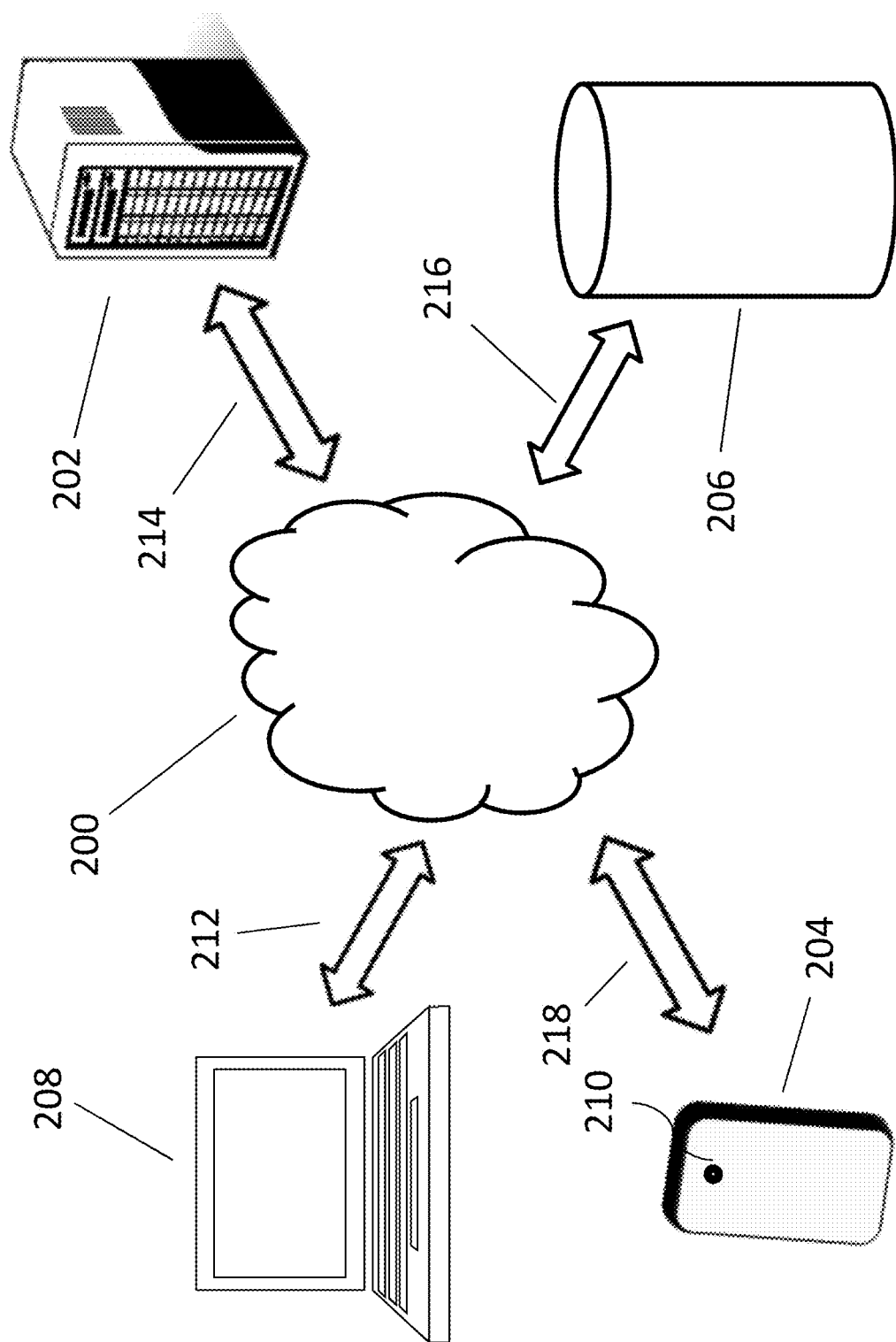
FIG. 20 illustrates an authentication system structure, in accordance with an embodiment of the present teaching.

In FIG. 20, there is shown a system architecture according to an embodiment of the present disclosure. Various devices are connected to and through a network or networks 200, such as, for example, the internet, a wide area network, a local area network, a WiFi network, a Bluetooth network, or any other network now known or hereafter developed. A server 202 is connected to a mobile device 204. The server 202 is also connected to a memory 206 and a computer 208. In some embodiments, in addition to connecting to the server 202, the mobile device 204 is also connected to the memory 206 and the computer 208 via the network 200.

In some embodiments, the server 202 is an authentication system. In some embodiments, the server 202 is a mobile device authentication system. In some embodiments, the server 202 is a transaction code authentication system. In some embodiments, the server 202 is a hologram image authentication system. In some embodiments, the server 202 is a payment card authentication system. In some embodiments, the server 202 is at least one of a mobile device authentication system, a transaction code authentication system, a hologram image authentication system, a payment card authentication system, or any combination of the foregoing.

The server 202 is capable of bidirectional communication both with the network 200 and via the network 200, as shown by communications path 214. In some embodiments, the server 202 includes a transmitter and/or receiver (embodied within the server 202), such as, for example, an RF receiver, transmitter and/or transceiver, a WiFi receiver, transmitter and/or transceiver, a Bluetooth receiver, transmitter and/or transceiver, or a receiver, transmitter and/or transceiver based on or using a different communications protocol or frequency band, either currently known or future developed. In some embodiments, the server 202 includes a separate transmitter and receiver. In some embodiments, the server 202 communicates using encrypted data, such as, for example, a public key/private key encryption protocol, a hashing protocol, or any other encryption protocol.

In some embodiments, the memory 206 is structured in the form of a database. In some embodiments, the memory 206 is at least one of a hard drive, a flash drive, ROM, RAM, EEPROM, optical storage, DVD, CD, DRAM, or any other memory or data storage system. In some embodiments, the memory 206 is cloud storage. In some embodiments, the memory 206 is structured in a RAID configuration. In some embodiments, the memory 206 stores transaction information. In some embodiments, the memory 206 stores hologram image information. In some embodiments, the memory 206 stores transaction processing information. In some embodiments, the memory 206 comprises a plurality of memories. In some embodiments, each of the memories of the plurality of memories is secured independently from each of the other memories of the plurality of memories. In some embodiments, the memory 206 includes one or more controllers for managing the storage of data in the memory 206 and/or transmission and receipt of data and/or instructions. In some embodiments, the memory 206 includes one or more microprocessors for managing the storage of data in the memory 206 and/or transmission and receipt of data and/or instructions.

In some embodiments, the memory 206 comprises one or more memory devices, wherein each of the one or more memory devices is located at a single location. In other embodiments, the memory 206 comprises one or more memory devices, wherein each of the one or more memory devices is located at a different location. In other embodiments, the memory 206 comprises one or more memory devices, wherein some of the one or more memory devices are located at a same location and others of the one or more memory devices are located at different locations. The memory 206 is capable of bidirectional communication both with the network 200 and via the network 200, as shown by communications path 216. In some embodiments, the memory 206 includes a transmitter and/or receiver (embodied within the memory 206), such as, for example, an RF receiver, transmitter and/or transceiver, a WiFi receiver, transmitter and/or transceiver, a Bluetooth receiver, transmitter and/or transceiver, or a receiver, transmitter and/or transceiver based on or using a different communications protocol or frequency band, either currently known or future developed. In some embodiments, the memory 206 includes a separate transmitter and receiver. In some embodiments, the memory 206 communicates using encrypted data, such as, for example, a public key/private key encryption protocol, a hashing protocol, or any other encryption protocol.

In some embodiments, the computer 208 is at least one of a server, a payment processing system, a banking system, a card issuer system, or a merchant system, or any combination of the foregoing. In some embodiments, the computer 208 comprises a plurality of computers. The computer 208 is capable of bidirectional communication both with the network 200 and via the network 200, as shown by communications path 212. In some embodiments, the computer 208 includes a transmitter and/or receiver (embodied within the computer 208), such as, for example, an RF receiver, transmitter and/or transceiver, a WiFi receiver, transmitter and/or transceiver, a Bluetooth receiver, transmitter and/or transceiver, or a receiver, transmitter and/or transceiver based on or using a different communications protocol or frequency band, either currently known or future developed. In some embodiments, the computer 208 includes a separate transmitter and receiver. In some embodiments, the computer 208 communicates using encrypted data, such as, for example, a public key/private key encryption protocol, a hashing protocol, or another currently existing or future developed encryption or secure communications protocol.

In some embodiments, the computer 208 comprises an application program interface (API) for communications with the network 200 and/or with other devices, such as, for example, the server 202, the memory 206 and the mobile device 204. In one or more embodiments, the API embodied by the computer 208 provides for secure communication with a payment processing system such as, for example, as shown in FIG. 21.

Figure 21:
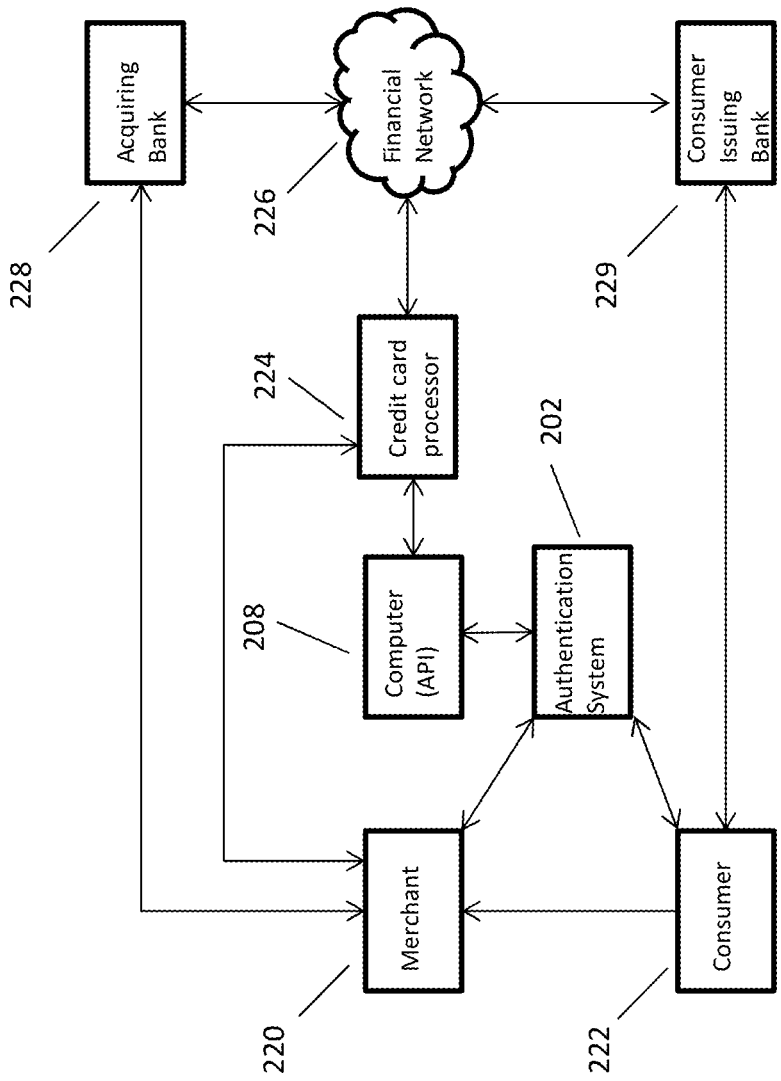
FIG. 21 illustrates a payment processing system, in accordance with an embodiment of the present teaching.

In FIG. 21, there is shown a payment processing system according to one embodiment. The consumer 222 makes a purchase from a merchant 220 using a form of non-cash payment, such as, for example, a credit card. The consumer 222 and merchant 220 each interface with the server 202. The server, which is embodied in the form of a payment card authentication system, and the merchant communicate with each other and the server and the consumer communicate with each other. The server authenticates the user and interfaces with a credit card processor 224 via the API embodied in computer 208 and they communicate with each other via the API. The credit card processor 224, the acquiring bank 228 and the consumer issuing bank 229 communicate among themselves and with each other via financial network 226. The credit card processor 224 and the merchant 220 also communicate with each other directly regarding transaction confirmation information and for transactions that do not utilize the payment card authentication system 202. The acquiring bank 228 and the merchant 220 communicate with each other and the consumer issuing bank 229 and the consumer 222 communicate with each other.

Figure 22:
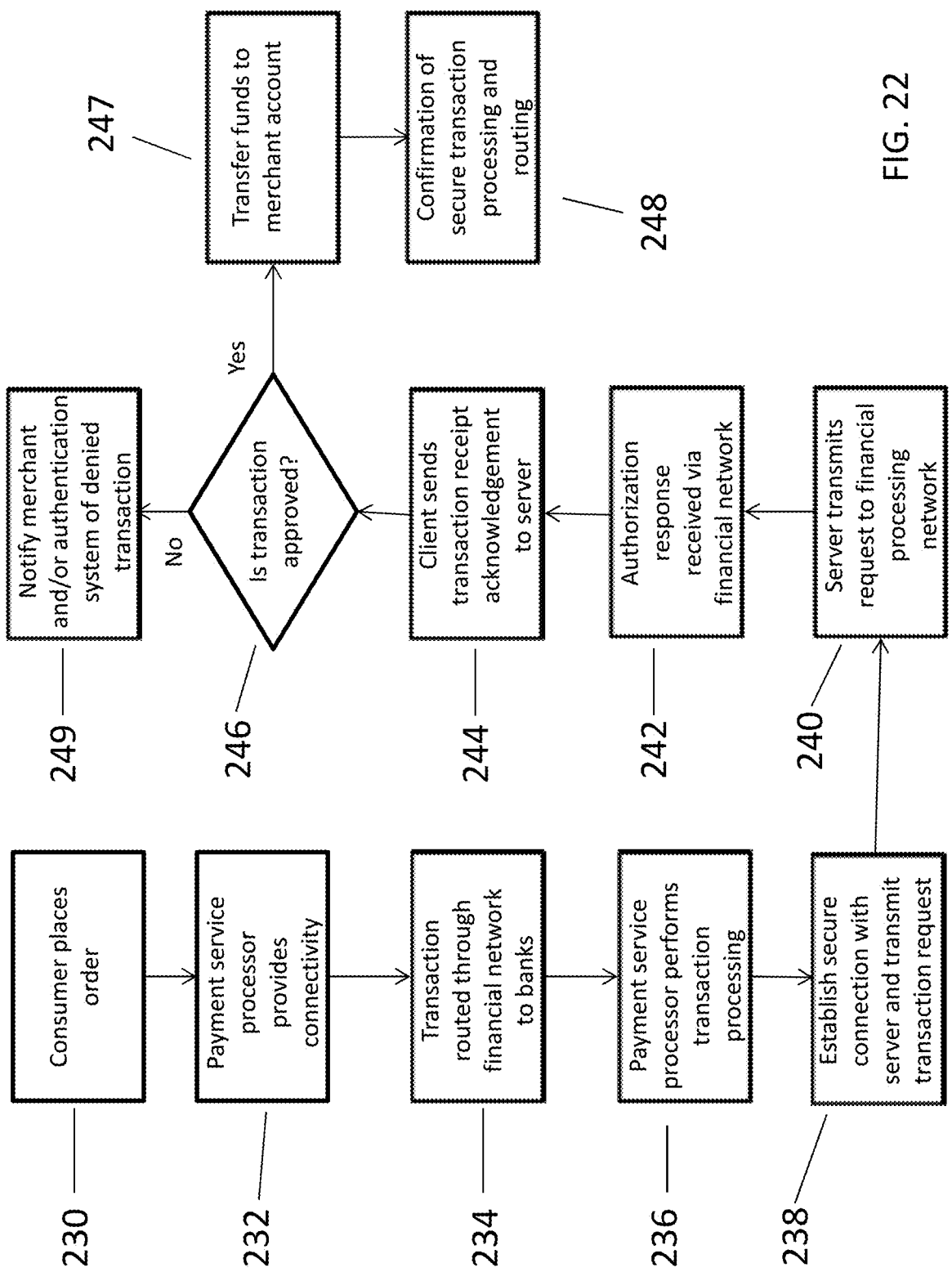
FIG. 22 illustrates a method for payment processing, in accordance with an embodiment of the present teaching.

Looking now at FIG. 22, in step 230 the consumer places an order via a website based storefront, using a payment card. In step 232 payment service processor provides secure, real-time connectivity from the storefront to an Internet payment platform. In step 234 the transaction is securely routed the through a financial network to an acquiring bank and a consumer issuing bank in order to ensure that the customer is authorized to make the purchase. In step 236 the payment service processor performs transaction processing using a client/server architecture. The client is installed at the merchant site or at the authentication system and integrated with the merchant's e-commerce application or the authentication system payment processing API. The client may be made available in various formats to support system integration requirements including, for example, DLL, COM, Site Server, Java Native Interface, executable binary, or application library. The client may also be utilized in a form available through turnkey shopping cart and store management systems. In step 238, the client software establishes a secure connection with the payment processing server over the Internet using an SSL connection, and transmits an encrypted transaction request. In step 240, the payment processing server receives the request and transmits it to the appropriate financial processing network over a private financial network. In step 242, the authorization response is received via the financial network. The response may be returned via the same session to the client on the merchant site or at the authentication system. In step 244, the client completes the transaction session by sending a transaction receipt acknowledgment message to the payment processing server prior to disconnecting the session. In step 246, system determines whether the transaction has been approved. If the transaction is approved, in step 247 funds are transferred to the merchant account, and in step 248, the payment processing system confirms that the transaction has been securely routed and processed. If the transaction is not approved, in step 249 the merchant and/or authentication system is notified.

Figure 23:
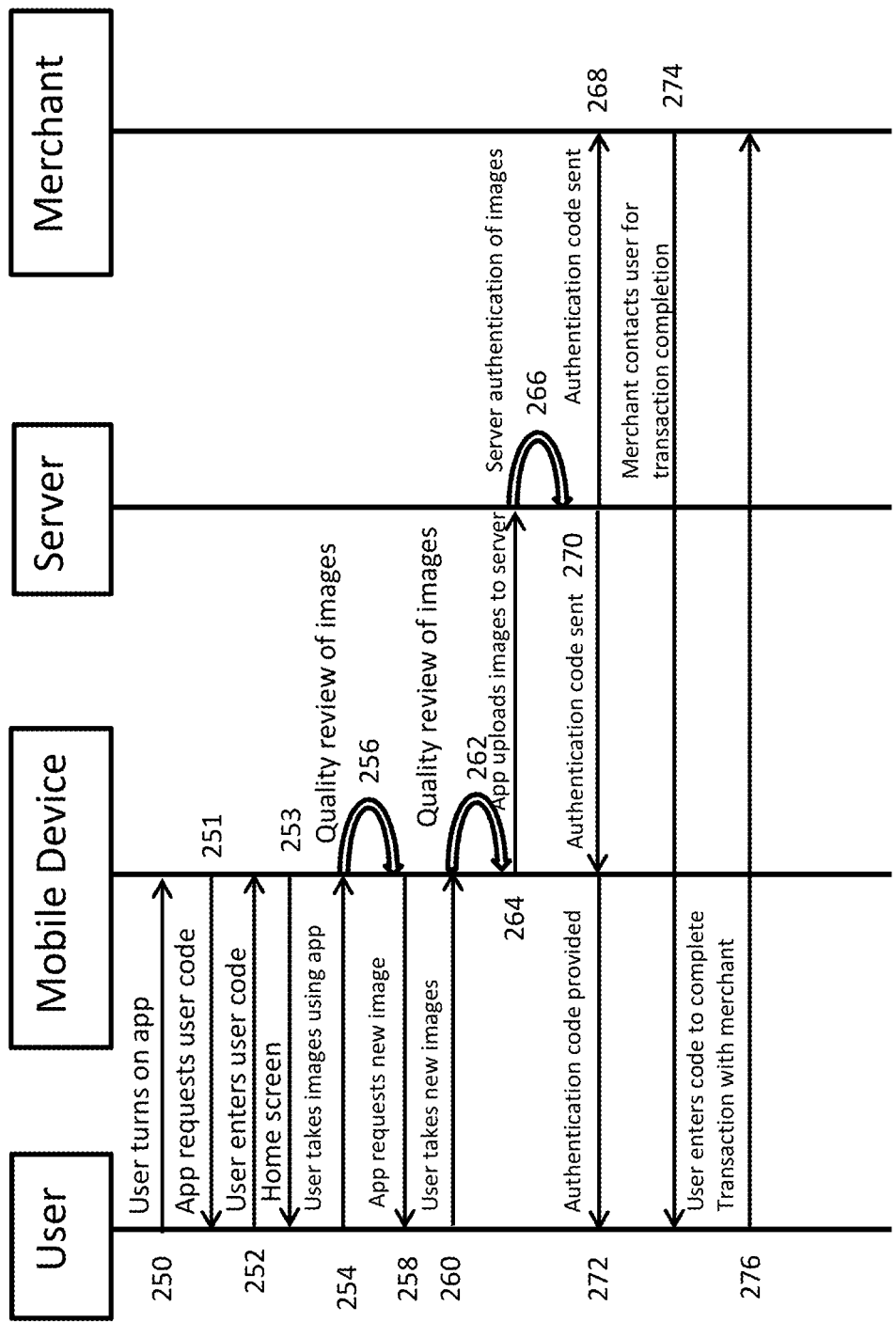
FIG. 23 illustrates system communications relating to an authentication process, in accordance with an embodiment of the present teaching.

One embodiment of an authentication process according to the present disclosure is shown in FIG. 23. At time 250 the user activates the app on the mobile device. At time 251, the app requests a user code to allow the user to access the app. Alternatively, the user code could be some form of biometric authentication, such as, for example, a fingerprint reader, retinal scanner or some other device. Upon entry of the user code at time 252, the app activates at time 253 and presents a home screen for the user to access the features of the app. Alternatively, access to the app is accomplished using a user biometric preprogrammed into the device. At time 254 the user takes or captures an image of the hologram on the payment card and at time 256 the app performs a quality review of the image. If the quality of the image is sufficient to perform the image analysis then the process skips to time 264. If the quality of the image is not sufficient to perform the image analysis then at time 258, the app requests a new image. At time 260 the user takes or captures a new image of the hologram and at time 262 the app performs a quality review of the new image. At time 264 if the quality review indicates that the image is of sufficient quality to perform the analysis, the app uploads the image to the server. At time 266 the server performs an authentication on the image. If the authentication is successful, then at time 268 an authentication code is sent to the merchant, and at time 270 an authentication code is sent to the mobile device. At time 272 the mobile device presents the authentication code to the user. After receipt of the authentication code, at time 268 the merchant contacts the user to complete the transaction. At time 276 the user enters the authentication code to complete the transaction with the merchant.

Figure 24:
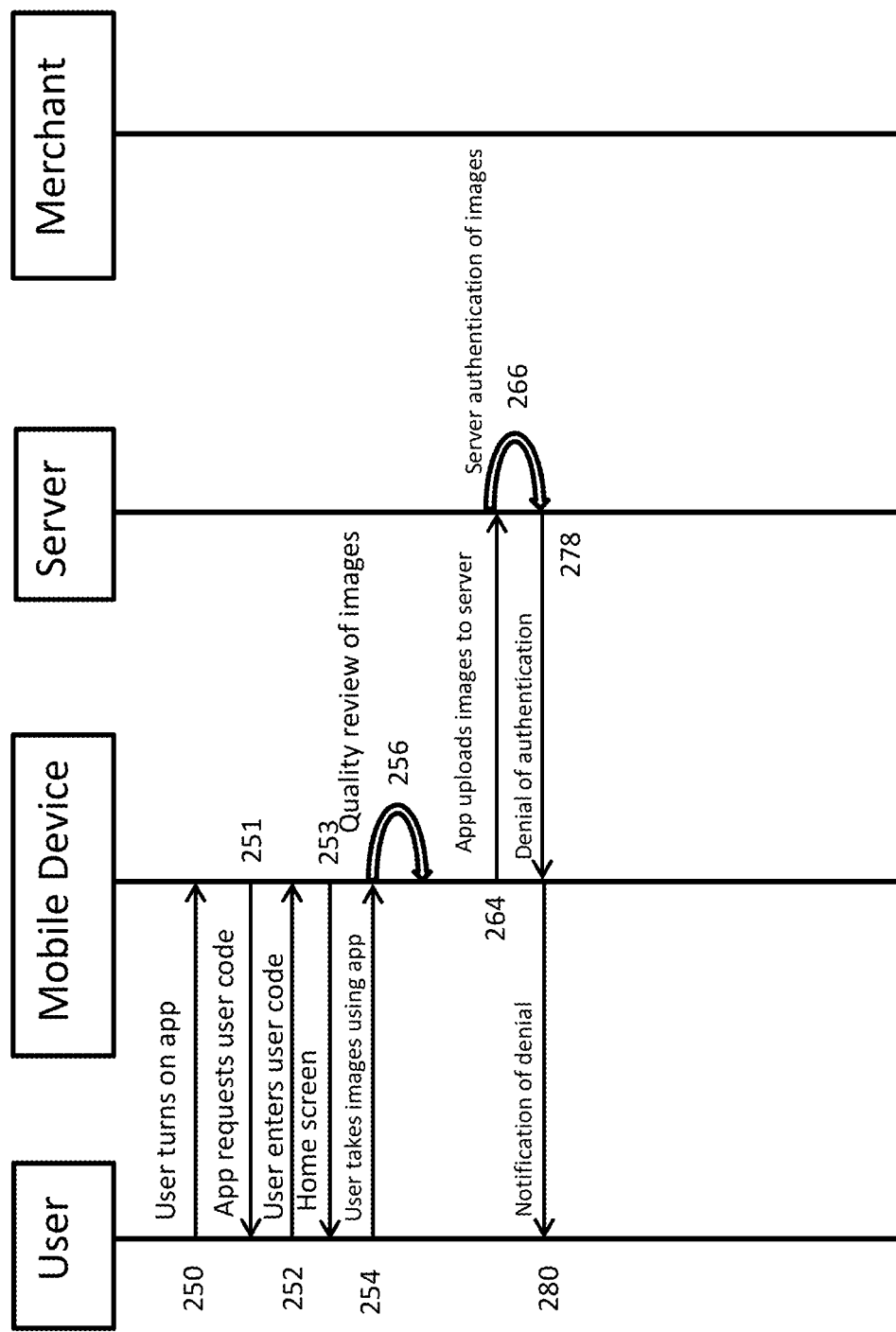
FIG. 24 illustrates system communications relating to a denial of authentication process, in accordance with an embodiment of the present teaching.

One embodiment of a denial of authentication process according to the present disclosure is shown in FIG. 24. The same numbering as the steps of the authentication process in FIG. 23 will be used for the similar steps of this process. At time 250 the user activates the app on the mobile device. At time 251, the app requests a user code to allow the user to access the app. Alternatively, the user code could be some form of biometric authentication, such as, for example, a fingerprint reader, retinal scanner or some other device. Upon entry of the user code at time 252, the app activates at time 253 and presents a home screen for the user to access the features of the app. Alternatively, access to the app is accomplished using a user biometric preprogrammed into the device. At time 254 the user takes or captures an image of the hologram on the payment card and at time 256 the app performs a quality review of the image. If the quality of the image is sufficient to perform the image analysis then the at time 264 the app uploads the image to the server. At time 266 the server performs an authentication on the image. If the authentication is not successful, then at time 278 the server issues a denial of authentication and at time 280 the user is notified that the authentication has been denied.

Figure 25:
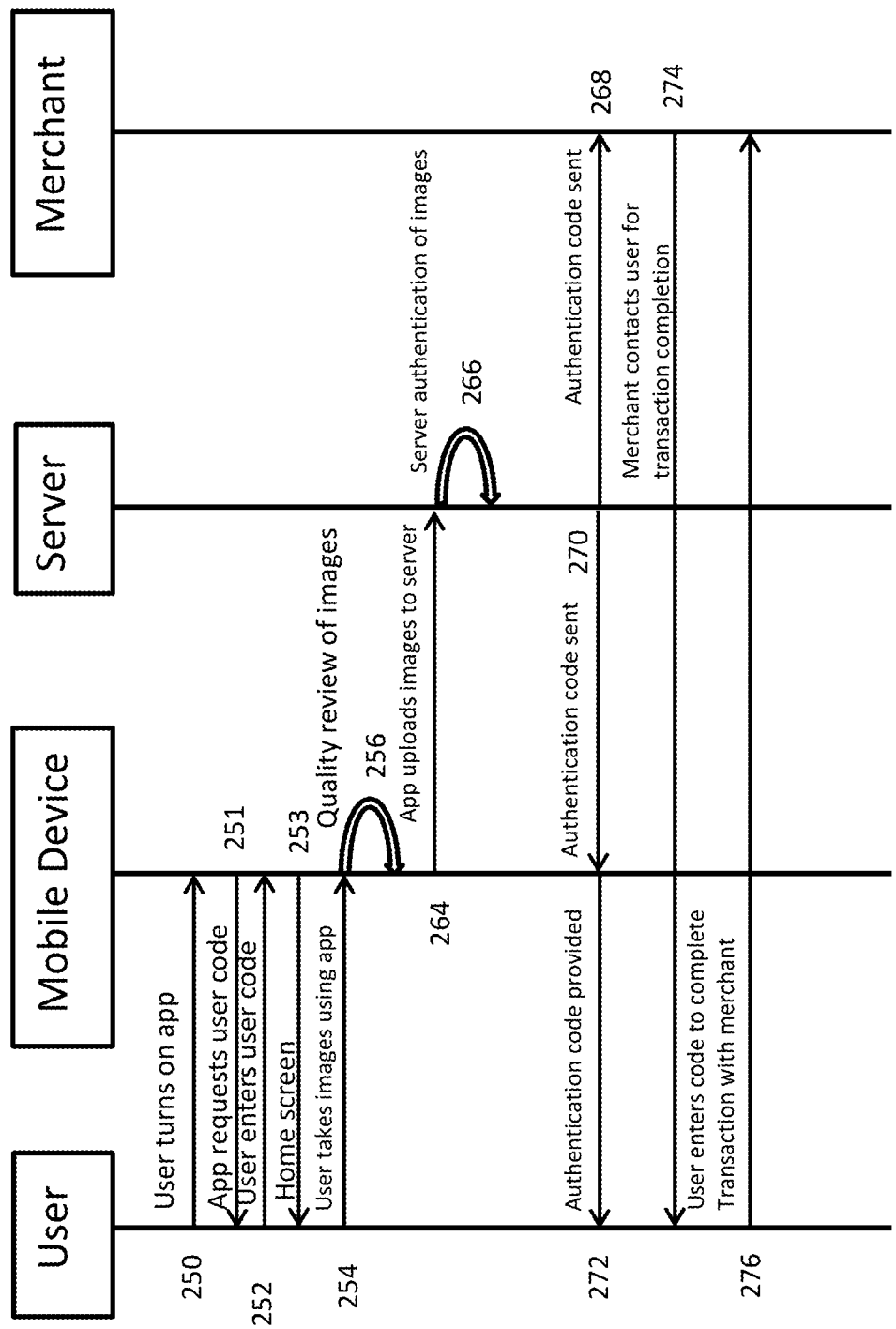
FIG. 25 illustrates system communications relating to an authentication process, in accordance with an embodiment of the present teaching.

One embodiment of an authentication and transaction completion process according to the present disclosure is shown in FIG. 25. The same numbering as the steps of the authentication process in FIG. 23 will be used for the similar steps of this process. At time 250 the user activates the app on the mobile device. At time 251, the app requests a user code to allow the user to access the app. Alternatively, the user code could be some form of biometric authentication, such as, for example, a fingerprint reader, retinal scanner or some other device. Upon entry of the user code at time 252, the app activates at time 253 and presents a home screen for the user to access the features of the app. Alternatively, access to the app is accomplished using a user biometric preprogrammed into the device. At time 254 the user takes or captures an image of the hologram on the payment card and at time 256 the app performs a quality review of the image. If the quality of the image is sufficient to perform the image analysis then the at time 264 the app uploads the image to the server. At time 266 the server performs an authentication on the image. If the authentication is successful, then at time 268 an authentication code is sent to the merchant, and at time 270 an authentication code is sent to the mobile device. At time 272 the mobile device presents the authentication code to the user. After receipt of the authentication code, at time 274 the merchant contacts the user to complete the transaction. At time 276 the user enters the authentication code to complete the transaction with the merchant.

Figure 26:
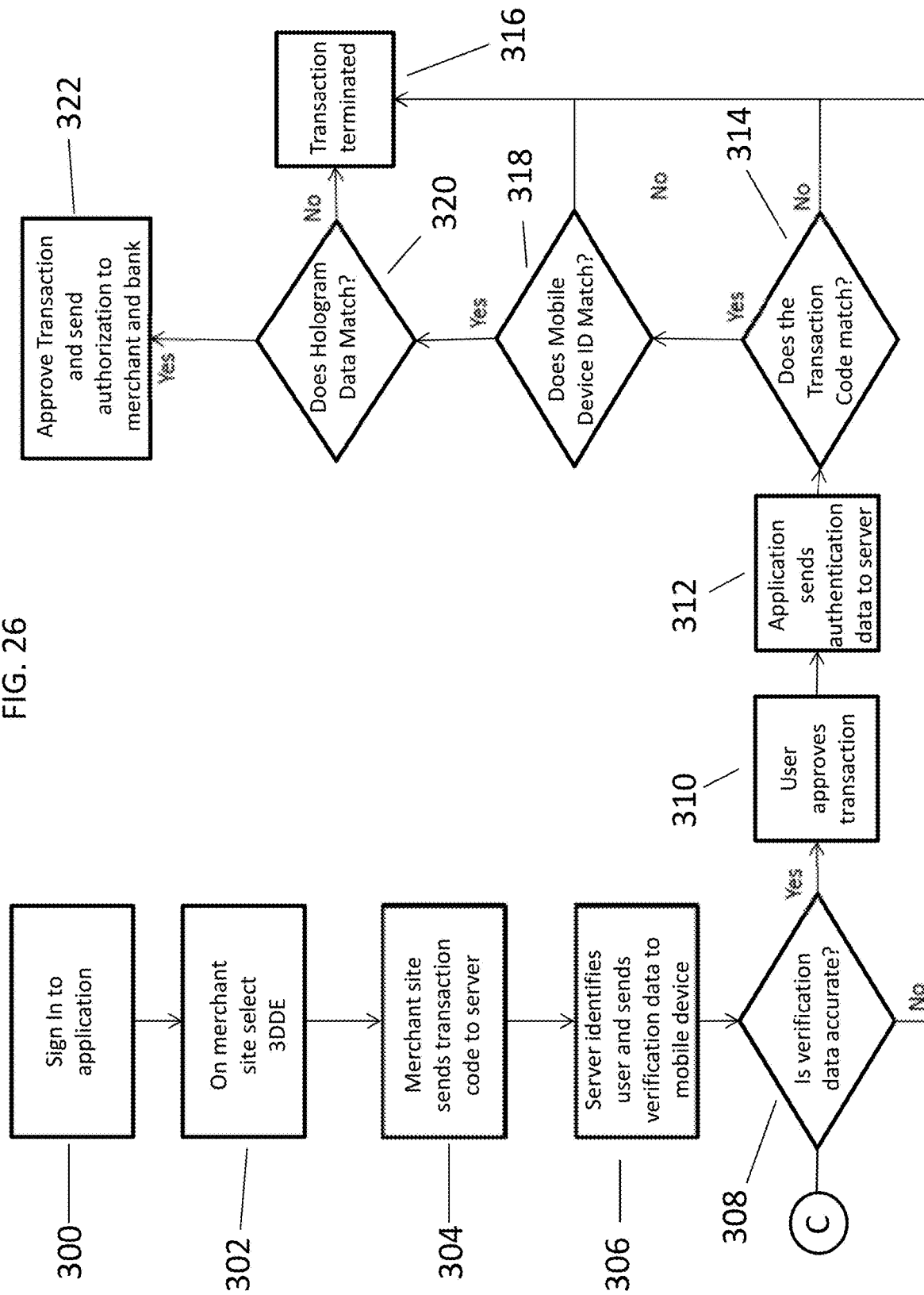
FIG. 26 illustrates a method for authentication of a transaction, in accordance with an embodiment of the present teaching.

Looking now at FIG. 26, there is shown an embodiment of an authentication process according to the present disclosure. In step 300, a user signs in to the application. In step 302, at the merchant site the user selects the payment method to be used for the transaction, such as, for example, 3DDE authentication processing. In some embodiments, the user may pre-enter the user's information so that the transaction can be authenticated using fewer interactions with or less information to enter into the merchant site. In other embodiments, the mobile device may transmit the user information to the merchant site using NFC, bluetooth, or some other technology for communicating wirelessly from the mobile device to the merchant site or merchant system. This can be accomplished, for example, by the user tapping the mobile device to the merchant terminal, scanning a code, such as, for example, a bar code or QR Code, through a wireless signal, such as, for example, WiFi, Bluetooth, WiLan, IR, or any future developed wireless communication technology, or entered via the image capture device on the mobile device, or manually by the user into the software application running on the mobile device. In step 304, the merchant site generates and sends a transaction code to the server.

In step 306, the server identifies the user based on the transaction code, and sends verification data to the user's mobile device. In step 308, the user is notified by the application on the mobile device that verification data is available for review by the user. This notification can be in the form of haptics, such as, for example, vibration, or sound, or the screen of the mobile device lighting up, or any combination of the foregoing. In one or more embodiments, the verification data includes one or more bits or bytes of data that represent vendor ID, vendor name, transaction identifier, cashier identifier, POS identifier, Year, Month, Day, Time, transaction amount, customer information, or other information relating to the transaction, or any combination of the foregoing. Alternatively or additionally, the verification data may include one or more of an identification of the items being purchased, a price for each item being purchased, a date and time of the transaction, or a location of the mobile device. In step 310, the user confirms or approves the transaction, for example, after reviewing the verification data and confirming its accuracy, and interacts with the application via the mobile device or some other device, such as, for example, a smart watch, smart bracelet, some other smart device, that can send a signal to the mobile device or server to confirm and approve the transaction, by touching the screen, pressing a button on the screen or mobile device (hard button or soft button), by speaking or saying a code, by moving the mobile device in a certain way, or via some other interaction with the mobile device. Upon receipt of the user approval, in step 312, the application sends authentication data to the server. The authentication data may include information, such as, for example, the mobile device identifier, the image data, or a transaction code, or some other information to assist in authenticating the user, the device, and the transaction. In certain embodiments, the transmission of one or more of the transaction code, the mobile device identifier, and the image data are transmitted to the server independently of the others, for example, as discussed above. In step 314, the server determines whether the transaction code matches a transaction code received by the server from the merchant with whom the user is interacting. If the transaction code does not match, in step 316 the transaction is terminated by the server. In one or more embodiments, the server sends a notification to the mobile device and/or the merchant indicating that the transaction code provided by the user is incorrect. In certain embodiments, the server sends a notification to the mobile device that the transaction has been denied, or failure. If the transaction code matches, then, in step 318, the server determines whether the mobile device ID matches the mobile device ID stored with respect to that user and that hologram image. If the mobile device ID does not match the mobile device ID stored with respect to that user then, in step 316 the server sends a notification to the mobile device that an incorrect or unauthorized mobile device is being used. In some embodiments, the server sends a message to the merchant that the transaction is denied. In certain embodiments, the server sends a notification to the mobile device that the transaction has been denied, failure, or that the user should retry initiating the transaction using the correct device. If the mobile device ID matches or, after reinitiating the transaction, the mobile device ID matches, then, in step 320, the server determines whether the image data matches the image data stored by the server upon registration of the hologram and mobile device. In some embodiments, the image data is not stored on the server, but instead is stored in a remote memory or database or by the card issuer. In further embodiments, the image data is stored on the mobile device or in a secure database with which the mobile device communicates. In certain embodiments, the image data is an image file, such as, for example, jpg, tif, png, gif, bpg, or any other image file format. In other embodiments, the image data is a hash file generated from the image data obtained when the image of the hologram is captured via an image capture device. The hashing of the image data may be accomplished using any known hashing algorithms, such as, for example, BLAKE 256, BLAKE 512, ECOH, FSB, GOST, NAVAL, JH, MD5, MD6, RIPEMD-320, SHA-256, SHA-512, SWIFT, Whirlpool, or any other one way hashing or encrypting algorithm. If the image data does not match the image data stored by the server upon registration of the hologram and mobile device, then, in step 316 the server sends a notification to the mobile device that the payment card is invalid. In certain embodiments, the server sends a notification to the mobile device that the transaction has been denied, failure, or that the user should retry initiating the transaction using a correct payment card. In some embodiments, the image data is not stored in the server, but instead is stored by the card issuer. In further embodiments, the image data is stored on the mobile device or in a secure database with which the mobile device communicates.

In certain embodiments, if the transaction is reported as fraudulent, a notification is also sent to law enforcement, the merchant, and/or the card issuer, that a transaction has been initiated using a stolen payment card or stolen mobile device.

If the image data matches the image data stored by the server upon registration of the hologram and mobile device, then in step 322 the server transmits an authorization code to the merchant. In certain embodiments, the server transmits the authorization code to the mobile device. In certain embodiments, the server transmits the authorization code to the mobile device and the merchant. In certain embodiments, the server also transmits transaction data to the merchant. In certain embodiments, the server also transmits transaction data to the mobile device. In certain embodiments, the server also transmits transaction data to the merchant and the mobile device. In certain embodiments the server transmits an authorization code to a payment processor, in addition to or in place of the merchant.

Figure 27:
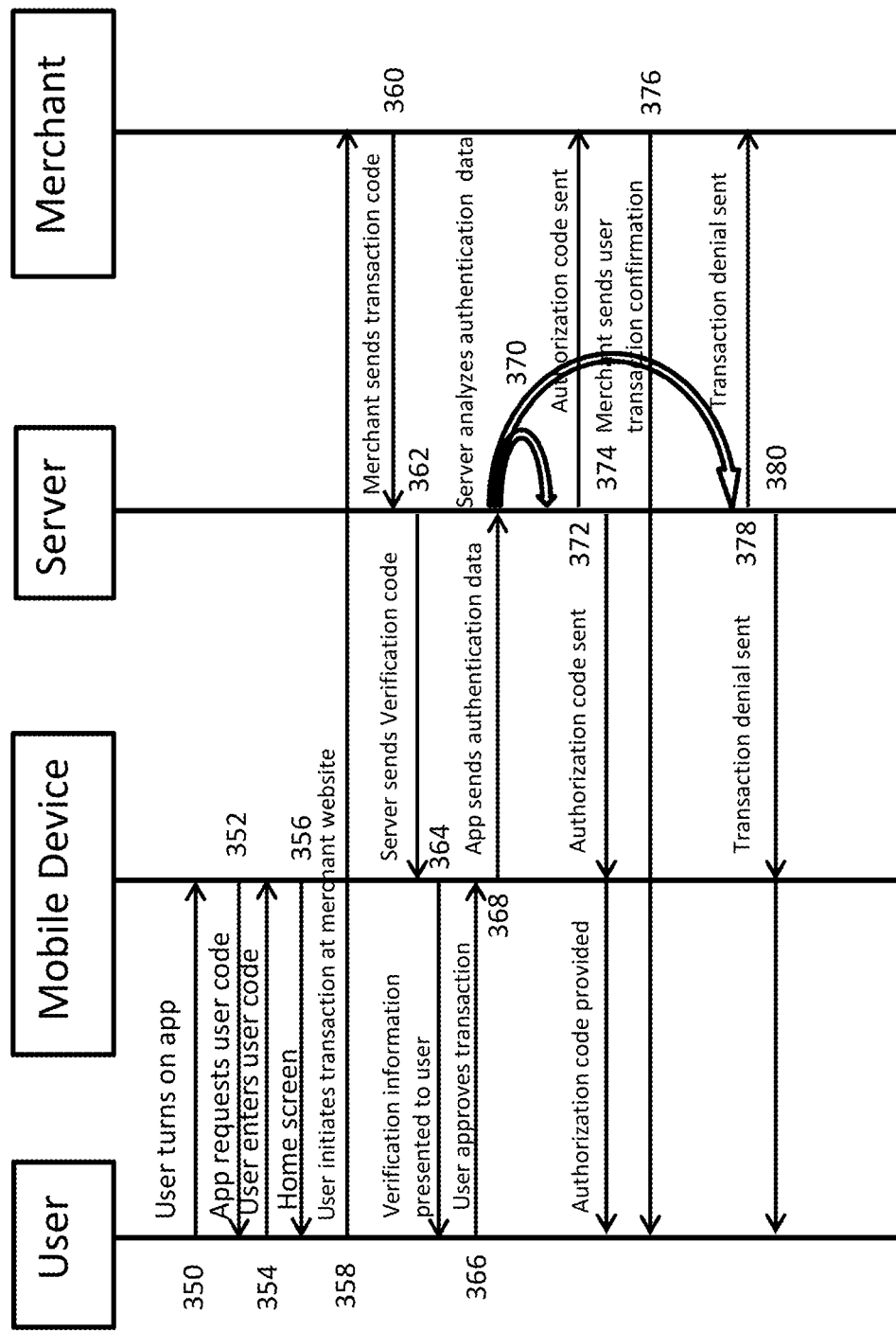
FIG. 27 illustrates system communications relating to an authentication/denial process, in accordance with an embodiment of the present teaching.
Figure 28:
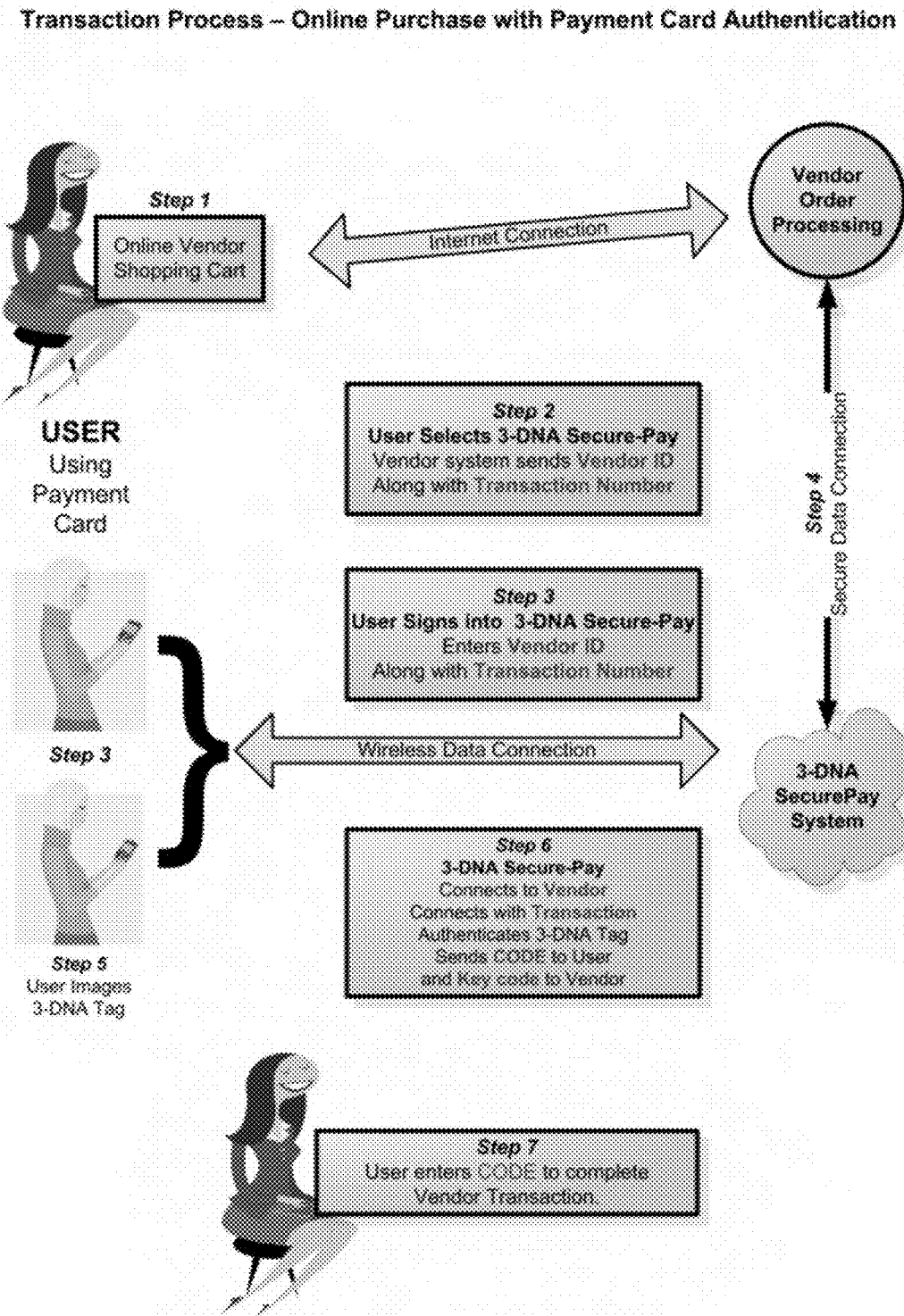
FIG. 28 illustrates a transaction process according to an embodiment of the present teaching.
Figures 29, 30:
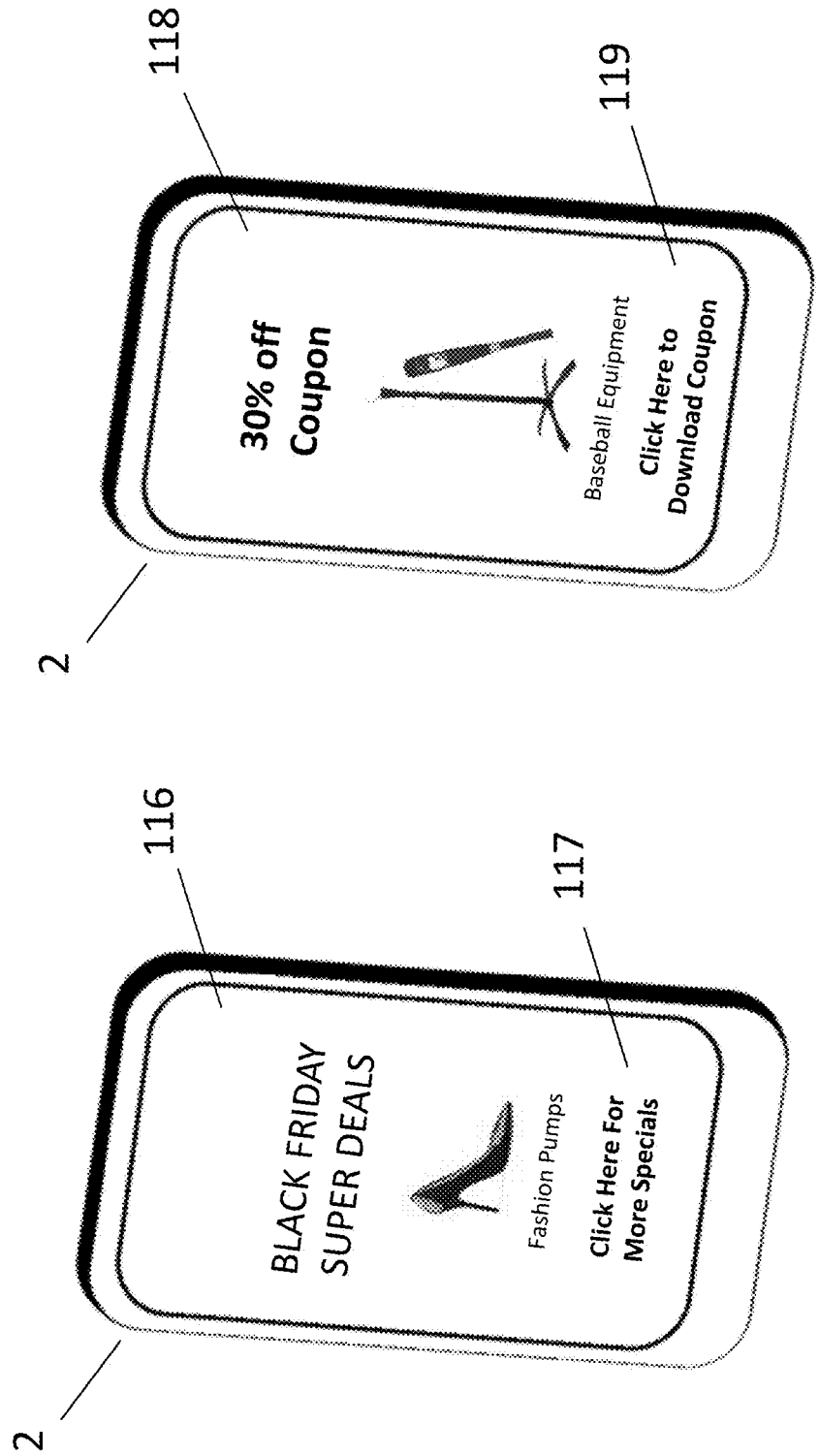
FIG. 29 illustrates an advertisement presented on a mobile device before, during, or after an authentication process.
FIG. 30 illustrates a coupon presented on a mobile device before, during, or after an authentication process.

One embodiment of an authentication and transaction completion process according to the present disclosure is shown in FIG. 27. At time 350 the user activates the app on the mobile device. At time 352, the app requests a user code to allow the user to access the app. Alternatively, the user code could be some form of biometric authentication, such as, for example, a fingerprint reader, retinal scanner or some other device. Upon entry of the user code at time 354, the app activates at time 356 and presents a home screen for the user to access the features of the app. Alternatively, access to the app is accomplished using a user biometric preprogrammed into the device. At time 358 initiates a transaction at a merchant website. As part of the transaction, the user chooses to have the transaction processed using the app and authentication system. Upon selection of such, at time 360 the merchant system sends a transaction code to the server. At time 362, the server identifies the user and mobile device via the transaction code and sends a verification code to the user via the mobile device. At time 364, the mobile device presents the verification information comprising the verification code to the user. Upon review of the verification information, at time 366, the user approves the transaction. Upon receipt of the user approval, At time 368 the application sends authentication data to the server, including mobile device information, image data and a transaction code. At step 370, the server analyzes the authentication data. Upon approval of the authentication data, if the server authenticates the transaction code, the mobile device information and the image data, at time 372 the server sends an authorization code to the merchant. At time 374 the server sends an authorization code to the user via the mobile device. Upon receipt of the authorization code, at time 376, the merchant completes the transaction and sends the user a transaction confirmation message.

If the analysis of the authentication data results in no authorization or in a denial, then at time 378 the server sends a transaction denied, failed or not-authorized message to the merchant, and at time 380 a transaction denied, failed or not-authorized message is sent to the user via the mobile device.

Figure 31:
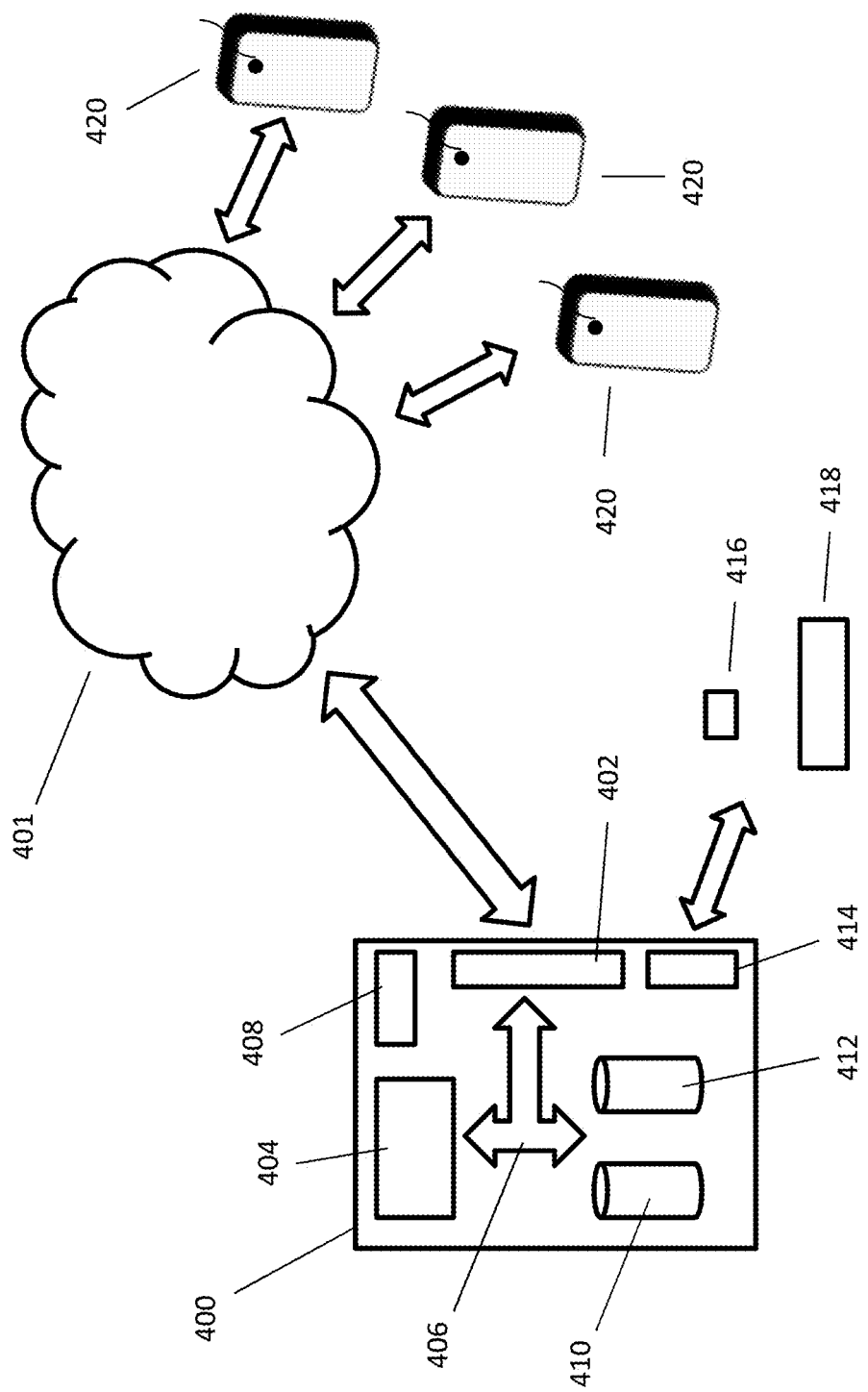
FIG. 31 illustrates an architecture for implementation of the computing system structure, in accordance with an embodiment of the present teaching.

FIG. 31 depicts a general computer architecture on which the server embodiments described herein can be implemented and has a functional block diagram illustration of a computer hardware platform which includes user interface elements. The computer may be a general purpose computer or a special purpose computer. Although only one such computer is shown, for convenience, the computer functions relating to processing of data and hosting of applications may be implemented in a distributed fashion on a number of similar platforms, to distribute the processing load.

The server 400, for example, includes COM ports 402 connected to and from a network 401 connected thereto to facilitate data communications. The server 400 also includes a central processing unit (CPU) 404, in the form of one or more processors, for executing program instructions. The exemplary computer platform includes an internal communication bus 406, program storage and data storage of different forms, e.g., disk 408, read only memory (ROM) 410, or random access memory (RAM) 412, for various data files to be processed and/or communicated by the server, as well as possibly program instructions to be executed by the CPU. The server 400 also includes an I/O component 414, supporting input/output flows between the server and other components therein such as user interface elements 416, 418, which can be a keyboard, mouse, track pad, microphone, or any other interface device. The server 400 may also receive programming and data from other locations and devices such as mobile devices 420 via the network 401 using network communications protocols.

Hence, aspects of the methods of developing, deploying, and hosting applications that are interoperable across a plurality of device platforms, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the servers, computers, processors or the like, or associated schedules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one server, computer or processor into another, for example, from a server or host computer into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media includes dynamic memory, such as a main memory of such a computer platform. Tangible transmission media includes coaxial cables, copper wire, and fiber optics, including wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic take, any other magnetic medium, a CD-ROM, DVD or DVD-ROM, any other optical media, punch card paper tapes, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the embodiments of the present teaching are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as firmware, a firmware/software combination, a firmware/hardware combination, or a hardware/firmware/software combination.

While the foregoing description and drawings represent embodiments of the present teaching, it will be understood that various additions, modifications and substitutions may be made therein without departing from the spirit and scope of the principles of the present teaching as defined in the accompanying claims. One skilled in the art will appreciate that the teaching may be used with many modifications of form, structure, arrangement, proportions, materials, elements, and components and otherwise, used in the practice of the teaching, which are particularly adapted to specific environments and operative requirements without departing from the principles of the present teaching. The presently disclosed embodiments are therefore to be considered in all respects as illustrative and not restrictive, the scope of the teaching being indicated by the appended claims and their legal equivalents, and not limited to the foregoing description.

Computers in vehicles and cars have been a staple since the 1980's, however, until recently, computers data was only available and stored locally within the vehicle and there was no way to remotely communicate with the vehicle. That paradigm is quickly changing. As vehicles become more and more reliant on computers and communication networks and as we migrate our wireless world from our home and office into our cars and other vehicles, we expose ourselves to yet another potential threat. Having a vehicle hijacked, controlled or stolen by a person using a computer in the next town or half way around the world has become a real world scenario. As consumers demand for wireless access to communications, entertainment and the internet grows, the real threat of having a car, truck, bus or other vehicle hacked by someone else has grown too. With the increased desire for constant access, vehicles have become the next target of hackers. The lines of communication are vulnerable and need to be protected from intervention by malevolent or experimental operators. Whether to simply gain access to your vehicles locks and alarm system or to control your steering or breaks, the threat has become real and a solution necessary.

Cars are already under attack as never before as the communications packages they contain grow more complex and accordingly more vulnerable to would be thieves and hackers. Modern vehicles and cars, especially luxury cars, typically contain 50 or more low-powered computers enabling services such as Wi-Fi, Bluetooth, GPS, engine control and monitoring, brake control, mileage maximization, and entertainment. These computers provide tempting entry points to criminals and hackers.

Tens of thousands of cars are stolen or broken into every year by thieves using electronic hacking equipment bought on the internet. Instead of smashing windows or forcing door locks, thieves have armed themselves with equipment that can intercept signals from key fobs to get into cars or single chip computers that plug into onboard computers remotely. Periodically we hear about recalls to fix security flaws and patch holes in vehicles communications systems. Recently, hackers have demonstrated that they can wirelessly carjack a vehicle via the internet while it is in operation, armed with just a basic mobile phone and a laptop loaded with software, from just about anywhere in the world. With such treats looming one can envision a number of nightmare scenarios ranging from multicar pileups to complete paralysis of a city's highway system.

One or more embodiments of the current disclosure allows for increased security and enhanced verification and authentication technology to protect the integrity of vehicle's communication and control systems and prevent theft and carjacking via the vehicles communication systems. In one or more embodiments, a client or application is installed on a device such as a mobile device, cell phone, smart phone, tablet, smart watch, bracelet, watch, fob or smart key. The client or applicant may be obtained from the vehicle manufacturer or may be obtained from a third party provider such as Google Play® or Apple iTunes®. Once the client or app is installed on the device it may need to be activated at step to interface with the vehicle or it may autonomously communicate with the vehicle using various communications technologies such as IR, Bluetooth, RFID, WiFi, RF, or any other near field communications standard.

Figure 32:
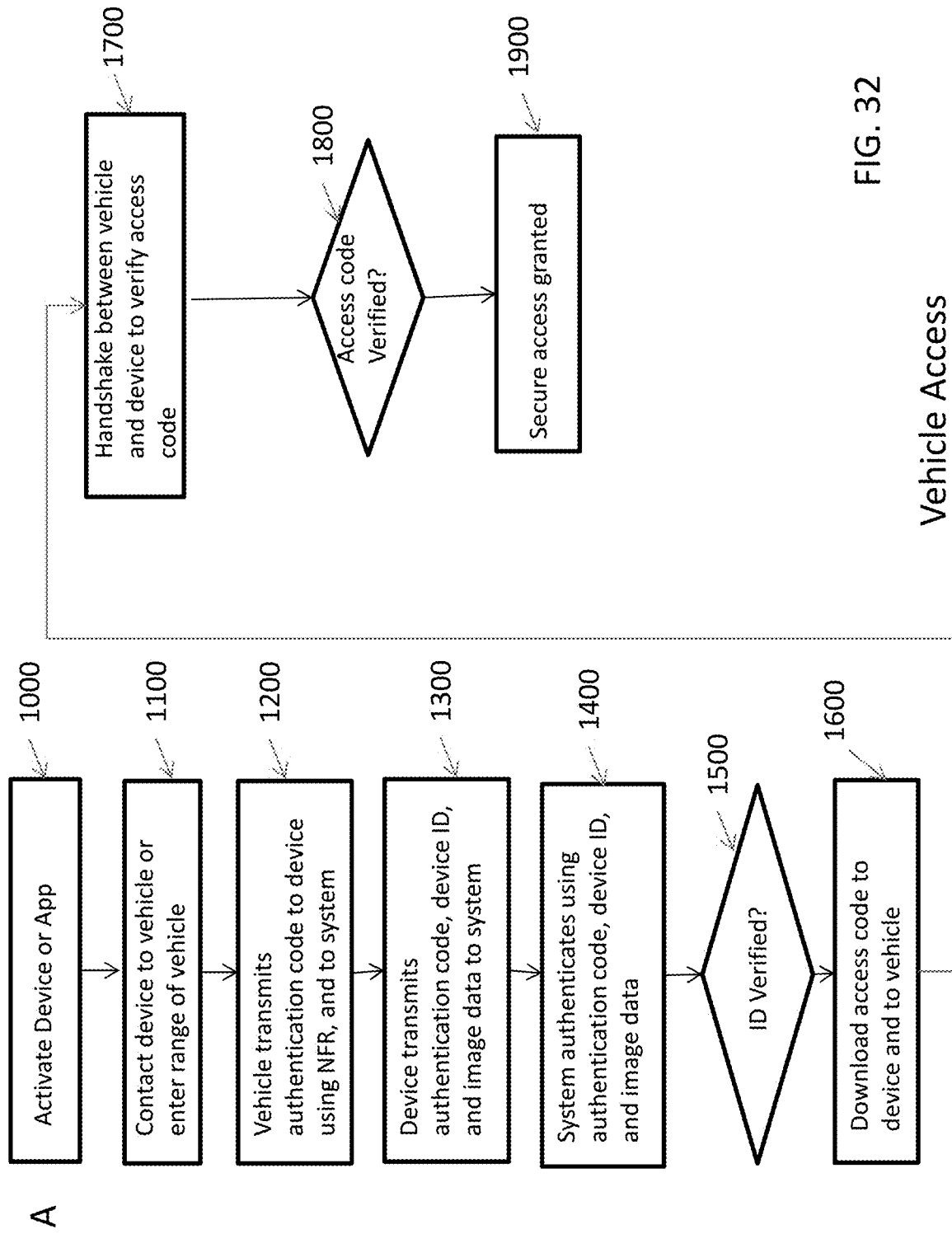
FIG. 32 illustrates a method for accessing a vehicle, in accordance with an embodiment of the present teaching.

As illustrated if FIG. 32, at step 1000 a user launches the app on a device, for example a smart phone. At step 1100, when the device enters a predetermined range, it either responds to a signal being generated by the vehicle (passive listening mode) when it detects the signal, or conversely, the device transmits a signal which is detected by vehicle. This signal may be generated in response to the launching of the application or may be a handshake type signal generated in response to a ping from the vehicle. In one or more embodiments, the device can be physically contacted, connected or coupled to the vehicle or a portion of the vehicle to facilitate the communications between the vehicle and the device. The vehicle can be coupled via a passive listening process, or via an active handshake, where the vehicle responds to a transmission from the app.

At step 1200, the signal transmitted by the device is similar to current methods for accessing vehicles by a smart key or fob holder using a secure vehicle code. A secure vehicle code programmed into the device is used for vehicular access. The signal includes a secure vehicle code which may be reset each time the vehicle is activated. In this rolling manner, even if the current signal is intercepted, it will no longer be valid the next time the vehicle is accessed. In one or more embodiments, the new secure vehicle code is generated by the vehicle or the system of the present disclosure and is transmitted to and stored on the device upon activation of the vehicle. In one or more embodiments, upon resetting of the secure vehicle access code, a signal is also sent to the system, for example, a server located remote from the vehicle, such as, for example a cloud based system or server, with the new secure vehicle code.

If the vehicle is accessed my multiple users each with their own device or has multiple devices associated with it, the vehicle must store the secure vehicle codes for each device independently. Additionally, the vehicle may store other unique settings associated with each separate device. Based on these stored unique settings or device code of each device the vehicle can interface with multiple mobile devices and provide the same level of security for each device. Unique settings can include seat adjustment settings, radio setup settings, GPS settings, driver habit settings, mobile device settings, frequently called number settings, and other settings unique to the user assigned to the device. By correlating the unique settings associated with the device to the secure vehicle codes, the vehicle can recognize the specific device and allow access to the vehicle based on the appropriate secure vehicle code corresponding to the device. After activation of the vehicle or when the vehicle is being deactivated the vehicle and/or device may confirm that the new secure vehicle code has been reset correctly on the device. This confirmation may be a very short range communication signal between vehicle and device to ensure no external third party can obtain the secure vehicle code by monitoring for wireless signals. The vehicle can transmit the authentication code to the device via a signal using NFR, Bluetooth, RF, Wi-Fi, IR or another communication protocol. In one or more embodiments, the vehicle also transmits the authentication code to the system.

At step 1300 the device transmits the authentication code, the device ID and stored image data to the system. The device ID is a code that is unique to the device, such as, for example, a device ID (device identification) is a distinctive number associated with a smartphone or similar handheld device. Every Apple iPhone, iPod touch and iPad has a unique 40 digit device ID number associated with it, known as a Unique Device ID (UDID). Android device IDs are determined during the device's first boot. These device identification numbers usually remain constant for the lifetime of the device unless a factory reset is performed.

The image data can be preloaded into the device by the vehicle manufacturer, for example, at the time of purchase, downloaded by the owner of the device via computer or other connection or loaded directly through image capture capabilities of the device. The image data can be hologram image data or other image data such as 3D virtual image data, 2D image data or other image data as well as a sound sample, spoken set of words by the owner—to be recognized by the System, a combination of video images and sound, or other non-conventional Data Set as the Authorization Key. A description of loading of the image data is described below with respect to FIG. 36.

At step 1400, the system authenticates the user device using the received authentication code, device ID and image data. If the authentication is verified at step 15, a new access code is sent to the device and to the vehicle from the system and is downloaded into the vehicle and device at step 1600. At step 1700, upon receipt of the new access code, the vehicle authenticates the device through a handshake which compares the prior access code, and the new access code provided by the system, to the prior access code and new access code stored in the vehicle and on the device. If the access codes are verified at step 1800 then secure access to the vehicle and all its systems are granted at step 1900.

In one or more embodiments where the full systemic authentication/verification is not possible, all basic vehicle systems, other than remote communications access capabilities, are enabled and usable upon the initial verification of the secure vehicle code. In these embodiments, the holder of the authenticated device can access and use the vehicle, the GPS system, the entertainment system and other embedded systems accessible through vehicular manual user interfaces. However, remote or wireless communications or connectivity with the vehicle communications system will not be accessible by the device or any other device until the access code is verified with the handshake between the vehicle and device is confirmed via the full systemic authentication/verification. Upon successful verification of the access code, remote communications control access capabilities are enabled between the device and the vehicle. In this manner, the user will be able to operate the vehicle in a restricted manner until the vehicle has verified the access code. In one or more embodiment, once that access code is verified, then the vehicle may open wireless communications between the vehicle and the mobile device and/or other devices.

Figure 33:
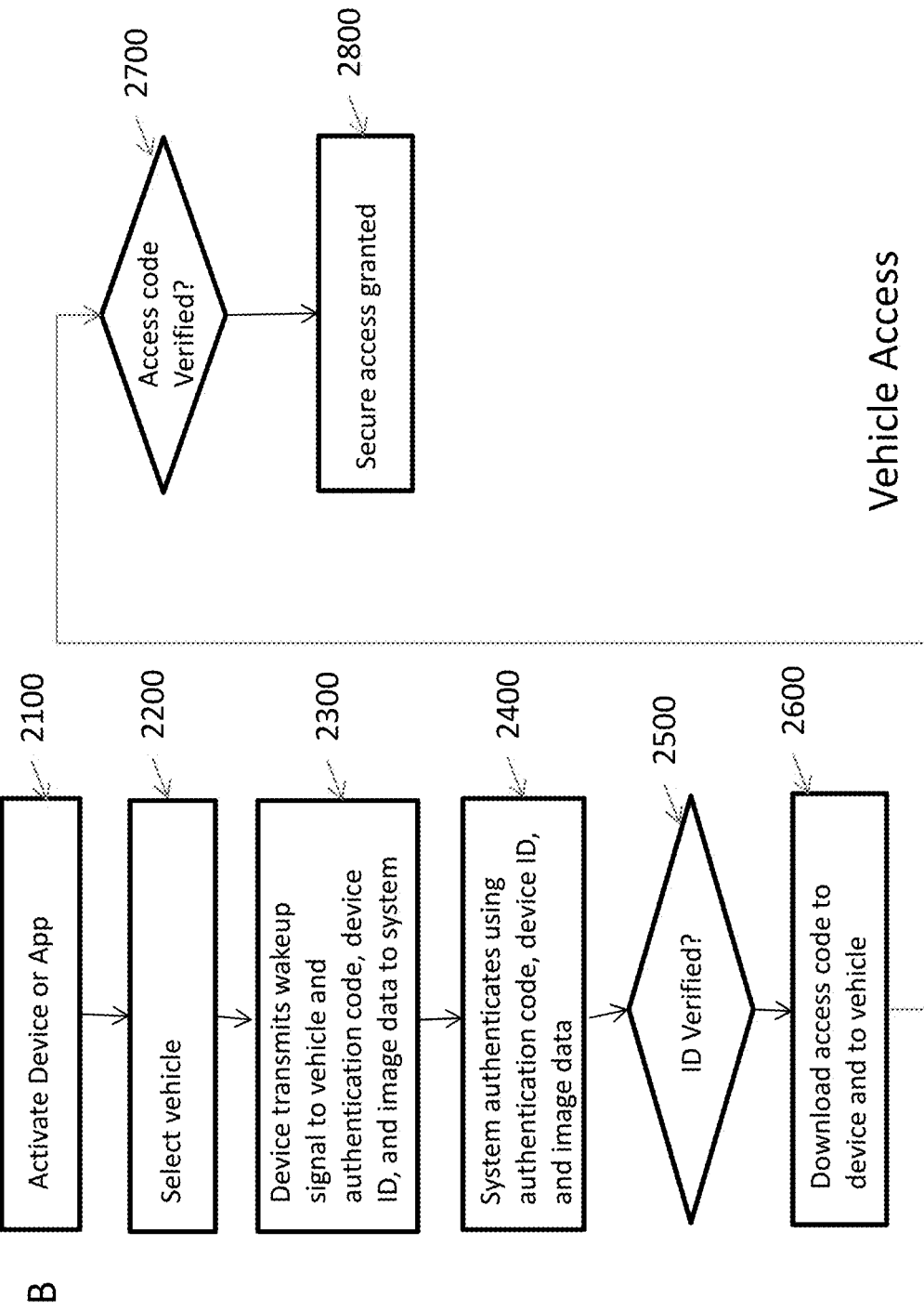
FIG. 33 illustrates another method for accessing a vehicle, in accordance with an embodiment of the present teaching.

FIG. 33 illustrates one or more embodiments, where a single device, such as a smart phone is used by a user who has access to more than one vehicle. At step 2100 the installed app or client is activated. It is to be understood by one skilled in the art, that the app or client is resident on a device, such as a mobile device, cell phone, tablet, bracelet, watch, or fob. Alternatively, the app may be embedded in the device and when the device is activated the app is automatically launched and activated. At step 2200, the app allows the user to select which vehicle they wish to interface with. In this manner, at step 2300, when the device enters a predetermined range either the vehicle transmits a signal which is detected by the device or the device sends a signal which is detected by vehicle. Additionally and/or alternatively, the user may tap the device on the vehicle or a spot on the vehicle to activate the vehicle and/or the device. At step 2300, the signal sent by the device is similar to current methods for accessing vehicles by the key or fob holder using a secure vehicle code. In one or more embodiments, a secure vehicle code programmed into the device for vehicular access is transmitted to the vehicle. The signal includes the secure vehicle code which may be reset each time the vehicle is activated. This new secure vehicle code is generated by the vehicle or system and is sent to and stored on the device upon activation of the vehicle. In this manner, the "rolling" code is updated each time the user accesses the vehicle. Upon resetting/advancing of the secure vehicle code, a signal is also sent to the System with the new secure vehicle code. If the vehicle is associated with multiple devices, i.e., the vehicle is used by multiple users each with their own device, the vehicle remembers the secure vehicle code for each device independently based on the unique user settings and/or device code of each device. Unique user settings can include seat adjustment settings, radio setup settings, GPS settings, driver habit settings, mobile device settings, frequently called number settings, and other settings unique to the user assigned to the device. By correlating the unique settings associated with the device to the secure vehicle codes, the vehicle can recognize the specific device and allow access to the vehicle based on the appropriate secure vehicle code corresponding to the device. By associating the device's unique settings with the device, the vehicle recognizes the device and correlates the appropriate secure vehicle code to the device, thereby allowing access to the vehicle based on the unique vehicle code for that device together with the secure vehicle code stored on that device.

After activation of the vehicle, optimally, or when the vehicle is being deactivated the vehicle and/or device may confirm that the new secure vehicle code has been reset correctly on the device. This confirmation may be a very short range communication signal between vehicle and device to ensure no external third party can obtain the secure vehicle code by monitoring for wireless signals. The vehicle can transmit the authentication code to the device via a signal using NFR, Bluetooth, RF, Wi-Fi, IR or another communication protocol. In one or more embodiments, the vehicle also transmits the authentication code to the System.

Figure 36:
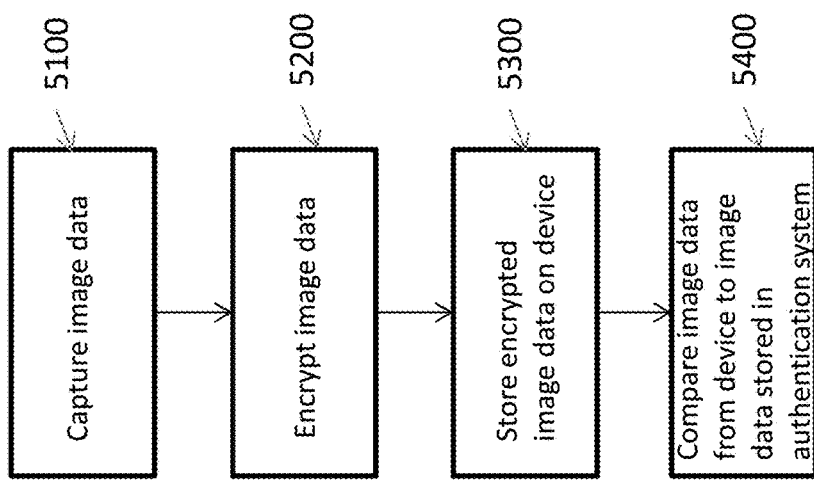
FIG. 36 illustrates a method for image data loading and analysis, in accordance with an embodiment of the present teaching.
Figure 37:
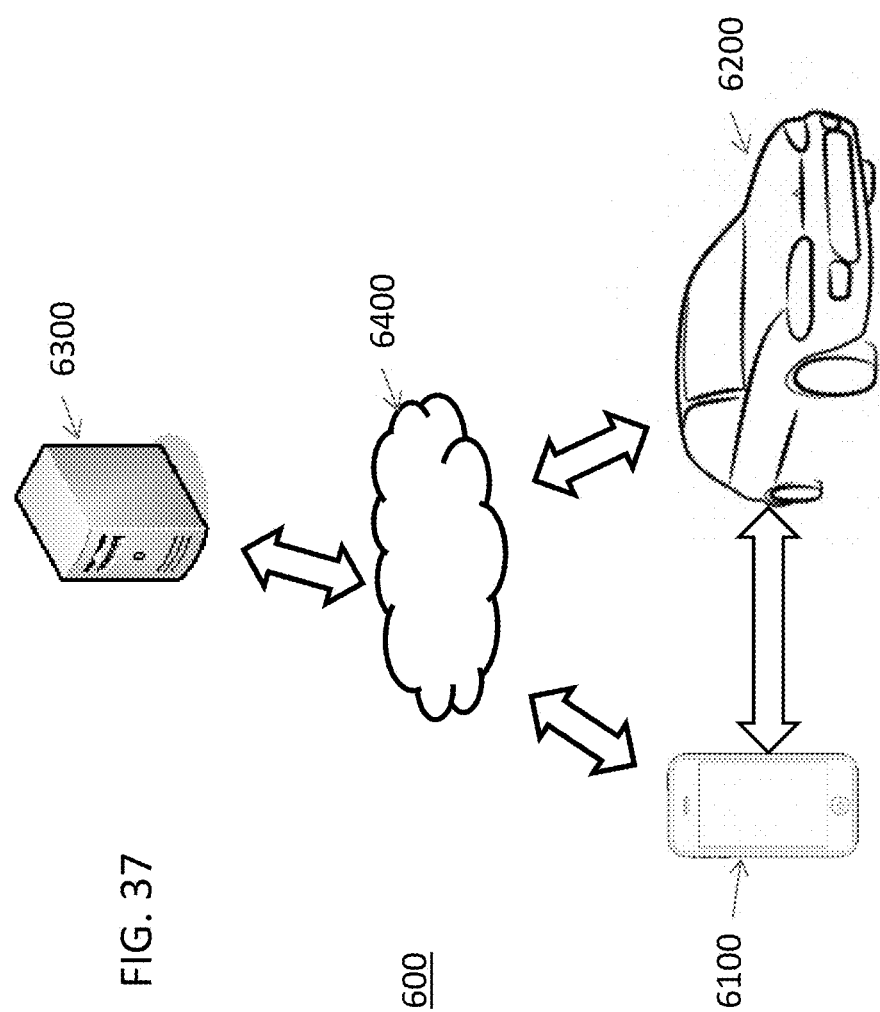
FIG. 37 illustrates an architecture for implementation of a system, in accordance with an embodiment of the present teaching.

In one or more embodiments, at step 2300, the device transmits the secure vehicle code, the device ID and image data to a system such as that illustrated in FIG. 37. This transmission may be via a wireless carrier or via some other wireless communication. The image data, which includes a unique user identification securely embedded within a holographic image, 3 dimensional image, complex 2 dimensional image, and which provides for authentication of the user thereby adding an extra level of security for the system, can be preloaded into the device by the vehicle manufacturer, downloaded by the owner of the device via computer or other connection or loaded directly through image capture capabilities of the device. The image data can be hologram image data or other image data such as 3D image data, complex 2D image data or other image data. A description of loading of the image data is described in relation to FIG. 36. At step 2400, the system authenticates the received data using the secure vehicle code, device ID and image data. If the authentication is verified the system proceeds from step 2500 to step 2600 and an access code is transmitted both to the device and to the vehicle. Transmission of the access code may be via any wireless connection and may occur at any frequency and using any known transmission technique. Additional encryption of the transmission signal may also be employed during the transmission. Upon receipt of the access code by the vehicle, at step 2700, the vehicle authenticates the device through a handshake which compares the access code received by the vehicle with the access code received by the device. It should be noted that until the access code is verified only vehicle operating systems are accessible, by remote vehicle communication systems remain inaccessible. Upon verification of the access code between the device and the vehicle, then access to the vehicle's remote communication system is activated.

Accordingly, a holder of the device can access and use the vehicle, the GPS system, the entertainment system and other embedded systems accessible through vehicular manual user interfaces. However, until step 2700 is completed, when the access codes are verified, no remote devices may wirelessly access the vehicular systems. It is the verified handshake between the vehicle and device that enables wireless access to the vehicle's communication systems. At step 2800, upon verification of the access code, remote communications access capabilities are enabled between the device and the vehicle.

In one or more other embodiments, the app resident on the device, i.e., mobile device, cell phone, tablet, bracelet, watch, or fob (i.e., key fob, remote controller, smart key) is activated. When the device enters within a predetermined range of the vehicle either the vehicle transmits a signal that is detected by the device or the device transmits a signal that is detected by vehicle. Additionally and/or alternatively, the device can physically contact the vehicle to activate the vehicle and/or device. The initial signal transmitted by the device is similar to known methods for accessing vehicles using a remote or fob and a secure vehicle code. In one or more embodiments, the standard secure vehicle code is programmed into the device for vehicular access. The signal includes a secure vehicle code that is reset each time the vehicle is activated. In one or more embodiments, a new secure vehicle code is generated by the vehicle or encryption system and is sent to and stored on the device upon initial activation of the vehicle. Upon resetting of the secure vehicle code, a signal is also sent from the vehicle or the device to the system with the new secure vehicle code. If there are multiple devices associated with the vehicle, the vehicle remembers the secure vehicle code for each device independently based on a unique code or a unique setting or device code of each device. Unique settings can include seat adjustment settings, radio setup settings, GPS settings, driver habit settings, mobile device settings, frequently called number settings, and other settings unique to the user assigned to the device. By linking or correlating the device's unique settings to the device, the vehicle recognizes the device and links or correlates, as the case may be, the appropriate secure vehicle code to the device, thereby allowing access to the vehicle based on the unique vehicle code for that device together with the secure vehicle code stored on that device.

After activation of the vehicle or when the vehicle is being deactivated the vehicle and/or device may confirm that the new secure vehicle code has been reset correctly on the device. This confirmation may be a very short range communication signal between vehicle and device to ensure no external third party can obtain the secure vehicle code by monitoring for wireless signals. The vehicle can transmit the authentication code to the device via a signal using NFR, Bluetooth, RF, Wi-Fi, IR or another communication protocol. In one or more embodiments, the vehicle also transmits the authentication code to the system.

Next, the device transmits the received authentication code, the device ID and image data to the system, as described above. In response, and upon receipt, the system authenticates the received data using the authentication code, device ID and image data. If the authentication is verified an access code is generated and transmitted from the system back to the device and to the vehicle. Upon receipt of the access code, the vehicle authenticates the device through a handshake which compares the access code received by the vehicle with the access code received by the device. Initially, upon receipt of the initial secure vehicle code, all vehicle systems, other than remote communications access capabilities, are enabled and usable. However, prior to verification of the access codes, no remote devices may access the vehicles systems. Once the access code is verified and a handshake between the vehicle and device is completed successfully then the remote communications access capabilities are enabled between the device and the vehicle.

In one or more embodiment, once the app or device is activated the user selects the vehicle they wish to interact with. When the device is within a predetermined range from the vehicle, either the vehicle transmits a signal which is detected by the device or the device transmits a signal which is detected by vehicle. Additionally, and/or alternatively, the user may physically contact the vehicle with the device to activate the vehicle and/or device. The initial signal transmitted by the device is similar to current methods for accessing vehicles by the key or fob using a secure vehicle code. In this embodiment, a secure vehicle code is programmed into the device for gaining access to the vehicle. The signal may include the secure vehicle code that may be reset each time the vehicle is activated. This new secure vehicle code is generated by the vehicle or the system and is sent to and stored on the device upon activation of the vehicle. When the secure vehicle code is reset by the vehicle or system, a signal is also sent to the system with the new secure vehicle code. If there are multiple devices associated with the vehicle, the vehicle stores in memory, the secure vehicle code for each device based on the unique settings within the device or a unique device code of each device. Unique settings can include seat adjustment settings, radio setup settings, GPS settings, driver habit settings, mobile device settings, frequently called number settings, and other settings unique to the user assigned to the device. By correlating the unique settings associated with the device to the secure vehicle codes, the vehicle can recognize the specific device and allow access to the vehicle based on the appropriate secure vehicle code corresponding to the device. By associating the device's unique settings with the device, the vehicle recognizes the device and correlates the appropriate secure vehicle code to the device, thereby allowing access to the vehicle based on the unique vehicle code for that device together with the secure vehicle code stored on that device. When the vehicle is deactivated the vehicle and/or device confirm that the secure vehicle code has been reset and stored correctly. This confirmation ensures proper operation for the next time the device is used. In order to protect the integrity of the signal, and to secure against any external third parties eavesdropping, the confirmation needs to be performed with a very short range and low power signal with the device inside the vehicle or in very close proximity to the vehicle.

Once the initial security code has been reset and access to the vehicle gained, the device transmits the secure vehicle code, the device ID and the stored image data to the system. The image data can be preloaded into the device by the vehicle manufacturer, downloaded by the owner of the device via computer or other connection or loaded directly through image capture capabilities of the device. The image data can be hologram image data or other image data such as 3D image data, complex 2D image data or other image data either scanned or captured by the device.

Upon receipt, the system authenticates the device using the secure vehicle code, device ID and image data. If the authentication is verified an access code is sent to the device and to the vehicle. Upon receipt of the access code, the vehicle authenticates the device through a handshake between vehicle and device. The handshake compares the received access codes of the vehicle and the device. Upon receipt of the access codes by the vehicle, all vehicle systems, other than remote communications access capabilities, are enabled and usable. However, no remote devices including the user's device may access the vehicular systems until the access code is verified and the handshake between the vehicle and device is completed successfully. Upon successful verification of the access code, remote communications access capabilities are enabled between the verified device and the vehicle.

Figure 34:
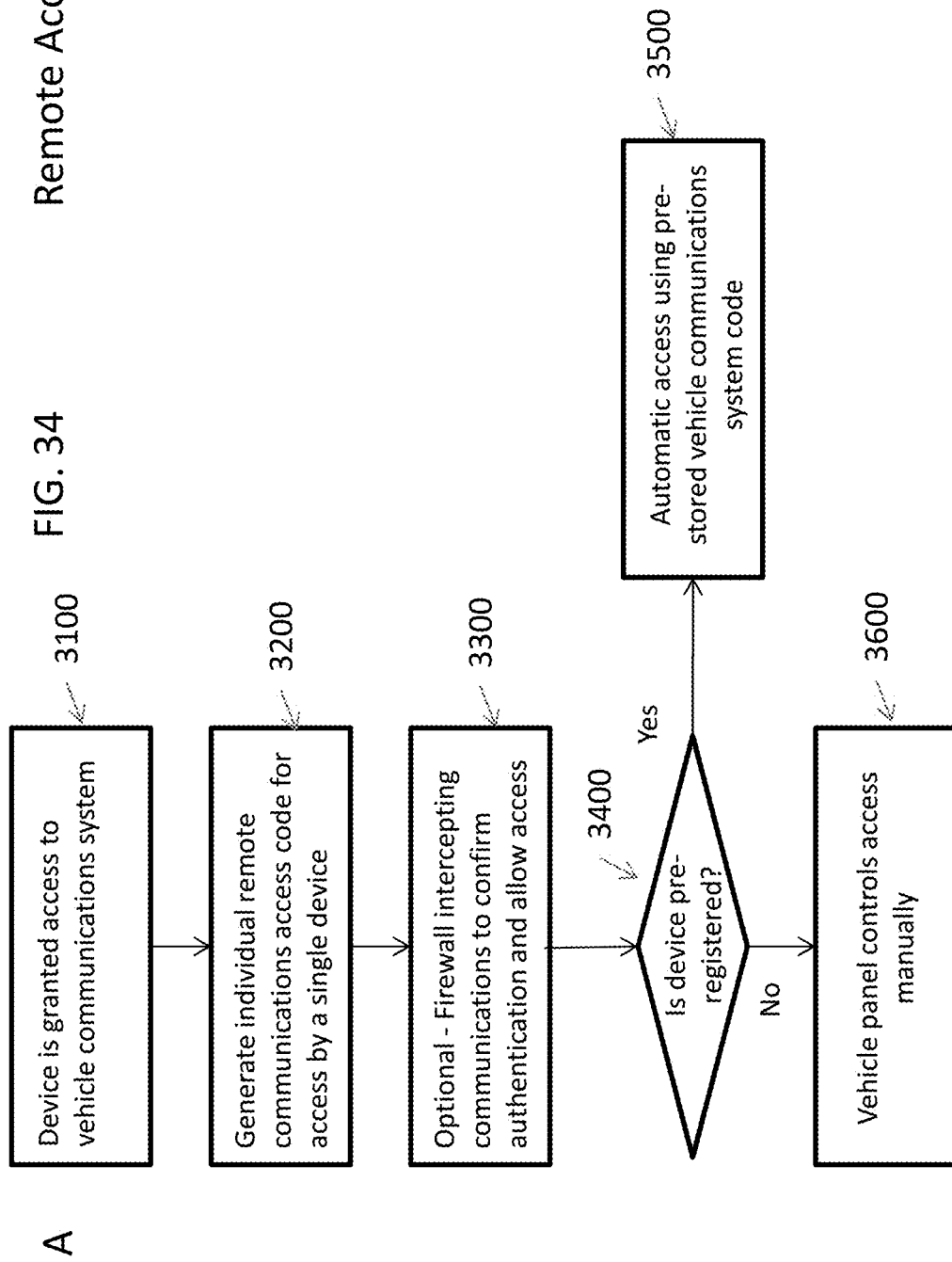
FIG. 34 illustrates a method for remote access control of a vehicles systems, in accordance with an embodiment of the present teaching.

FIG. 34 is a schematic illustrating the remote access control in one or more embodiments of the present disclosure. In one or more embodiments, multiple friendly devices may be present in the vehicle. This could be a series of mobile smart phones, tablets, laptop computers or other wireless devices. In one or more embodiments, each device does not need to verify with the system if there is a verified device within the vehicle already that has administrator level access or that is a trusted device. In one or more embodiments, the additional devices, may gain access to the vehicles if they can be verified through the already verified administrator level device or trusted device ("primary device").

At step 3100, upon confirmation of the access code of the primary device by the vehicle as described with respect to FIGS. 32-33, the primary device is granted access rights to communicate remotely with the vehicle. Now that the primary device itself has been verified, it may also grant remote communications capabilities to other friendly devices or this can be accomplished by the vehicle directly. Remote communications access rights may be provided to other friendly devices using a unique individual remote communications code for each additional device. Alternatively one or more selected friendly devices may be given remote communications access using a single remote communications code.

At step 3200, the vehicle or the primary device may generate one or more individual remote communications access codes depending on the number of preregistered friendly devices detected, based on the number of devices indicated by the user, or based on a predetermined limit, or a combination of the foregoing. At step 3400, the vehicle or primary device may communicate with the friendly devices to determine if they have been pre-registered with the system. Preregistered devices are those that have previously established secure communications with the vehicle systems in the past. These preregistered devices may be identified based on a unique code associated with the device. If at step 3400 the device is preregistered, then upon recognition of one or more preregistered devices the vehicle or primary device generates a unique remote communications access code for each device at step 3500. Each of the friendly devices may connect automatically or may be provided access to the vehicle communications system manually. If the friendly device is not preregistered, the user may grant access to the friendly device either through an access panel in the vehicle at step 3600 or via the app or client on the primary device, or a combination of the foregoing.

In one or more embodiments, the vehicle control panel is used to select and control the devices that are allowed access to the vehicle communications system. In one or more other embodiments, the interface of the primary device replaces the vehicle standard interface. This replacement may be via a wired or wireless connection. In one or more other embodiments, all outside device connections to the vehicle must be filtered through the primary device, which acts as a "middleman" to filter all the wireless communications to the vehicle.

In one or more embodiments, one or more of the preregistered devices pre-stores the remote communications access code. The remote communications access code may be updated when the preregistered device couples to the vehicle communications system. When the preregistered device couples to the vehicle communication system the vehicle or the primary device transmits an updated remote communications access code to the preregistered device, as described above. This updated remote communications access code is used by the preregistered device to login to the vehicle communications system during the next login session. During the communications session between the vehicle communications system and the preregistered device the accuracy of the updated remote communications access code is confirmed. Upon completion of the communication session and disconnection of access for the preregistered device the revised remote communications access code is used by the preregistered device to obtain access to the vehicle communications system.

In one or more embodiments, at step 3300 an optional firewall may be implemented in the vehicle communications system to prevent access by unregistered devices. The firewall may use any known encryption and prevention technique and provides an additional layer of security.

Figure 35:
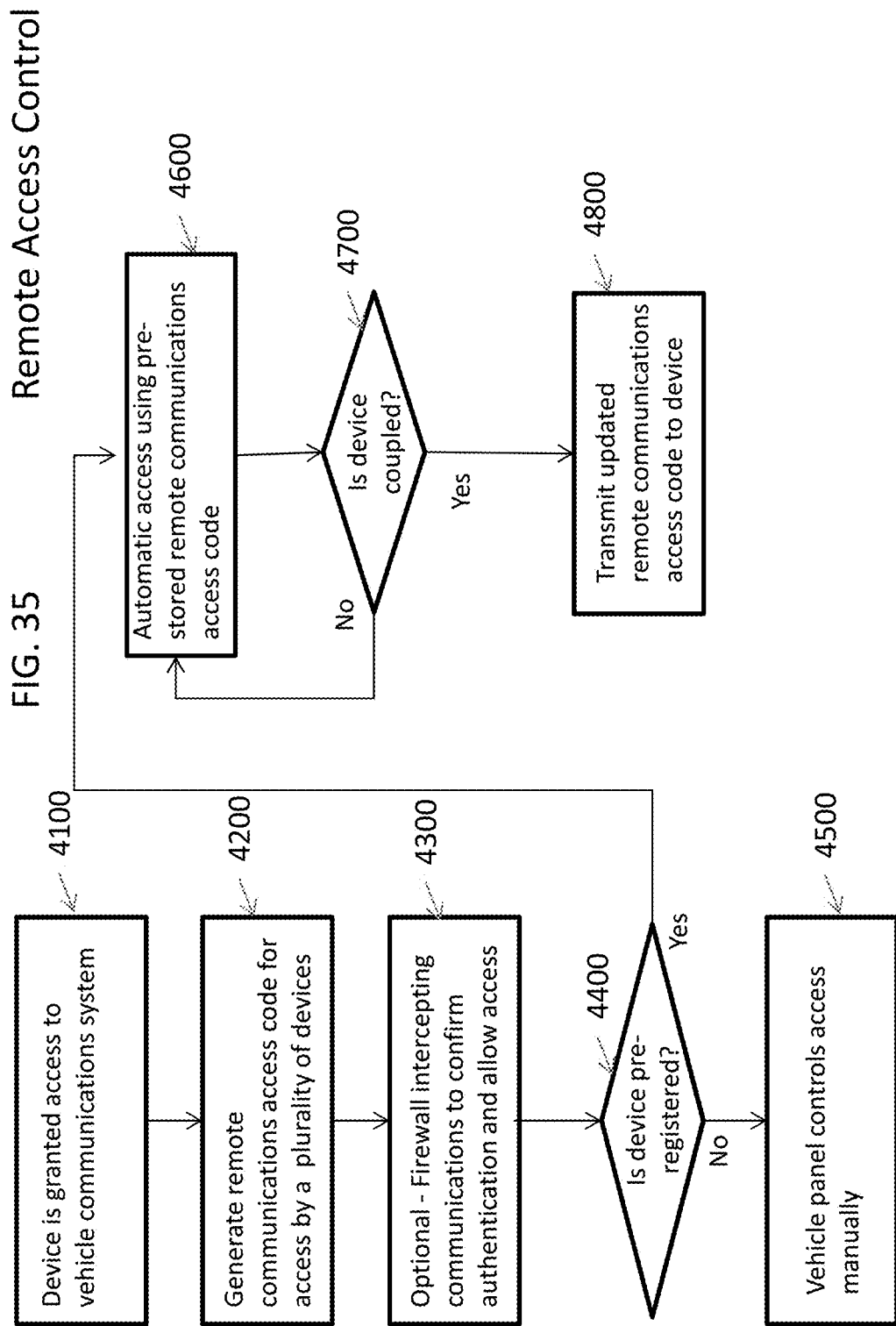
FIG. 35 illustrates another method for remote access control of a vehicles systems, in accordance with an embodiment of the present teaching.

FIG. 35 illustrates remote access control using an alternative embodiment of the present disclosure. In this embodiment, upon confirmation of the access code by the vehicle, the primary device at step 4100 is granted access rights to communicate remotely with the vehicle and to grant remote communications capabilities to other devices. At step 4200, remote communications access rights may be provided to other friendly devices using an individual remote communications code for each friendly device. Additionally and/or alternatively one or more selected devices may be given remote communications access using a single remote communications code.

At step 4200, the vehicle or the primary device generates one or more remote communications access codes for utilization by the one or more friendly preregistered devices detected or based on the number of devices indicated by the user, based on a predetermined number. or a combination of the foregoing. At step 4400 if the friendly device is preregistered, the vehicle or primary device generates a remote communications access code for one or more of the devices.

At step 4600, each of the friendly devices may then be connected automatically or may be provided access to the vehicle communications system manually. In one or more embodiments, one or more of the preregistered friendly devices pre-stores the remote communications access code in memory. The stored remote communications access code may be updated when the one or more preregistered devices couple to the vehicle communications system. At step 4700, the system and or the vehicle determines if the friendly device is coupled to the vehicle manner as to be effective and valid under applicable law, but the provisions of this vehicle communication system, then at step 4800, the vehicle or the primary device transmits an updated remote communications access code to the one or more preregistered devices. This updated remote communications access code is used by the one or more preregistered devices to logon to the vehicle communications system during the next login session. At some point during communications between the vehicle communications system and the one or more preregistered devices the accuracy of the updated remote communications access code is confirmed. If the device is not coupled in step 4700, then the updated code will not be sent to the preregistered device.

When the one or more preregistered devices attempts to initiate a new session at some later point in time, the revised remote communications access code is used by the one or more preregistered devices to obtain access to the vehicle communications system. In one or more embodiment, an optional firewall may be used at step 4300 to acts as a gateway between any device and the vehicle to confirm authentication and grant and/or deny access.

FIG. 36 illustrates an image loading process used in accordance with one or more embodiments of the present disclosure. At step S100, image data is captured using a mobile device. In one or more embodiment, image data may be captured using a dedicated image data capture device. In other embodiments, the image data may be pre-captured and sent to or stored on the device. In one or more embodiments, the pre-capturing may be accomplished at the location where the image data is generated. For example, when the images are embedded within holograms, the pre-capturing of the image data is accomplished after the hologram generation. In one or more embodiments, the image data is captured by taking a picture of the hologram from a predetermined angle and perspective. As another example, when the images are photographs, the pre-capturing of the image data is accomplished after the photograph is generated. In one or more other embodiments, the image data is captured by taking a picture of the photograph from a predetermined angle and perspective. As an additional embodiment, the images are computer generated images and the pre-capturing of the image data is accomplished at or after the time the image is generated. In one or more other embodiments, the image data is captured by a computer generating image data from a particular perspective.

After the image data is captured, the image data may be stored on the device or may be stored at a remote location accessible to the device. At step S200 the captured image data may be encrypted and stored on the device at step S300. In one or more embodiments, the image data is stored on a server in an authentication system. In one or more embodiments, the image data is stored on both the device and on a server in the authentication system. For purposes of authentication in accordance with one or more embodiments, at step S400 the encrypted image data from the device is transmitted to the authentication system and compared to the pre-stored image data stored in the authentication system. In one or more embodiments, the image data from the device is decrypted using a code stored in the authentication system prior to authentication. In one or more embodiments, where the image data is not encrypted, the image data from the device is compared to the image data stored on the authentication system. In one or more other embodiments, where the image data is encrypted or one way encrypted, the image data stored in the memory of the device is compared to the image data stored in the memory of the authentication system. Additionally and/or alternatively, the encrypted image data from the device is compared to encrypted image data from the authentication system.

FIG. 37 depicts a system diagram 600 in accordance with one or more embodiments of the present disclosure. System 600 comprises a mobile device 6100, a vehicle 6200, a computer or server 6300, and a network 6400. Mobile device 6100 may be a smart phone, a tablet, a PDA, a laptop, a single function device such as a wireless remote or key fob, or any other mobile device capable of communicating wirelessly, via any known communications protocol over a wireless network. Mobile device 6100 may communicate via a radio and/or wireless carrier or may communicate via Wi-Fi, Bluetooth, or any other short or long range communications protocols. Mobile device 6100 may comprise a sensor or a series of sensors such as a camera, an accelerometer or a GPS. Mobile device 6100 may be capable of communicating over network 6400 or directly to vehicle 6200 or server 6300 directly or indirectly.

Vehicle 6200 may be any type of vehicle capable of wireless communications. Vehicle 6200 may be a passenger car, truck, commercial vehicle, bus, train, boat, ferry, aircraft, watercraft, manned or unmanned or any other vehicle.

The server 6300 can be hardware-based and/or software-based. The server 6300 is and/or is hosted on, whether directly and/or indirectly, a server computer, whether stationary or mobile, such as a workstation, a desktop, a laptop, a tablet, a mainframe, a supercomputer, a server farm, and so forth. The server computer can be touchscreen enabled and/or non-touchscreen. The server computer can include and/or be a part of another computer system and/or a cloud computing network. The server computer can run any type of operating system (OS), such as iOS®, Windows®, Android®, Unix®, Linux® and/or others. The server computer can include and/or be coupled to, whether directly and/or indirectly, an input device, such as a mouse, a keyboard, a camera, whether forward-facing and/or back-facing, an accelerometer, a touchscreen, a biometric reader, a clicker, and/or a microphone. The server computer can include and/or be coupled to, whether directly and/or indirectly, an output device, such as a display, a speaker, a headphone, a joystick, a videogame controller, a vibrator, and/or a printer. In some embodiments, the input device and the output device can be embodied in one unit. The server computer can include circuitry for global positioning determination, such as via a global positioning system (GPS), a signal triangulation system, and so forth. The server computer can be equipped with near-field-communication (NFC) circuitry. The server computer can host, run, and/or be coupled to, whether directly and/or indirectly, a database, such as a relational database or a non-relational database, which can feed data to the server 6300, whether directly and/or indirectly.

Network 6400 may be any size network and may include a plurality of nodes, such as a collection of computers and/or other hardware interconnected via a plurality of communication channels, which allow for sharing of resources and/or information. Such interconnection can be direct and/or indirect. Network 6400 can be wired and/or wireless. The network 6400 can allow for communication over short and/or long distances, whether encrypted and/or unencrypted. The network 6400 can operate via at least one network protocol, such as Ethernet, a Transmission Control Protocol (TCP)/Internet Protocol (IP), and so forth. The network 6400 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. The network 6400 can be and/or include an intranet and/or an extranet. The network 6400 can be and/or include Internet. The network 64 can include other networks and/or allow for communication with other networks, whether sub-networks and/or distinct networks, whether identical and/or different from the network 6400. The network 6400 can include hardware, such as a computer, a network interface card, a repeater, a hub, a bridge, a switch, an extender, and/or a firewall, whether hardware based and/or software based. The network 6400 can be operated, directly and/or indirectly, by and/or on behalf of one and/or more entities, irrespective of any relation to contents of the present disclosure.

In one or more embodiments, mobile device 6100 and the client on mobile device 6100, via the computer, may be in communication with network 6400, such as directly and/or indirectly, selectively and/or unselectively, encrypted and/or unencrypted, wired and/or wireless, via contact and/or contactless. Such communication can be via a software application, a software module, a mobile app, a browser, a browser extension, an OS, and/or any combination thereof. For example, such communication can be via a common framework/API, such as HTTPS.

The mobile device 6100 may comprise a client that can be hardware-based and/or software-based. In one or more embodiments, the server 6300 and the client on mobile device 6100 can directly communicate with each other, such as when hosted in one system or when in local proximity to each other, such as via a short range wireless communication protocol, such as infrared or Bluetooth®. Such direct communication can be selective and/or unselective, encrypted and/or unencrypted, wired and/or wireless, via contact and/or contactless. Since many of the clients on mobile device 6100 can initiate sessions with the server 6300 relatively simultaneously, in some embodiments, the server 6300 employs load-balancing technologies and/or failover technologies for operational efficiency, continuity, and/or redundancy.

In one or more embodiments, a user of mobile 6100 may use an application or client to communicate with vehicle 6200 directly or may communicate with the vehicle via network 6400 and server 6300. In one or more embodiments, server 6300 is an authentication system in accordance with one or more embodiments of the present disclosure. Server 6300 may store, transmit and receive information necessary to authenticate mobile device 6100 and vehicle 6200 in order to facilitate communications between mobile device 6100 and vehicle 6200. In one or more embodiments, the communication between the device and the vehicle may include communication with the vehicle's computers and communications systems. In one or more embodiments, the authentication is based on a captured 2D or 3D image.

Alternative data sets may be used for authenticating at the server, including replacing or augmenting the image data with voice data, including particular phrases that may be input via a microphone. This voice data may be compared to voice data previously recorded at the time of registration of the payment card, Identification card, or with the application. Additionally or alternatively, facial recognition, retinal scan, fingerprint or other biometrics or biometric markers may be used in place of the image data or to augment the image data, or may be used to sign into the application.

What is claimed is:

1. A system, comprising:
a server comprising a microprocessor, wherein the server includes a set of instructions that are served to a client, wherein the server is coupled to a database comprising a first data, wherein the first data comprises a client data and information used to authenticate a device and at least one of a user or an authorization, wherein the set of instructions cause the client to capture a transaction data comprising a transaction identifier from a remote computer, and transmit each of a second data comprising information used to perform an analysis relative to the first data, at least a first subset of the transaction data, and a third data representing the client, to the server, wherein the server determines a correspondence between
the at least the first subset of the transaction data received from the client and a copy of the transaction data generated by and stored in the server or received at the server from the remote computer,
the first data and the second data, and
the third data and the client data,
wherein the server transmits a second subset of the transaction data to the client, wherein the client transmits at least one of a response, command or instruction relating to the second subset of the transaction data to the server,
wherein upon receipt of the at least one of a response, command or instruction relating to the second subset of the transaction data, the server determines whether the at least one of the response, command or instruction comprises at least one of an affirmative response, command or instruction or a negative response, command or instruction, and
wherein upon a determination that the first at least one of the response, command or instruction comprises an affirmative response, command or instruction, the server transmits at least one of a flag, command or instruction to the remote computer.

2. The system of claim 1, wherein the determining includes determining whether the correspondence between each of the at least the first subset of the transaction data received from the client and a copy of the transaction data generated by and stored in the server or received at the server from the remote computer, the first data and the second data, and the third data and the client data stored in the server, exceeds a predetermined threshold.

3. The system of claim 1, wherein the client is a mobile device.

4. The system of claim 1, wherein the second data comprises data captured from a hologram or a 3-dimensional image.

5. The system of claim 4, wherein the hologram includes a plurality of bits of security data embedded within the hologram.

6. The system of claim 1, wherein the instructions further cause the client to control a camera at the client to capture an image comprising the second data, wherein the image is captured when the camera is at a first position relative to an object from which the image is captured, and store the image in a memory at the client.

7. The system of claim 1, wherein the correspondence between the first data and the second data is determined using one or more machine vision algorithms.

8. The system of claim 1, further comprising, upon a failure to identify a correspondence between the first data and the second data, transmitting a message to at least one of the client or the remote computer.

9. The system of claim 1, wherein the second data comprises a representation of at least one of image data or sound data.

10. The system of claim 1, further comprising determining a correlation between the second data and the client.

11. The method of claim 1, wherein the second data comprises a representation of at least one of image data or sound data.

12. The method of claim 1, wherein the transaction data further comprises one or more bits or bytes of data that represent vendor ID, vendor name, transaction identifier, cashier identifier, POS identifier, Year, Month, Day, Time, transaction amount, a verification code, or any combination of the foregoing.

13. A method, comprising:
retrieving by a server a first data from a first memory, wherein the first data comprises a client data and information used to authenticate a device and at least one of a user or an authorization;
retrieving by the server at least a first subset of a transaction data from a second memory;
receiving at the server a second data via a client, wherein the second data comprises information used to perform an analysis relative to the first data;
receiving at least a second subset of the transaction data comprising a transaction identifier at the server via the client;
receiving a third data, representing the client, at the server, via the client;
generating via a processor a third subset of the transaction data using the at least the first subset of the transaction data;
determining via the processor a correspondence between each of
the at least the second subset of the transaction data received from the client and a copy of the at least the first subset of the transaction data retrieved from the second memory,
the first data and the second data, and
the third data and the client data retrieved from the first memory;
upon a determination of a correspondence between each of the at least the second subset of the transaction data received from the client and a copy of the at least the first subset of the transaction data retrieved from the second memory, the first data and the second data, and the third data and the client data retrieved from the first memory, transmitting via the server the third subset of the transaction data to the client;
receiving at the server, from the client, at least one of a response, command or instruction relating to the third subset of the transaction data;
determining via the processor whether the at least one of the response, command or instruction comprises at least one of an affirmative response, command or instruction or a negative response, command or instruction;
upon a determination that the at least one of the response, command or instruction comprises an affirmative response, command or instruction, the server transmits at least one of a flag, command or instruction to a remote computer.

14. The method of claim 13, wherein the determining includes determining whether the correspondence between each of the at least the second subset of the transaction data received from the client and a copy of the at least the first subset of the transaction data retrieved from the second memory, the first data and the second data, and the third data and the client data retrieved from the first memory, exceeds a predetermined threshold.

15. The method of claim 13, wherein the client is a mobile device.

16. The method of claim 13, wherein the second data comprises data captured from a hologram or a 3-dimensional image.

17. The method of claim 13, wherein the correspondence between the first data and the second data is determined using one or more machine vision algorithms.

18. The method of claim 13, further comprising, upon a failure to identify a correspondence between the first data and the second data, transmitting a message to at least one of the client or the remote computer.

19. The method of claim 13, wherein the transmission of the at least one of the flag, command or instruction to the remote computer causes the remote computer to allow access to a computer or database or initiate a shipment of a physical object.

20. The method of claim 13, wherein the transaction data further comprises one or more bits or bytes of data that represent vendor ID, vendor name, transaction identifier, cashier identifier, POS identifier, Year, Month, Day, Time, transaction amount, a verification code, or any combination of the foregoing.

* * * * *